Aug. 30, 1949.                L. W. ALVAREZ                2,480,208
                    RADIO DISTANCE AND DIRECTION INDICATOR
Filed June 27, 1944                                11 Sheets-Sheet 1
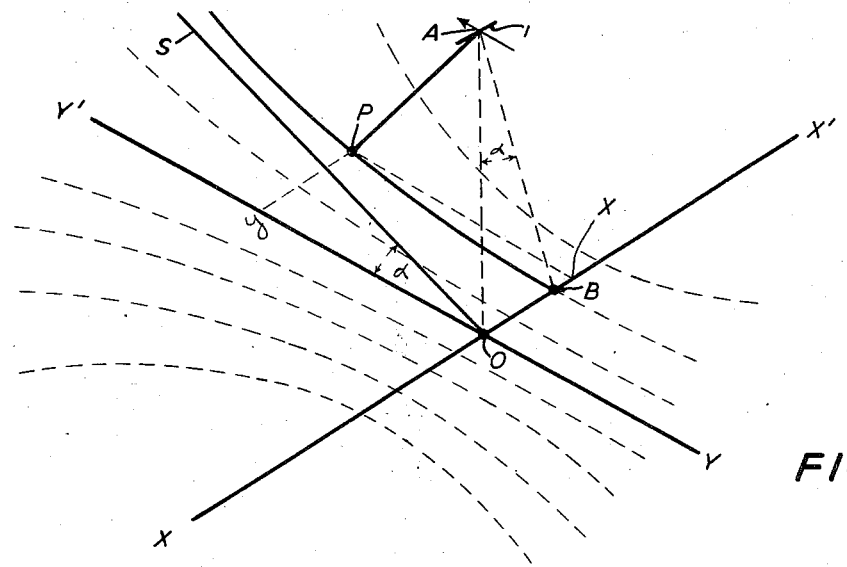
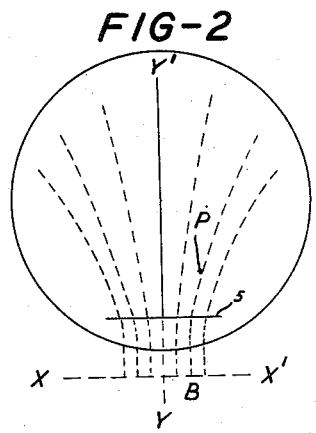
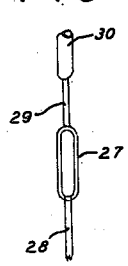
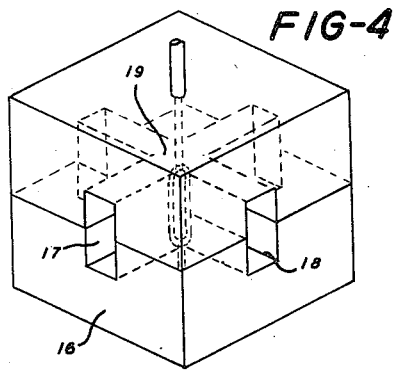
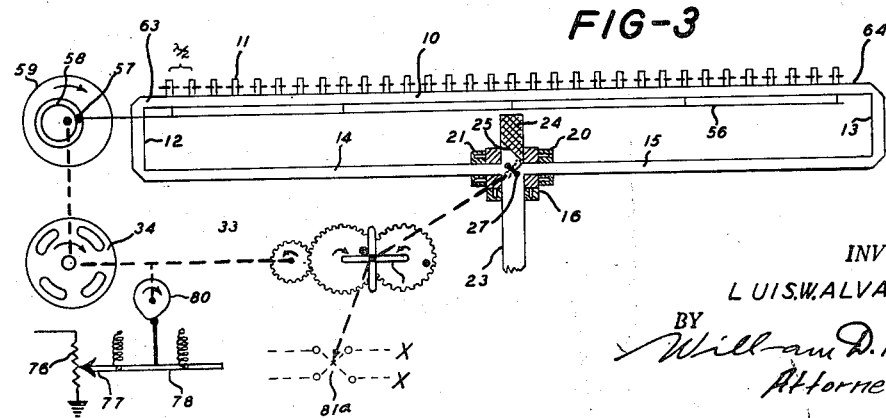
INVENTOR.
LUIS W. ALVAREZ
BY
William D. Hall
Attorney Aug. 30, 1949. L. W. ALVAREZ 2,480,208
RADIO DISTANCE AND DIRECTION INDICATOR
Filed June 27, 1944 11 Sheets-Sheet 2
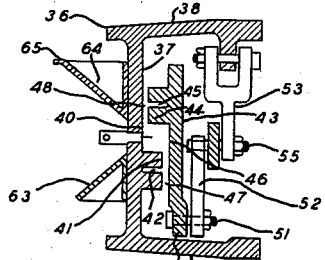
FIG-6
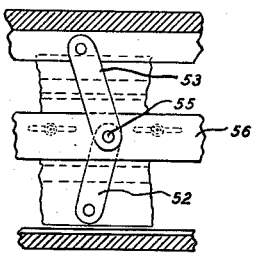
FIG-7
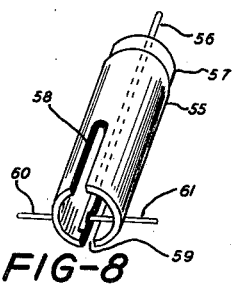
FIG-8
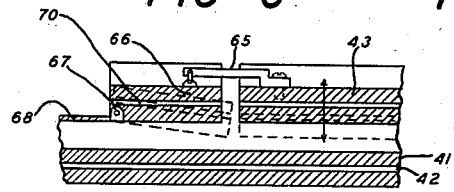
FIG-9
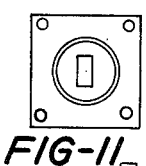
FIG-11
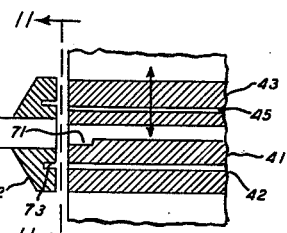
FIG-10
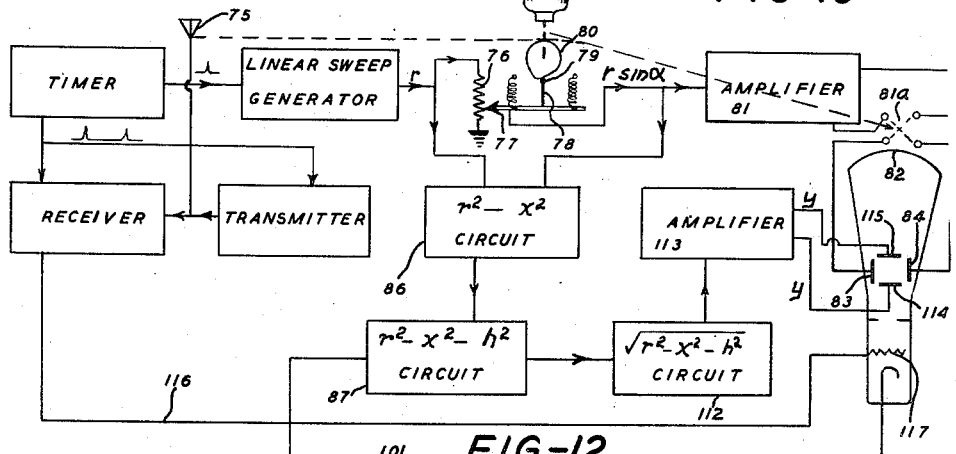
FIG-12
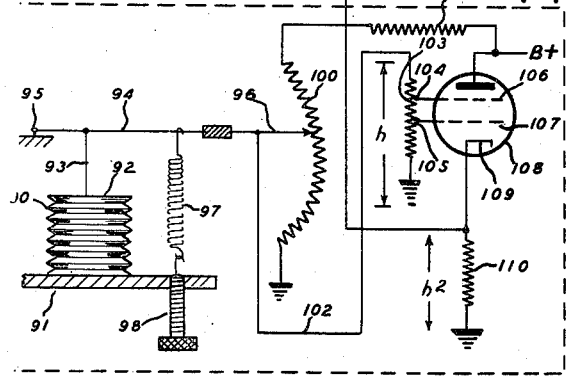
INVENTOR.
LUIS W. ALVAREZ
BY William D. Hall.
Attorney Aug. 30, 1949.                L. W. ALVAREZ                2,480,208
               RADIO DISTANCE AND DIRECTION INDICATOR
Filed June 27, 1944                                  11 Sheets-Sheet 3
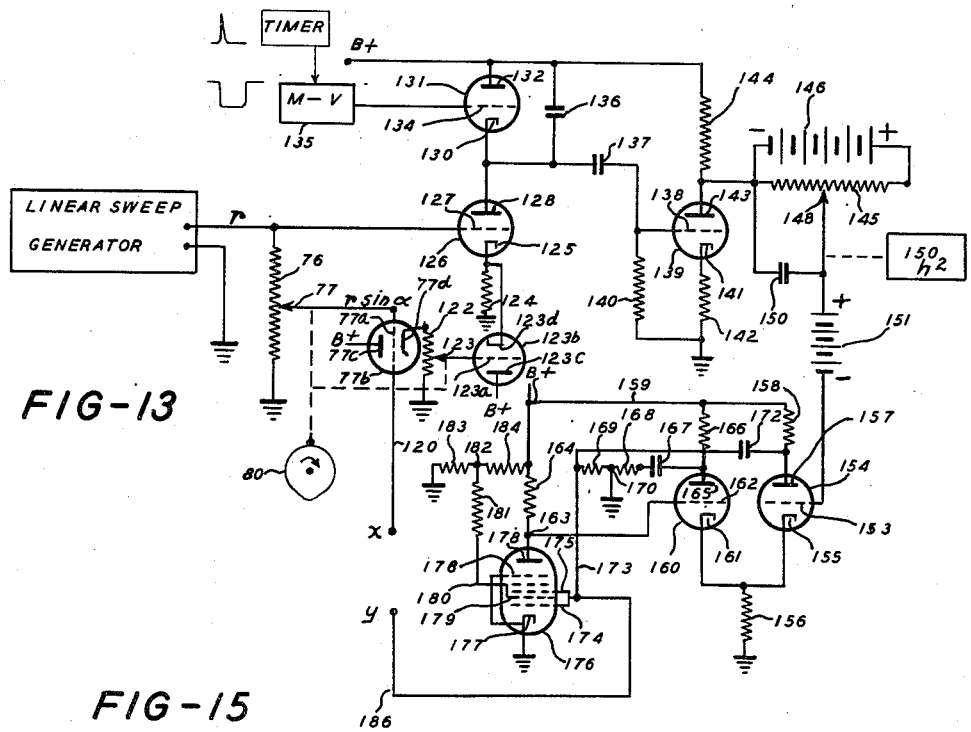
FIG-13
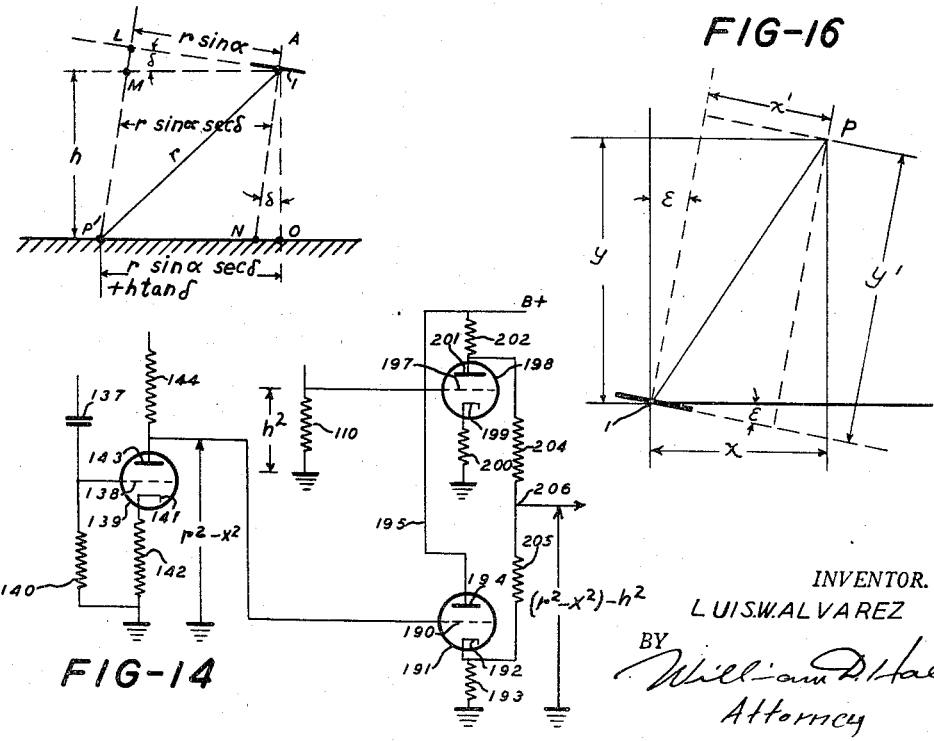
FIG-15
FIG-16
FIG-14
INVENTOR.
LUIS W. ALVAREZ
BY
William D. Hall.
Attorney Aug. 30, 1949.  L. W. ALVAREZ  2,480,208
RADIO DISTANCE AND DIRECTION INDICATOR
Filed June 27, 1944  11 Sheets-Sheet 4

INVENTOR.
LUIS W. ALVAREZ
BY William D. Hall
Attorney

Aug. 30, 1949.  L. W. ALVAREZ  2,480,208
RADIO DISTANCE AND DIRECTION INDICATOR
Filed June 27, 1944  11 Sheets-Sheet 5

INVENTOR.
LUIS W. ALVAREZ
BY William D Hall.

Aug. 30, 1949.  L. W. ALVAREZ  2,480,208
RADIO DISTANCE AND DIRECTION INDICATOR
Filed June 27, 1944  11 Sheets-Sheet 6

INVENTOR.
LUIS W. ALVAREZ
BY William L. Hall.
Attorney

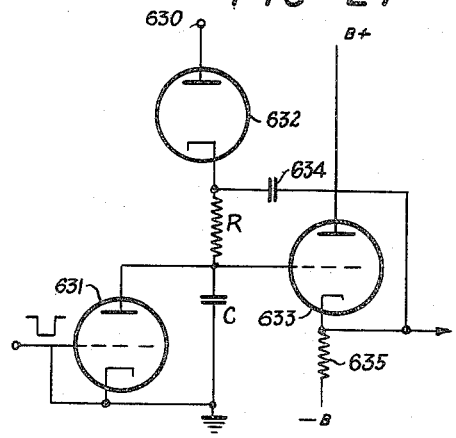
FIG-27
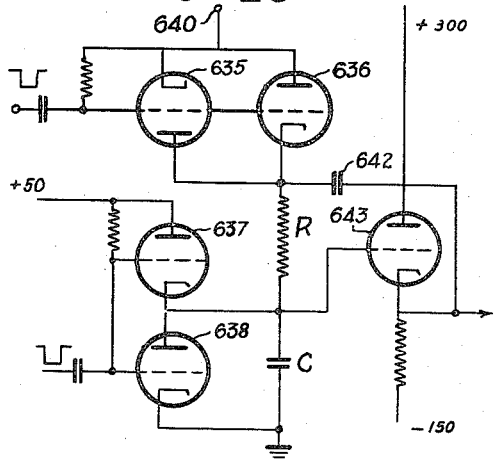
FIG-28
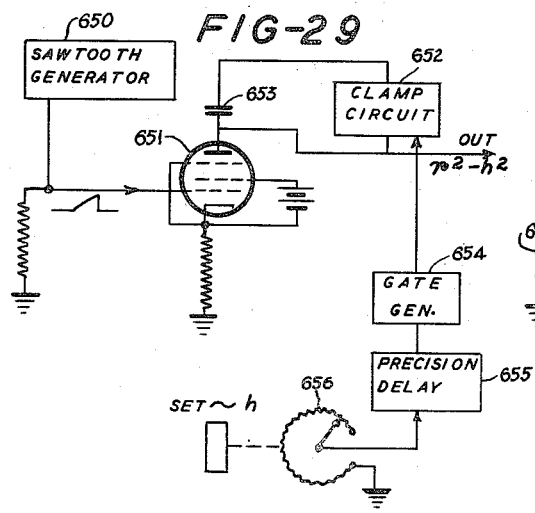
FIG-29
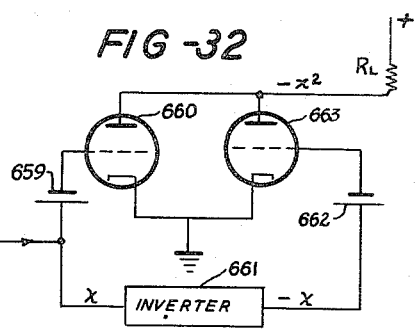
FIG-32
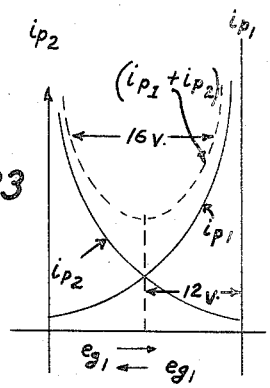
FIG-33
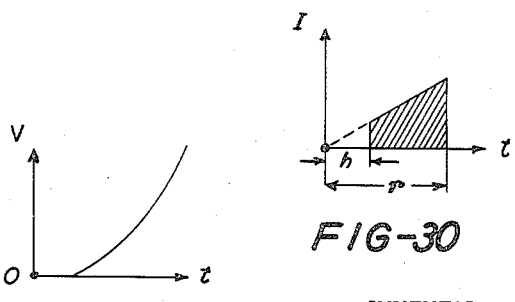
FIG-31
FIG-30
INVENTOR.
LUIS W. ALVAREZ
BY William H. Hall.

Aug. 30, 1949.    L. W. ALVAREZ    2,480,208
RADIO DISTANCE AND DIRECTION INDICATOR
Filed June 27, 1944    11 Sheets-Sheet 9
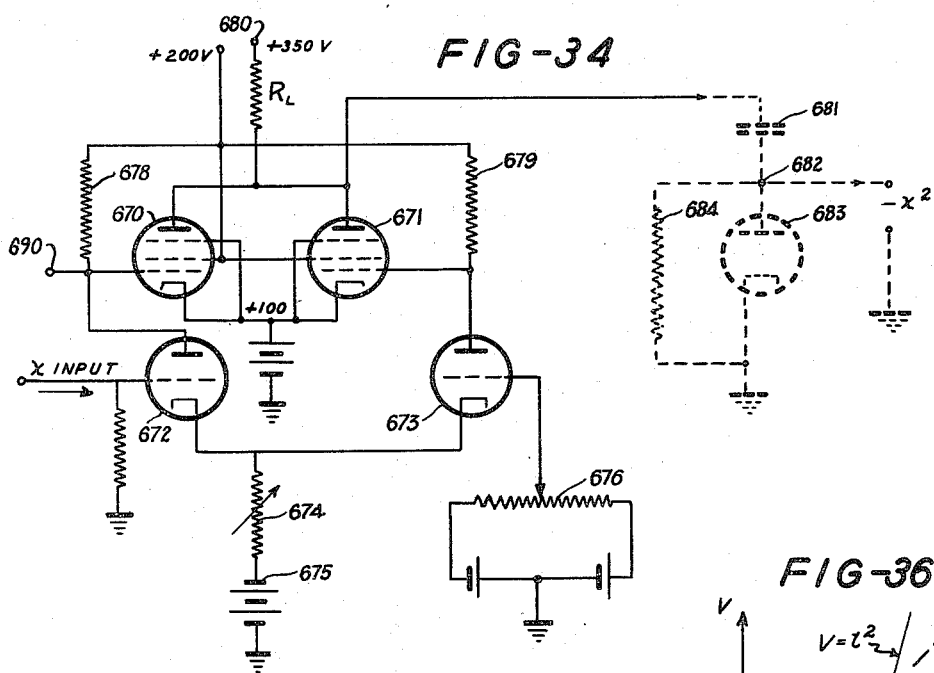
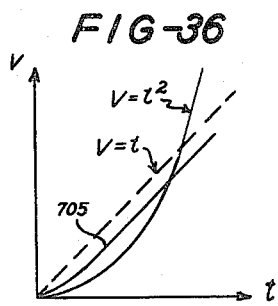
FIG-36
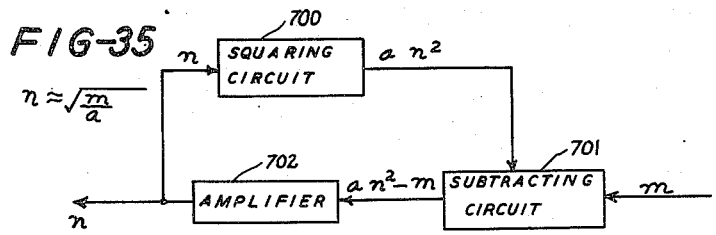
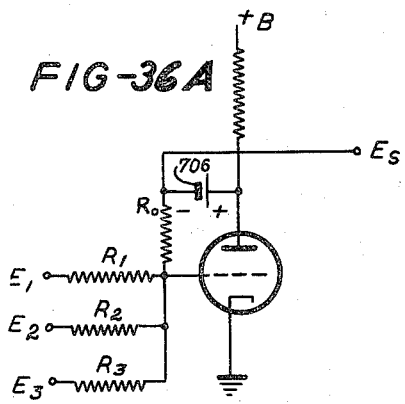
INVENTOR.
LUIS W. ALVAREZ
BY William D Hall

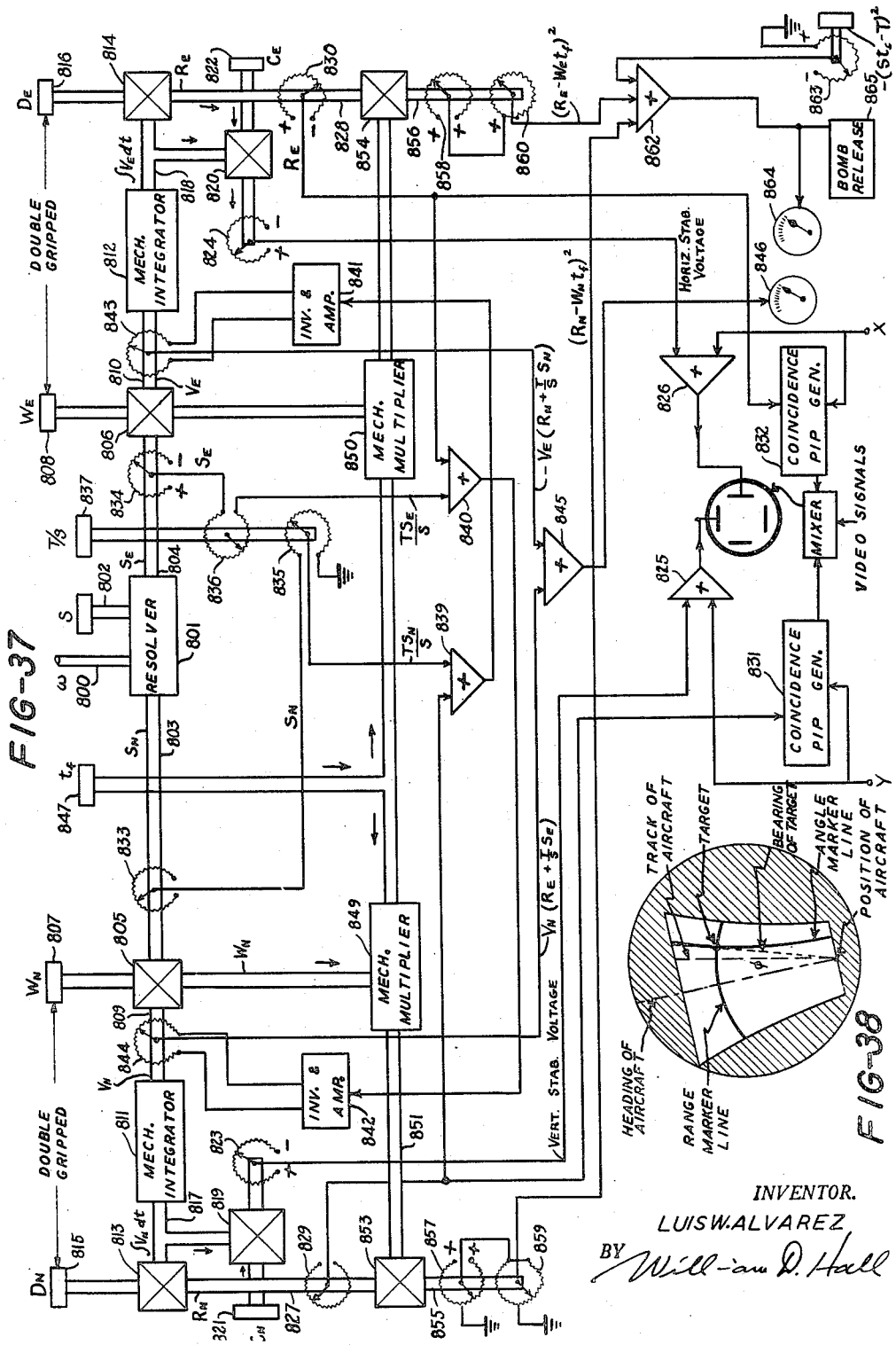

Patented Aug. 30, 1949

2,480,208

UNITED STATES PATENT OFFICE 2,480,208

RADIO DISTANCE AND DIRECTION INDICATOR

Luis W. Alvarez, Santa Fe, N. Mex., assignor, by mesne assignments, to the United States of America as represented by the Secretary of War Application June 27, 1944, Serial No. 542,287

27 Claims. (Cl. 343—7)

Introduction

This invention relates to a communication system and more particularly to a system for presenting in panoramic form the location and disposition of objects as they might be seen from the air. In particular, the system hereinafter described is a radar or radio echo detection system presenting objects and targets principally on the ground lying in the path of flight of an airplane.

A system of this character has great utility both in war and in peace. Thus for war purposes, a system of this character may be used for aiding in the approach toward and the release of bombs on desired targets. For peaceful purposes, a system of this character may find application as an aid to navigation of planes under conditions of poor visibility. Other uses for a system of this character may be provided as the full utility of the system is apparent.

There are at present in use radar systems on ground equipment which systems are adapted to present a sort of map of the territory around the system. As a rule, such systems in their simplest form comprise a highly directional antenna system to which a transmitter and receiver are alternately coupled. The target presentation is made on the screen of a cathode ray tube and generally consists of a series of radial sweeps from the center of the screen. The azimuth is generally correlated with the angle of the sweep with respect to a fixed radial direction, while the range is a function of the radial distance from the center of the screen.

In airborne equipment, however, the problem of panoramic presentation involves quite a number of different objectives. Thus, for example, the view ahead with respect to the line of travel of the plane is of immediate concern, while the desired view across the line of travel generally increases as the distance from the plane increases. As a rule, the terrain over which the plane has already passed is of no concern, and this is also true of the terrain transversely on either side of and below the plane.

Because the range of vision increases quite rapidly with altitude, it is clear that in a plane the range of distant targets may increase quite rapidly as the altitude of the plane itself increases. Due to the nature of the general problem, of which more will be stated later, a sector panoramic presentation of the ground for a plane is beset with numerous special problems requiring special solutions.

Drawings

In the drawings:

Fig. 1 is a diagram illustrating the geometrical principles involved in the invention;

Fig. 2 is a diagram illustrating a suitable method of presentation of information on the screen of a cathode ray tube;

Fig. 3 is a diagrammatic showing of the antenna system together with the scanning motor;

Fig. 4 is an isometric view of the connecting block in the antenna system;

Fig. 5 is an elevation detail of the reflecting member used in the connecting block of Fig. 4;

Fig. 6 is a sectional elevation of an antenna system;

Fig. 7 is an elevation view from the rear of the antenna system of Fig. 6;

Fig. 8 is an isometric view of one of the dipole elements;

Fig. 9 is a sectional plan view looking down upon the antenna and showing the transition section between fixed and adjustable wave guides;

Fig. 10 is a sectional plan view of a modified form of transition section;

Fig. 11 is an end elevation taken on line 11—11 of Fig. 10 and showing the coupling portion of the fixed wave guide;

Fig. 12 is a diagrammatic view partly in blocks of a simple system for illustrating the invention;

Fig. 13 is a diagrammatic view partly in blocks and partly in wiring detail explanatory of the blocks of Fig. 12;

Fig. 14 is a wiring diagram of one form of a voltage combining circuit which may be used in the system of Fig. 12;

Figs. 15 and 16 are geometrical diagrams relating to the introduction of correction for roll and yaw, respectively;

Figs. 27, 28, 29, 32, 34, 35 and 36A are diagrams of specific circuits which are of particular utility in connection with this invention;

Figs. 30 and 31 are diagrams relating to the operation of the circuit of Fig. 29;

Fig. 33 is a diagram relating to the operation of the circuits of Figs. 32 and 34;

Fig. 36 is a diagram relating to the operation of the circuit of Fig. 35;

Fig. 37 is a block diagram of a computing system, including certain features of Fig. 23;

Fig. 38 shows the screen of a cathode ray tube with indications provided by the computing system of Fig. 37.

Fundamental geometry of problem

Figure 17:
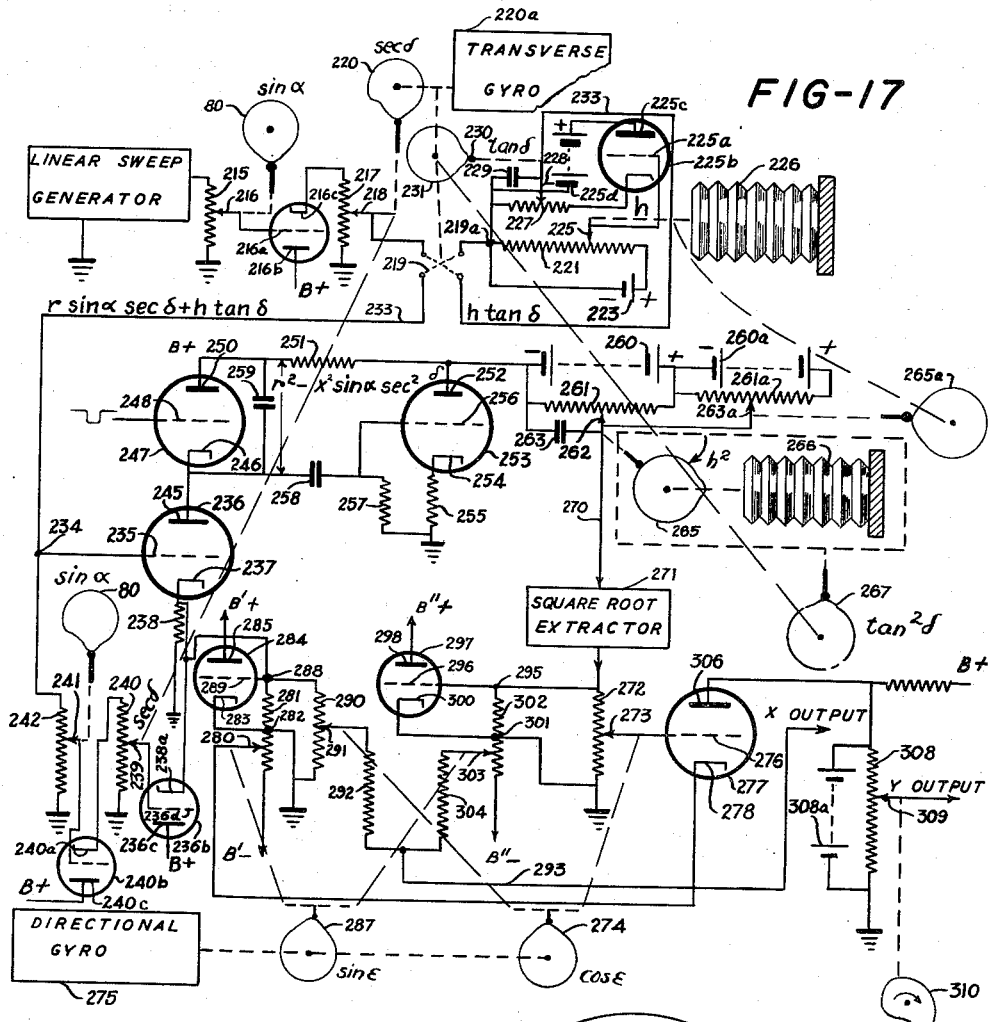
Fig. 17 is a circuit diagram, partly in block form, illustrating one method of accomplishing corrections for roll and yaw.

A preliminary and simplified system and accompanying problem will first be discussed. In this the assumption will be made that the plane maintains its desired direction and level substantially as might be expected under good flying conditions where no problem of drift, rolling, yawing and jinking or sudden changes to avoid other craft or anti-aircraft fire are taken into account.

Referring first to Fig. 1, let $l$ represent a transverse element of an airplane with the direction of flight actually perpendicular to this line. At any instant $t=0$, let a rectangular coordinate system be assumed with the origin O being on the face of the earth directly below the airplane.

In order to simplify the entire problem, the assumption will be made that the surface of the earth is flat. In practice, simplification of the apparatus tends to compensate in some manner for this assumption so that a substantially accurate presentation is possible assuming that the ground does not have any sharp projections, such as hills or mountains, or declivities, such as chasms or valleys. Such irregularities have characteristic indications whose nature is obvious to a trained operator.

With O as origin, let $XX'$ be a coordinate axis transverse to the line of flight of element $l$ and lying within the assumed flat plane of the earth's surface. Similarly, let $YY'$ be the other coordinate axis along the direction of flight of plane, the airplane containing element $l$.

The proper operation of a radio echo detection system requires that the radiant energy issuing from and arriving at the antenna be concentrated. For reasons which will be apparent later in connection with the geometry of the problem, the radiant beam is formed as a thin sheet. The antenna system, which will be described in detail later, has the characteristic of initially (i. e. without reflectors) generating a generally conical sheet of radiant energy. The axis of the cone lies along line $l$.

At one extreme of the transverse sweep, the conical radiation extends toward $X'$ and may have a certain predetermined minimum angle at the tip of the cone. This minimum angle may be determined by various design considerations. The intersection of this cone of radiant energy with the assumed flat surface of the earth results in a hyperbola. In fact, as is well known, the intersection of the cone of radiation with the surface of the earth would result in a hyperbola even if line $l$ were not parallel to the earth's surface, as long as the angle between $l$ and the surface of the earth was less than the half angle at the cone tip.

The hyperbola formed as above and partly shown in the drawing as one of a series of dotted arcs, may thus be considered a curvilinear element of ground upon which a range scanning cycle is to be performed. Assuming that a range scanning action results in the progressive presentation of target echoes reflected along a hyperbolic arc, the angle of the cone may be increased. This variation of cone angle may be continuous and if so must be slow with relation to the range scanning speed along any one hyperbolic arc.

As the cone angle becomes larger, the line of intersection between the cone of radiant energy and the surface of the earth approaches line $YY'$. Finally the cone angle becomes 180° at which the height of the cone decreases to zero and the cone is merely a flat plane going through $YY'$ and perpendicular to $XX'$. The line of intersection is naturally $YY'$. As the antenna scanning action progresses, the plane is distorted to a cone on the X side of the $YY'$ plane and decreases in angle until finally a minimum angle cone is generated. Thus successive hyperbolic arcs are generated. While the drawing shows separate arcs are generated. While the drawing shows intersecting curves, it is understood that with a slow, continuous transverse sweep the actual variation of the cone is continuous even though slow so that an infinite number of arcs are actually generated.

As an example of the relative values of scanning along a hyperbolic arc of intersection and the movement of the arc to or from $YY'$, the following may be given. Thus along an arc, range scanning may be effected at the rate of between 500 and 2,000 times per second, this depending upon the maximum range of the system, power, etc. The conical sheet of radiation may go through from one extreme position on the $X'$ side to the other extreme position on the X side to form a half cycle of transverse scanning in something like ⅓ or ½ a second. In practice, by limiting the angle of transverse scan along $XX'$ to about 30° on each side of the origin, it has been found that the movement of the arc of intersection is small compared to the speed of range scanning along an arc.

In this connection, the angular thickness of the sheet of radiation as seen from the airplane becomes important. As applied to the drawing, the thickness of the conical sheet would determine the width of the so-called line outlining a hyperbolic arc. Naturally it is impossible to generate a conical sheet of radiation without having some thickness to the sheet or width as viewed along a line of intersection. The thicker the line of intersection between the conical sheet of radiation and the ground, the greater the angle subtended by this intersection from the plane. As a result, the thicker the sheet of radiant energy, the faster the scanning angle may be varied. In the example given above, it is possible to obtain a sheet of radiant energy having an angular extent of something of the order of about 1°. Hence it is important that range scanning along the arc of intersection be sufficiently rapid with reference to transverse scanning so that thorough, over-all scanning is effected.

As far as utility is concerned, scanning of the ground behind the plane, i. e. on the right of XX', is unnecessary. Thus the antenna system may be provided with suitable reflectors so that no scanning is effected in this region. In addition, scanning of the ground along the axis XX' is only necessary for a comparatively short angular range as viewed from the plane. As is evident from the curvature of the hyperbolic arcs, a scanning angle of about 30° from each side of the vertical along the XX' axis results in a substantial coverage when projected forward along the line of travel of the plane.

Assume for the sake of example that at any particular instant of time, the cone of radiation from line 1 is such that it extends to the right of the plane and intersects the earth along the solid line shown. Let P be the location of any point to be scanned at a particular instant, this point moving along the hyperbolic arc (shown in full line) representing the line of intersection between the cone of radiant energy and the assumed flat surface of the earth. B is the point on the X axis at which the hyperbolic arc containing P intersects it. Since the axis of the cone of radiation is line 1, parallel to XX' and directly overhead, it follows that angle $\alpha$ formed by the intersection of lines OA and AB will be the complement of the half angle of the cone. In other words, as shown here, the cone axis is line 1 prolonged, and the half angle of the cone is the angle formed by BA and the portion of line 1 going in the direction of X'. This angle $\alpha$ may for all practical purposes be considered as the scanning angle and, as previously pointed out, may be variable from a maximum of about 30° on either side of the origin.

As a matter of interest, it may be observed that asymptote S of any of the hyperbolic arcs will make with YY' an angle equal to angle $\alpha$ as above described. Thus, any desired hyperbolic arc may be drawn.

Referring again to point P, it is important that its coordinates with reference to origin O be provided in the airplane. Angle $\alpha$ and slant range AP are directly observable quantities but of no intrinsic value for map making. In order to get the $x$ and $y$ coordinates at point P, let $h$ be OA, the altitude of the plane, and $r$ be AP, the slant range. The $x$ coordinate of point P becomes $r \sin \alpha$. This is evident if geometric plane passing through line AP and parallel to the X axis is imagined. Such a plane will pass through the axis of the cone of which the sheet of radiation forms part. Considering the above plane, the intersection thereof with the YY' axis will give the $y$ coordinate of point P and this turns out to be the $\sqrt{r_2-h_2-x_2}$, in which $x$ is the X coordinate of point P.

In the above values of the coordinates of point P, it should be noted that $\alpha$, the angle of scan, varies quite slowly, i. e. may go through its complete cycle of values in between 2/3 and 1 second of time. $h$, the altitude, is practically constant or may vary slowly with relation to the speed of operation of the entire system and, in any event, is a definitely determinable quantity. The slant range $r$ varies very rapidly going from its minimum value $h$ up to a maximum value in a small fraction of a second, this being a function of the pulse repetition frequency.

It is thus evident that the operation of the system will be facilitated by providing sweeps across the face of the cathode ray tube which will at any instant delineate, on a reduced scale, the hyperbolic arcs representing the intersection of the sheet of conical radiation and the ground. This is shown in Fig. 2, corresponding lines and points being similarly indicated. It is understood that the hyperbolic arcs delineating the path of the sweep are not actually visible, as a rule, and that the system may be so adjusted that only targets having certain reflection characteristics will show up. For each hyperbolic sweep, the $x$ component of the instantaneous position of the beam on the screen of the tube will, as previously pointed out, be given by the expression $r \sin \alpha$. For all practical purposes, $\alpha$ may be considered constant during the time of one hyperbolic sweep, although slowly varying from one such sweep to another such sweep. $r$ itself, is a function of time rather than geometry, and is a parameter ordinarily taken care of by the fact that the instantaneous position of the beam on the screen is from the nature of things directly connected with the magnitude of $r$. Thus the $x$ component of the sweep in a simple modification of the system may be a substantially normal saw-tooth generator wherein the steepness of the voltage rise is varied as $\alpha$ changes.

The $y$ coordinate of the beam is the same as the $y$ coordinate for point P. Thus the sweep for determining the $y$ position of the beam will not be a linear function.

The $x$ coordinate may have positive or negative values and this will be taken care of in the cathode ray tube by reversing polarities. The $y$ coordinate need only be positive.

It is clear from Figs. 1 and 2 that as the hyperbolic arcs approach XX', there is a tendency for the arcs to be concentrated. This indicates that the resolution of the echo detection system is a minimum for ground directly below the plane. This is due to the slow rate of change of the slant range with respect to other linear dimensions for the region around origin O.

Inasmuch as the terrain directly below is of no great interest, it may be eliminated from the indicating screen by creating an artificial lower limit 5 for vertical beam travel. This may be accomplished by suitable gates and voltage biases.

The antenna system

Since the requirements and operation of portions of the entire system are determined in a large measure by the characteristics of the antenna system, this will be taken up first. In general, the antenna system comprises a wave guide having a series of dipoles in alined relationship, the arms of the dipoles being alined along the length of the wave guide. With high frequency energy flowing into the wave guide, the radiation pattern of the dipole system would be determined by the spacing between dipoles in terms of wave lengths. With a full wave length spacing, the radiation would be outwardly in a generally flat plane, assuming, of course, that the wave guide is straight. By varying the effective spacing in terms of the wave length between dipoles, the sheet of radiant energy is emitted in the form of a conical surface with the axis of the cone substantially coincident with the alined dipole arms. The greater the variation in effective spacing from a wave length, the narrower (at the cone tip) the conical beam of radiation will be. The conical nature of the sheet of radiation is due to interference patterns, as is well understood in the art.

It has been found that if the dipoles are arranged a wave length (as measured in the wave guide) apart, all dipoles being similarly arranged, the pattern of radiation includes objectionable side lobes. To overcome this, the system has dipoles spaced at half wave intervals (as measured in the wave guide) with adjacent dipoles being reversed in polarity. Thus the dipoles are all in phase at half wave length spacing. The resulting pattern is sharp and has substantially no side lobes.

While various means may be utilized for varying the effective spacing between adjacent dipoles, it is preferred to accomplish this by maintaining the dipoles relatively fixed and varying the phase velocity of the energy through the wave guide. This may be accomplished in a simple manner by varying the long dimension of the guide (the "b" side). This variation in guide dimension may be controlled by suitable motor-driven means so that a transverse scanning action is effected. In the system disclosed herein, the wave guide system is actually susceptible to feed from either end. Hence by feeding the wave guide from one end and going through a scanning cycle and then feeding through the other end and repeating the scanning cycle, a complete scanning over the entire transverse range of the system is possible.

Referring particularly to Figs. 3 to 5, a wave guide 10 is shown upon which a series of alined dipoles 11 are mounted. Wave guide 10 may have small side sections 12 and 13 and elongated portions 14 and 15 forming a generally closed system. Wave guide portions 14 and 15 are preferably coupled together by means of a suitable coupling block 16 which in its simplest form merely consists of a generally cube-shaped member having wave guide channels 17 and 18 intersecting at right angles to form a region 19 within the block. The block itself may be of any suitable material such as copper or brass and may be made in any suitable fashion, such as in two parts as shown in Fig. 4.

Wave guide sections 14 and 15 are adapted to fit on opposite sides of block 16 and may be coupled thereto by choke coupling members 20 and 21 described and claimed in detail in the copending application of Winfield W. Salisbury, Serial No. 489,844 filed June 5, 1943 issued October 19, 1948 as Patent No. 2,451,876. In general such choke sections utilize a half wave length distance between the edges of the wave guide proper and end of slot forming a metallic short. The other wave guide section in the block may have a feed section 23 for supplying high frequency to the system and a terminal energy absorbing section 24 having suitable material therein packed for absorbing radiant energy. Material 24 may be of some high resistance material such as carbon particles or sawdust, and is generally disposed in such a manner as to provide a tapering or slant surface 25, as shown.

Disposed within region 19 is a high frequency reflecting member 27. In its simplest form this may consist of a loop of metal, such as copper, adapted to have the desired dimensions for resonating to the frequency supplied by wave guide section 23. Instead of a loop, 27 may be a solid sheet of metal having suitable physical dimensions. Reflector 27 may have bearing pins 28 and 29 journaled in a suitable apertures in block 16 so that reflector 27 may operate in planes perpendicular to the short or "a" side of the wave guide. This reflector is adapted to assume one of two positions, as shown in Fig. 3, so that high frequency energy supplied by guide section 23 may be reflected into wave guide section 14, as shown, or into wave guide section 15 when the reflector is in the dotted line position.

Reflector 27 has the property of not only acting upon the main incident energy supplied from wave guide section 23 but also acting upon the energy that has already passed through the radiating system proper. Thus, as shown in full lines, reflector 27 operates on energy coming into guide section 23 by diverting it to wave guide 14 and thence through wave guide section 12 and 10. Whatever energy remains after having passed through the length of section 10, continues on to wave guide section 13 and then 15 and is then reflected by member 27 into absorbing material 24. Thus material 24 merely functions as a load for absorbing undesired energy, it being essential that radiation from member 24 back to reflecting loop 27 be reduced to a minimum. Actually, because of the comparatively small amount of energy left to be handled by material 24, some reflection may be tolerated without undue harm.

Reflecting member 27 may occupy either one of the two positions shown. It is highly desirable that reflecting member 27 should never be in a plane perpendicular to the axis of feed guide 23. In this position, substantially total reflection back into the oscillator portion of the transmitter will occur. This has an adverse effect on the stability of the oscillator particularly if a magnetron is used. To avoid this difficulty, reflector 27 is oscillated back and forth from one position to another and back again without going through the objectionable position referred to above.

A simple form for obtaining this movement is shown diagrammatically. Thus reflecting member 27 may have a driving rod 30 coupled to a cross-shaped member 31. Cross-shaped member 31 is adapted to be moved by pins 32 and 32a carried by gears 33 and 33a driven by a suitable motor 34. Gears 33 and 33a are driven through a gear 33b at half motor speed (for timing in relation to other motor driven parts). It is clear that by virtue of this movement reflector 27 may be timed so that it will be quickly moved back and forth over a 90° range and then left undisturbed during a scanning operation until the necessity for moving again arises.

Variable wave guide section 10 is shown in detail in Figs. 6 and 7. The view in Fig. 6 is a section transverse to the length of the wave guide. In practice, the entire structure may have a length of the order of between 10 and 20 feet and is preferably mounted transversely in an airplane so that under normal flying conditions the antenna system has an unobstructed view over the entire range to be scanned. The mounting of the system may be carried out in any approved manner and the antenna system itself may be disposed either in the leading edge of a regular or special wing section or any other desired portion. In practice, the antenna system will be enclosed in a suitable housing so shaped as to provide substantially unimpeded transmission of radiant energy. Such a housing may be made of Plexiglas and may if desired be double-walled and constructed in accordance with the principles disclosed in the copending application of Thomas J. Keary, filed May 18, 1944, Serial No. 536,142. The space between the housing walls may be traversed by heated air to prevent condensation or ice formation, all of which would have a deleterious action upon radiation characteristics. The antenna system proper, Fig. 6, consists of a suitable metal body 36 having an intermediate wall section 37 with side arm sections 38 and 39. This may be formed of any suitable metal such as aluminum or steel for structural strength or brass. Intermediate portion 37 is normally vertical when the plane is flying level and the antenna system properly adjusted. This intermediate portion has a central strip 40 constituting the wide side of a wave guide. Central strip 40 is bounded at one side, in this instance the bottom side, by a flange 41 having a slot 42 therein. Flange 41 preferably is high enough so that it is suitable for use as the small or "a" side of the wave guide. It is understood that in the event of central section 37 being made of steel or other material having poor conductivity that a suitable film of good conductive material such as copper will be disposed along the portion defining wave guide section 40 as well as flange 41 and also a region above 40 which will be explained later.

Cooperating with wave guide strip 40 is a wave guide bounding block 43 having a flanged portion 44 suitably slotted at 45. Movable block 43 is supported in the manner shown so that a strip 46 is opposed to guide strip 40, while flange 44 opposes flange 41. Movable block 43 is supported in such a manner that flanges 41 and 44, respectively, have small clearances 47 and 48 between moving and stationary parts. These clearances are exaggerated in the drawing and in practice will be something of the order of several thousandths of an inch. The dimensions of the flanges, clearances and slots 42 and 45 are such that a choking action results in accordance with the principles disclosed in the previously mentioned application of Winfield W. Salisbury. In general the slot depth is close to a quarter wave length while the distance of slot from wave guide edge is about a quarter wave length. Some compromise and testing is necessary, particularly for rectangular guides. Thus high frequency energy within the wave guide region bounded by surfaces 40 and 46 and flanges 42 and 44 will be confined to this region without any substantial loss by radiation even though metallic discontinuity around the perimeter of the section is present.

The showing of the support of movable member 43 is diagrammatic and in practice means will be provided for maintaining this member in alined, parallel relationship to wall section 37. It is understood that member 43 is moved transversely to its length, i. e. up and down as seen in Fig. 6. To this end, member 43 may have at spaced intervals throughout its length eye sections 50 through which a bolt 51 passes and engages a link 52. A forked link 53 is pivotally mounted as shown in the drawing to operate from side portion 38 and this link together with link 52 are connected together by a pivot bolt 55 to form a toggle link. It is understood that this toggle arrangement is repeated at suitable intervals through the length of the antenna system. Running the entire length of the antenna system is a drawbar 56 engaged by pivot bolt 55 so that the toggle may either be opened or closed. It is clear that if drawbar 56 is moved along its length that there will be a tendency for the toggles to move member 43 up or down and thus vary the long dimension of the wave guide.

Referring back to Fig. 3, drawbar 56 may be actuated from a cam follower 57 riding in a cam 58 of a disk 59 suitably rotated by motor 34. The shape of cam 58, as well as the characteristics of the entire linkage system, are such that the variation of wave guide dimension results in a scanning action from the antenna system whose variation with respect to time is substantially uniform. The actual rate of variation of guide dimension with respect to time may be irregular and must be engineered to correspond with the characteristics of the entire antenna system. This, of course, is a matter within the scope of anyone skilled in the art.

Antenna member 37 carries throughout its length, as indicated in Fig. 3, a series of dipoles 11, one of which is shown in detail in Fig. 8. As shown in Fig. 6, body portion 37 along wave guide strip 30 is provided with suitable apertures into which the individual dipole assemblies are mounted. The dipoles may be secured in any suitable manner either by threading into wall 37 or by a press fit or by soldering and are spaced a half wave length apart with reference to the wave guide interior.

Each dipole assembly, as shown in Fig. 8, comprises a short section of coaxial cable having an outer conductor 55 and an inner conductor 56. These two may be made of any suitable metal such as brass. Outer conductor 55 may have one end 57 reduced only as far as the outer surface is concerned, it being understood that the inner surface of outer conductor 55 is a substantially smooth cylinder. Outer conductor 55 has the other free end slotted longitudinally at 58 and 59, these two slots being diametrically opposed and so proportioned as regards depth and width as to constitute a choke section of that portion of the outer conductor containing slots 58 and 59. Rigidly carried by outer conductor 55 at the slotted ends thereof are the dipole elements proper consisting of fingers 60 and 61.

As is evident from Fig. 8, fingers 60 and 61 are in line and perpendicular to the plane of slots 58 and 59. One of the dipole fingers such as 60 stops at outer conductor 55, while the other finger 61 passes through outer conductor wall 55 to engage inner conductor 56. By virtue of the choking action of slots 58 and 59 in the dipole assembly, finger 60 is effectively energized by outer conductor 55, while finger 61 is effectively energized by inner conductor 56. It is understood that the various parts of the dipole assembly are suitably proportioned for the frequency to be used.

As shown in Fig. 6, the dipole assemblies are mounted in alined relationship with outer conductor 55 normal to wall section 37 and fingers 60 and 61 alined along the length of the antenna system. It is understood that adjacent dipole assemblies have reversed positions with regard to polarity. In other words, it is understood that finger 60 of alternate ones of the dipole assemblies will always be on the corresponding side of he entire dipole assembly. Inner conductor 56 constitutes a probe which is inserted to a predetermined depth into the variable width wave guide.

In order to direct the energy, wall section 37 carries a pair of metallic reflectors 63 and 64 above and below the alined dipoles. Reflector 63 below the dipole assembly may merely be a flat sheet, as shown, while reflector 64 may have a curved lip 65 at the top. The angle between reflectors 63 and 64, as well as the dimensions of the reflectors and the design of lip section 65, are such as to produce a reflection characteristic pattern generally known as co-secant squared. Such a pattern as viewed in the plane of the paper of Fig. 6, will direct the least amount of energy downward, i. e. vertically down as seen in Fig. 6, with the amount of energy increasing in accordance with the square of the angle going up to a horizontal position. The exact pattern does not necessarily have to follow the secant squared law. By suitable proportion of the reflector members a desirable pattern of radiation may be obtained. Thus as disclosed here, the radiation from the antenna system if straight ahead along YY' of Fig. 1 will be a minimum directly below to point O and increase along Y'. This is highly desirable since the slant range increases and thus requires more power to be radiated from the antenna system for target echoes of satisfactory intensity. For other scanning angles where the beam would lie along a curved, hyperbolic arc, the intensity will vary generally in accordance with the square of the Y ordinate.

The spacing of dipole assemblies 11 from each other is fixed at a half wave length as far as geometry is concerned. The dimension of the movable wave guide is chosen to obtain the half wave length at a desired point in its travel. As the variable wave guide changes its dimension, the effective phase angle between adjacent dipoles varies. Thus it may be provided that when the wave guide has its maximum width, i. e. when movable member 43 in Fig. 6 is in its highest position, the direction of propagation from the entire assembly is either straight ahead in the form of a flat sheet of radiation or preferably slightly cocked to one side, the sheet then having a slight curvature corresponding to a conical sheet of radiation with a very wide angle. As movable member 43 travels downwardly as seen in Fig. 6, the sheet of radiation if cocked to one side, for example the right side, will go through the straight ahead position where the sheet of radiation is a flat plane and then be bent into a conical sector sheet until finally the maximum scan angle is attained. This corresponds, of course, to the bottom position of movable member 43 with the wave guide having its smallest $a$ dimension. It is understood that when the term conical sheet of radiation is used that this is merely a simplification and assumes radiation from the dipole system without disturbance of the pattern due to reflectors or the supporting structure. Actually the radiation is in the form of a part or sector of a conical surface.

As has been previously pointed out, the maximum angle of scan may be any desired angle such as 30°. When this maximum angle has been reached, movable member 43 then begins to reverse its direction of travel and go upwardly so that the angle of scan begins to decrease. When movable member 43 has reached its top position, the angle of scan will have gone through its entire range, for example, −1° through zero to +30° then back again to zero and to −1°. One side may be considered positive and the other side negative. In this position, reflecting member 27 in the antenna system is suddenly turned so that the −1° scan angle is changed to a +1° scan angle and the entire scanning cycle continues from +1° to zero to −30° back again to zero to +1°. Thereupon reflector 27 is again turned and the entire cycle of scanning is repeated. By thus providing a sort of scanning toe-in, danger of a blind spot in front is eliminated. In fact, this double scanning of the 1° arc on each side of the straight ahead direction may be used for calibrating the system. Thus an object straight ahead should appear as one object on the screen if the sweeps and system are properly calibrated. In case of improper calibration, it is evident that an aberration will result, and the object may appear to be duplicated.

The location of the line of dipoles with reference to the wide side of the guide is a matter of experiment and over a certain range is not critical. Theoretically, the maximum intensity of radiation would be obtained if the dipoles were always in the center of the long side of the wave guide as this dimension varied. The practical realization of such a structure would involve complex mechanism of doubtful practical value. Ordinarily in a wave guide having no probes therein the electric vector magnitude varies generally sinusoidally with respect to the long side of the wave guide, the maximum intensity of the vector being at the center with zero intensity at the ends. The presence of the dipoles and probes tends to distort this sinusoidal distribution and generally tends to peak the curve toward the probe. Hence even when the probe is not at the center of wave guide section 40 as would be the case when member 43 moves, there is a tendency for the electric vector to be pulled toward the probes so that the asymmetric location of the line of probes 56 in the wave guide is compensated for. In practice, the dipoles may be disposed in the center of the wave guide determined by movable member 43 when it is somewhat short of its highest position. This, however, may be varied in a manner determined by the operating characteristics of the system.

It is clear that between wave guide 10 having a variable dimension and the rest of the wave guide system shown in Fig. 3, there will have to be a transition section approximately at points 63 and 64 shown in Fig. 3. Such transition sections are shown in Figs. 9 and 10. Referring first to Fig. 9, movable member 43 of variable wave guide portion may have at each end thereof a link 65 engaging a pivoted wave guide section 66. Pivoted wave guide section 66 is generally similar in structure to movable member 43 with the exception that section 66 is pivotally mounted at 67. At 67 wave guide section 66 merely turns and has very little if any motion with respect to the fixed wave guide 68. Pivoted section 66 may thus move around pin 67 as shown in dotted lines. As is true of movable section 43, pivoted section 66 is also provided with a choking slot 70. By suitable design of the various choking slots, leakage of energy between guide sections 43 and 66 may be reduced to a nominal figure. In fact, if desired, the opposing faces of these two wave guide sections may be suitably shaped so that one may rock on the other and thus provide for practically minimum clearance.

Another form of transition joint is shown in Figs. 10 and 11. In Fig. 10, movable member 43 cooperates with fixed flange 41 as shown in Fig. 6. This section is taken through an intermediate portion of the wave guide parallel to the long side. Referring again to Fig. 10, fixed flange 41 has a slot 71 formed in the end thereof, as shown, this slot having its short dimension extending transversely of the flange toward choke slot 42 and its long dimension longitudinally of the flange or parallel to slot 42. The dimensions of slot 71 depend upon the frequency at which the system operates as well as the range of movement of member 43. In general, however, it may be determined by simple experiment and may be varied within limits. Cooperating with the end of the variable guide is fixed guide 68' having at its end a fixture 72 consisting of a block of metal with a circular choking slot 73. This fixture 72 with its slot 73 is a form of choking flange disclosed and claimed in the co-pending application of Winfield W. Salisbury previously referred to. In this application, various forms of choke couplings are disclosed. In one form the couplings are bolted together, while in other forms a slight space between couplings may be tolerated. Thus in Fig. 10 the spacing between the end of wave guide 68' and its fixture 72 from the movable wave guide is determined by the teachings of the above application and provides the necessary mechanical structure for a transition between movable and stationary elements. Choke slot 73 is circular as shown in Fig. 11 and so disposed that the bottom is alined with fixed choke 42 while the top is intermediate the two extreme positions of choke slot 45 during the movements of member 43.

By virtue of the construction shown in Figs. 10 and 11, a sort of transformer impedance coupling is obtained. Thus the more-or-less fixed wave guide is coupled with the variable width guide over the range of variation. While the coupling may vary within the range of variation of the variable guide, the variation is not serious.

A simplified system

Fig. 12 shows a simplified system mostly in block diagrams. It is understood that unless otherwise specified the system in general contains components which are common to radar systems. Thus the entire system may be pulsed by any suitable means, such means being either incorporated in the transmitter or receiver or may be a separate circuit indicated in the drawing as a timer. Inasmuch as systems of this character are pulsed at frequencies of between 500 and 2000 per second, it is clear that the source of timing may be any oscillator having such a pulse repetition frequency. Thus the oscillator may be either a sine wave oscillator or a multivibrator generating substantially rectangular waves at this frequency.

An example of a sine wave oscillator which is particularly stable and useful for this purpose is the so-called Wien resistance-capacitance oscillator, an example of which is disclosed on page 505 of Radio Engineers' Handbook, by Terman, 1943 edition. An example of a multivibrator suitable for operation is shown on page 512 of this same book.

In order to utilize the timer and in accordance with well known practice, it is necessary to produce a sharp pip having a definite phase relationship with the original timer output. In the event that the timer oscillator generates sinusoidal waves, it is possible to pass the output through a distortion amplifier and generate square waves and thereafter peak the output and suppress undesired pips. With a multivibrator, the rectangular voltage output may be operated upon directly by a peaker and similarly used. Examples of such operation are disclosed in pages 177 to 180 of Ultra High Frequency Techniques, by Brainerd, Koehler, Reich and Woodruff, published in 1942.

The pips from the timer may be applied to the transmitter so that the latter is operated at proper intervals. The transmitter itself may be of the usual type adapted to generate a pulse of high frequency energy. This pulse of high frequency energy is communicated to the antenna system 75 by suitable connections such as wave guides, coaxial lines or open wire lines, in accordance with well known practice. While the transmitter is on, it is necessary to desensitize the receiver or disconnect the receiver from the antenna, and to this end a suitable switching means may be provided for accomplishing this. The receiver as shown may be connected to the same antenna system 75 or to another antenna if so desired, and the connection between the receiver and common antenna system 75 may include automatic switching means of the type well known in this art whereby during the time that the transmitter is on, the receiver is effectively cut off. Such switches may also provide as an additional feature the cutting off of the transmitter from the antenna during the time that the receiver is to operate between pulses. If desired, the receiver may have suitable means for desensitizing the same during transmitter operation, such means being adapted to be triggered by a pulse from the timer, and to this end the timer may have a suitable connection to the receiver.

Coincident with the triggering of the transmitter, it is necessary to initiate a sweep. As shown here, a sweep generator is triggered by the timer. It is understood, however, that this is merely exemplary and in practice it is possible to trigger the sweep generator from the transmitter or any other portion of the system in accordance with usual practice. The sweep generator may be of any suitable type such as shown on page 515 of the book by Terman previously referred to or on pages 183 and 186, inclusive, and pages 218 to 220, inclusive, of Ultra High Frequency Techniques or in Figs. 27 and 28 herein.

It is well known that either electrostatic or electromagnetic deflection sweeps may be used, and the change from one to the other is understood by those skilled in the art. For convenience and simplicity, an electrostatic sweep is herein disclosed. It is understood, however, that each pair of deflecting plates may be replaced by a pair of magnetic deflecting coils, and the only change necessary in the circuits will be to provide for the initial voltage to overcome the inductance and thereafter provide for current variation rather than voltage variation.

The output of the linear sweep generator may be designated as $r$ since it corresponds to the range of the system, and this output is fed in part to a scan potentiometer. This scan potentiometer is adapted to operate upon $r$ to vary its magnitude in accordance with the sine of angle of scan. While various means for obtaining a sinusoidal change of voltage are known, a simple means may be provided as shown. Thus, the output of the linear sweep generator may be fed to a resistance 76 over which a potentiometer wiper 77 is adapted to operate. This wiper may be carried on bar 78 having cam roller 79 spring-pressed against suitably shaped cam 80 driven by scan motor 34. It is understood, of course, that cam 80 is shaped and operates in time relation so that the potential of wiper 77 with respect to ground, or any other suitable reference point, is varied in accordance with the sine of the scan angle.

The potential taken from wiper 77 is thus $r \sin \alpha$ and may be impressed upon a suitable amplifier 81. An example of such an amplifier for an electrostatic type of cathode ray tube is shown on page 225 of Ultra High Frequency Techniques. Other amplifiers well known for this type of work may be used. In the event that the cathode ray tube is of the electromagnetic type, other circuits described in this book, such as on page 502, may be used. The output of amplifier 81 may be applied through a reversing switch 81a to the deflecting electrodes of a cathode ray tube 82, such deflecting electrodes in this instance being the horizontal plates 83 and 84 of an electrostatic type of tube. Thus the $x$ component of sweep may be provided.

In order to get the $y$ component of the sweep in cathode ray tube 82, the output of the linear sweep generator is also fed to a $r^2-x^2$ circuit 86 shown in a block but explained in detail later. The output of circuit 86 is fed to another circuit described as $r^2-x^2-h^2$ and indicated by numeral 87. In circuit 87, which is shown in detail later, the component $-h^2$ corresponding to the square of the altitude is added to the $r^2-x^2$ of circuit 86. The $-h^2$ voltage may be obtained in any suitable manner either by manual means, since the variation of altitude may be relatively slow, or by automatic means.

Thus one automatic means is shown and includes a Sylphon bellows 90 anchored to a base 91. Sylphon bellows 90 is well known as a flexible, sealed, metal container which may be suitably evacuated and supported by a spring inside to prevent collapse. Such a bellows will respond to variations in atmospheric pressure and in various forms are used in aneroid barometers. Thus bellows 90 may be carried in a plane in such a manner that the outside of this bellows is exposed to the atmosphere and when properly calibrated may be used to determine height accurately. The movable end 92 of bellows 90 may carry a rod 93 which is pivotally secured to another rod 94 pivoted at 95 to any fixed point and insulatingly carrying a potentiometer wiper 96. A spring 97 controlled by a thumb screw 98 may be used to calibrate the device. If desired, a suitable indicator cooperating with a scale may also be provided so that altitude may be read directly. However, such altimeters are well known in the art and need not be described.

Potentiometer wiper 96 cooperates with potentiometer resistance winding 100 having one end grounded and the other end connected through load resistor 101 to a suitable source of potential. Wiper 96 is connected by lead 102 to high resistance 103 having its other end grounded. Thus the potential existing across resistance 103 is proportional to $h$ or altitude of the aircraft. It is understood that resistance 103 is high in comparison to potentiometer resistance 100 so that the accuracy of the potentiometer is not seriously impaired. At two points on resistance 103, such as points 104 and 105, connections are taken off to a pair of grids 106 and 107 of a vacuum tube 108. This vacuum tube is of the tetrode type and has a cathode 109 connected to ground through a load resistor 110 and thus operating as a cathode follower. Anode 111 of this tube may be connected to a suitable source of potential such as B+ shown.

The potentials applied to grids 106 and 107 have such a relation in comparison to the amplification control of these grids that the final effect of one grid on the vacuum tube is the same as the other grid. Thus if grid 106 requires twice the voltage that grid 107 requires for the same effect on the space current, then points 104 and 105 on resistors 103 are so chosen as to maintain this relationship. This effect of both grids 106 and 107 must be multiplied in accordance with well known vacuum tube practice to obtain the output effect so that by proper design of the resistors 103 and proper choice of points 104 and 105, the current through vacuum tube 108 may be varied in accordance with the square of $h$. Hence the potential across cathode load resistor 110 will also vary directly as the square of the altitude. In place of a cathode follower, a conventional plate load resistor may be provided in which case the variation will be negatively as the square.

In place of this electrical system for obtaining a voltage in proportion to the square of the altitude, it is possible to have Sylphon 90 move arm 94 and wiper 96 over a specially wound potentiometer having non-uniform resistance so that a linear movement of the arm will result in a proper variation of altitude. Other methods involving the use of cams may also be used.

The output of circuit 87 is then fed to a square root circuit 112, also to be explained in detail later, and this output may then be fed to an amplifier 113 which may be similar to amplifier 81. Amplifier 113 may feed vertical deflection plates 114 and 115 of the cathode ray tube. Thus the $y$ component of the beam deflection is now provided.

The showing of connections between the amplifiers and deflecting plates is diagrammatic. In practice, additional amplifiers may be necessary and beam centering controls for both sets of deflecting plates would be provided as shown, for example, on pages 223 to 225, inclusive, of Ultra High Frequency Techniques previously referred to.

In order that targets may be indicated on the screen of tube 82, means may be provided whereby the beam is normally suppressed, but upon the occurrence of a target echo in the receiver, line 116 from the receiver feeds a positive target echo pulse to control grid 117 of a cathode ray tube to produce a momentary intensification of the beam. Other methods for intensifying the target echo may be provided.

Referring now to Fig. 13, there are shown some circuits elaborating on the block diagram of Fig. 12. Thus the linear sweep generator feeds its output $r$ to potentiometer 76. Wiper 77 is moved over this in accordance with the rotation of cam 80 so that the potential at wiper 77 corresponds to $r \sin \alpha$. The potential at wiper 77 is fed through a suitable lead 120 for use as the $x$ control of cathode ray tube 82. It is understood, of course, that this output is suitably amplified in amplifier 81, as previously referred to.

The potential at wiper 77 is also applied through an isolating cathode follower stage to potentiometer 122. In this, as in other similar instances it may be desirable to isolate one potentiometer from another as far as current flow is concerned. This is for the purpose of preventing distortion in potentiometer characteristics due to the creation of parallel resistance paths. A cathode follower stage may be used since the grid can be so biased as to draw no current. Furthermore phase inversion is avoided and loss of amplification may be made up later. In this instance, wiper 77 goes to grid 77a of a vacuum tube 77b whose anode 77c may be connected to a suitable source of B+ potential. Cathode 77d is connected to potentiometer 122, over which a wiper 123 plays.

Wiper 123 moves with wiper 77 so that the potential of wiper 123 with reference to the potential across resistance 122 is multiplied by $\sin \alpha$. Thus the output at wiper 123 has a value corresponding to $r \sin^2 \alpha$ or since $x$ is equal to $r \sin \alpha$, then the output is equal to $x \sin \alpha$. This output may be applied through an isolating stage to cathode load resistance 124. Thus wiper 123 is connected to grid 123a of vacuum tube 123b whose anode 123c is connected to B+. Cathode 123d is connected to load resistance 124 which resistance may also be connected to cathode 125 of vacuum tube amplifier 126. In the event that the potential at cathode 125 is too high for convenient amplifier use (due to cathode follower action), it is understood that cathode 125 may be connected to a point on resistance 124 nearer ground. Vacuum tube 126 has its control grid 127 connected to the output of the sweep generator so that a voltage $r$ is effectively applied thereto. Amplifier 126 has its anode 128 connected to a cathode 130 of a vacuum clamping tube 131, whose anode 132 is connected to a suitable source of B+ potential. Vacuum tube 131 has its control grid 134 connected to a source 135 adapted to supply a negative square gate shown during the time that the sweep is to make a complete journey.

Just when the sweep starts, which may be when the transmitter begins to operate, a negative gate is applied to grid 134, this negative gate being sufficient to drive tube 131 to cutoff. The duration of this negative gate is sufficient to accommodate the longest range of the system and this naturally will be less than the complete time interval between successive transmitter pulses. It is understood that in the event that an electromagnetic type of control is used on the cathode ray tube, some time displacement between the transmitter pulse and the sweep may be necessary. Thus it is customary to start electromagnetic sweeps slightly ahead of the transmitter pulse so that the effects of inductance may be overcome and the actual generation of beam controlling field may be initiated at the same time as the transmitter is operating. This, however, is well known in the art and no detailed description is necessary.

The gate may be supplied by a biased multivibrator triggered from the timer. Such a multivibrator is illustrated on page 176 of Ultra High Frequency Techniques referred to above.

Connected across the cathode and anode of vacuum tube 131 is a condenser 136. From the cathode terminal of condenser 136, a coupling condenser 137 is connected to control grid 138 of a vacuum tube amplifier 139. Control grid 138 may have its grid circuit completed by a suitable resistor 140 to ground while cathode 141 of the vacuum tube is provided with a suitable bias resistor 142 to ground. Tube 139 has its anode 143 connected through a load resistance 144 back to the B+ lead. Anode 143 is also connected to a potentiometer 145 across which is connected a suitable source of potential 146, here shown as a battery but which may be any suitable source with the polarities as indicated, namely the negative polarity immediately adjacent anode 143. Cooperating with potentiometer winding 145 is a wiper 148 whose position is controlled by a suitable control mechanism diagrammatically shown as 150, which is adapted to set wiper 148 in accordance with the square of the altitude of the plane. Such mechanism may be Sylphon actuated as shown in Fig. 12 and provided with a suitable cam arrangement to square the altitude.

Potentiometer wiper 148 is connected back to anode 143 through a condenser 150 and is also connected to the positive terminal of a suitable source of potential 151, here diagrammatically shown as a battery. The negative terminal of potential source 151 is connected down to control grid 153 of vacuum tube 154 whose cathode 155 is grounded through a suitable bias resistor 156. Tube 154 has its anode 157 connected through load resistor 158 to lead 159 going to a suitable source of B+ potential. Another vacuum tube 160 has its cathode 161 connected to cathode 155 of tube 154 while its control grid 162 is connected to anode 163 of a pentagrid tube and thence through a suitable load resistor 164 to the B+ terminal. Tube 160 has its anode 165 connected through load resistor 166 to wire 159 while the anode itself is connected through condenser 167 to two series-connected resistances 168 and 169. An intermediate point 170 between these resistors is grounded while the end terminal of resistance 169 is connected through a condenser 172 back to anode 157 of tube 154.

Resistance 169 also has its terminal connected by lead 173 to No. 1 and No. 3 grids 174 and 175 of a pentagrid tube 176. Cathode 177 of this tube is grounded and is also connected to suppressor grid No. 5, 178. Grids Nos. 2 and 4 (179 and 180, respectively) are connected together and by a lead are connected through a resistance 181 to junction point 182 between grounded resistance 183 and a resistance 184 going to B+. Lead 173 has connected thereto a $y$ output lead 186 which is adapted to go to a suitable amplifier such as amplifier 113 of Fig. 12 and thence supply $y$ deflection potentials to the cathode ray tube.

A suitable reversing switch is provided in the leads giving the $x$ deflection so that when the scan angle $\alpha$ is positive, the sweep is applied in one direction and when the scan angle is negative, the sweep is applied in the reverse direction. Thus in Fig. 12, a reversing switch in the leads to plates 83 and 84 is provided, said switch being actuated by scan motor 34 just when the scan angle changes, namely when reflecting member 27 of Fig. 5 is turned.

The operation of the circuit of Fig. 13 will now be explained. As has been previously pointed out, there is impressed upon cathode 125 of vacuum tube 126 a bias potential which is effectively proportional to $x \sin \alpha$. On the control grid of this tube there is impressed a potential which is proportional to $r$. Ordinarily, vacuum tube 131 functions as a clamping tube to short circuit condenser 136 and normally retain anode 128 of vacuum tube 126 at a fixed potential. Upon the occurrence of a negative gate at terminal 135, vacuum tube 131 is cutoff and condenser 136 begins to charge. The current through condenser 136 will be controlled by the space current passing through tube 126. This space current will be proportional to the difference between the grid potential $r$ and the cathode potential $x \sin \alpha$ or $r \sin^2 \alpha$. It is understood that the polarity of the potentials applied to the grid and cathode of tube 126 are such that this differential is obtained. Thus by having grid 127 go up as $r$ goes up and having cathode 125 varied above ground in accordance with the value of $r \sin^2 \alpha$, the proportionality pointed out above will result. The proportionality factor naturally involves the amplifying factor of the tube as well as the actual relative value of the two biases on the control grid and cathode. By proper design of the resistances and potentials, the space current through vacuum tube 126 may thus be made proportional to the product $r(1-\sin^2 \alpha)$. This current will charge condenser 136 and the voltage across condenser 136 will correspond to the time integral of this function. For the purposes of integrating this function, $\sin \alpha$ may be assumed to be constant so that the current into the condenser, for all practical purposes, at any instant may be assumed to be proportional to $-r(1-\sin^2 \alpha)$ during the time of integration. The minus sign is due to face reversal in tube 126. Since the time of integration or the charging of condenser 136 is less than the time between successive transmitter pulses and as has been pointed out before small in comparison to the rate of variation of angle $\alpha$, this assumption does not detract materially from the accuracy of the operation. The integral of this function which corresponds to the voltage across condenser 136 is therefore proportional to $-(r^2-x^2)$. Contents of integration are eliminated by blocking condensers while amplification may control the factor of proportionality.

Since the high side or B+ side of condenser 136 is assumed to be constant, the variable potential side of condenser 136 is applied through blocking condenser 137 to control grid 138 of amplifier 139. This is merely a conventional amplifier and serves to reverse the sign of the voltage variation across condenser 136 as well as amplify it in a suitable manner. It is understood that condenser 137 together with grid resistance 140 should be so chosen as to involve a minimum of distortion of the potential across condenser 136. This preferably may take the form of a low capacitance value for condenser 137 and a high resistance for grid resistor 140. Thus at anode 143 of vacuum tube 139, a potential appears which is proportional to $(r^2-x^2)$. To this is added the minus $h^2$ potential due to the potentiometer 145 and its wiper 148. A by-pass condenser 150 across the negative $h^2$ potential is provided in order to prevent damping of the output of tube 139.

The additional potential source 151 may be provided in order to locate the operating point of grid 153 of tube 154 for proper operation of this tube. Thus upon the grid of tube 154, there is effectively impressed a voltage proportional to $r^2-x^2-h^2$.

Vacuum tubes 154, 160 and tube 176, together with their associated connections and circuit elements, constitute a square root extraction circuit shown in block in Fig. 12. Vacuum tubes 154 and 160 operate as a differential amplifier in such manner that the potentials on the two control grids of these tubes tend to become equal. Thus the $y^2$ potential impressed upon control grid 153 would, with a fixed cathode potential, result in $y^2$ variations at the anode. In this discussion, only the variable voltages will be considered and proportionality factors will be disregarded. However, the potential at the anode of tube 154 is communicated to the two grids 174 and 175. These two grids preferably have substantially equal effects on the space current through the pentagrid tube so that the resultant effect at anode 163 of tube 176 is to cause potential variations to appear which are proportional to the square of the potential variations in grids 174 and 175.

The resistance network is merely to bias the grid at the proper operating point. In the event that the two grids do not have the same operating potentials, they may be connected on a voltage divider in a manner similar to the connections for tube 108 in Fig. 12.

The remaining grids merely control the dynamic characteristics of the tube. Tube 176 may be of the type marketed under the No. 6SA7 or any other suitable type.

The potential variations at the anode of tube 176 are impressed on control grid 162 of tube 160. Thus the common cathode connection through resistance 156 tends to cause the cathodes of these tubes to follow the grids to some extent so that while a potential proportional to $y^2$ is applied to control grids 153 and 162, the anode potential at these tubes is substantially proportional to $y$ or the square root of the grid potentials.

Instead of adding the $-h^2$ term as shown in Fig. 13, a system of voltage addition or subtraction may be used as disclosed and claimed in the co-pending application of Andrew B. Jacobsen, Serial No. 523,942, filed February 25, 1944, now abandoned. Thus Fig. 14 shows how Fig. 13 may be modified to incorporate the invention disclosed and claimed in the above-identified application. The $r^2-x^2$ output appearing at anode 143 of tube 139 may be applied to control grid 190 of a vacuum tube 191 having its cathode 192 connected to ground through a load resistor 193. Thus vacuum tube 191 functions as a cathode follower. The anode, 194, of this vacuum tube is connected by a lead 195 to a source of B+ potential. The $h^2$ potential developed across resistance 110 from the circuit shown in Fig. 12 may be applied to control grid 197 of a vacuum tube amplifier 198, whose cathode 199 is connected to ground through a suitable bias resistor 200. Tube 198 has its anode 201 connected through a suitable load resistance 202 to B+ potential. Anode 201 of vacuum tube 198 and cathode 192 of vacuum tube 191 are connected together through a resistance network here shown as consisting of resistances 204 and 205. The differential output may be taken at a suitable point 206.

The operation of this circuit is as follows. The $r^2-x^2$ voltage applied to control grid 190 results in a voltage which is proportional to $r^2-x^2$ developed across load resistance 193. The $h^2$ voltage applied to control grid 197 results in a negative variation of potential at anode 201 which is proportional to $h^2$. It is assumed, of course, that both vacuum tubes 191 and 198 are operated upon their linear portions of their characteristic curves. The outputs of these two tubes are combined in the resistance network 204 and 205 and by the proper choice of point 206, it is possible to obtain an output which is proportional to the difference between the voltage inputs of the two tubes.

In place of battery 151 in Fig. 13, it is possible to substitute the voltage combining system shown in Fig. 14. Thus the $r^2-x^2-h^2$ output could be fed into the control grid of a tube corresponding to 191. The second tube corresponding to tube 198 in Fig. 14 would merely have a constant bias applied to the grid. Thus the output would be differentially combined. It is also possible in this instance to replace the upper tube corresponding to tube 198 with a simple resistance since the input is a steady voltage. In the use of such a system, it may be necessary to have separate grounds and power supplies so that the desired negative potential below other grounds may be provided. This, however, is well within the skill of the average worker in this field.

In place of the circuit of Fig. 13 for obtaining the quantity $r^2-x^2$, it is also possible to merely generate a voltage corresponding to $r^2$ by feeding the $r$ voltage into a squaring circuit. Then $r \sin \alpha$ or $x$ generated at wiper 77 of Fig. 13 may also be fed into a squaring circuit. Then $r^2-x^2$ may be combined by feeding the same into the system of tubes and connections shown in Fig. 14, it being understood that tubes 191 and 198 are referred to.

*Rolling, yawing and blurring compensation*

Fig. 15 illustrates the effect of rolling of the aircraft. This figure shows a vertical elevation in a plane parallel to the $x$ axis, which axis lies along the ground as previously noticed. The position of the antenna is again shown at 1 having its center at A and being inclined to the horizontal AM at the angle $\delta$. A reflecting object which it is desired to consider is indicated at P. The line AN is drawn perpendicular to AL through A. The horizontal line AM will then have a length equal to $r \sin \alpha \sec \delta$, and because of the parallelogram relation, this length will also be the length of the line P'N. The line ON will have the length $h \tan \delta$. Thus the $x$ coordinate of P, represented on Fig. 15 by the line OP' will therefore be equal to $r \sin \alpha \sec \delta + h \tan \delta$. The $y$ coordinate of the point P will still be equal to the square root of $(r^2-x^2-h^2)$ but it is to be noted that in this expression the new value of $x$ is to be used rather than the value previously derived.

Fig. 16 indicates the effect of yawing of the aircraft. The line 1 again indicates the orientation of the antenna array, but the view is in this case a plan view in which the dimensions $x'$ and $y'$ represent the coordinates referred to the orientation of the antenna and the coordinates $x$ and $y$ represent the coordinates referred to the track of the aircraft, and $\epsilon$ is the angle from $x$ and $y$. The expressions for obtaining $x$ and $y$ in terms of $x'$ and $y'$ are the well known relations:

$$x = x' \cos \epsilon + y' \sin \epsilon$$
$$y = -x' \sin \epsilon + y' \cos \epsilon$$

A system for embodying the corrections due to rolling and yawing is shown in Fig. 17 and will now be explained. The rolling described in Fig. 15 is transverse to the line of flight of the plane. Rolling of the plane around a transverse axis or, so-called pitching, within substantial limits, will have no effect upon the operation of the system. This is because the radiation pattern may have an angular coverage more than 90°, or even if the coverage is only about 90°, pitching will only effect the end of the pattern of radiation taken in a vertical, geometrical plane.

Referring, therefore, to Fig. 17, the linear sweep generator may feed its output $r$ into potentiometer resistance 215. Cooperating with this resistance is a wiper 216 which is driven by cam 80 so that its motion is proportional to $\sin \alpha$. Wiper 216 is connected to grid 216a of vacuum tube 216b. Tube 216b has its anode connected to a suitable source of B+ potential, while its cathode 216c is connected to potentiometer resistance 217 over which a wiper 218 plays. Wiper 218 is actuated by secant cam 220 whose position is controlled by a transverse gyroscopic system 220a adapted to move cam 220 through an angle $\delta$. Such gyroscopic systems are well known and need not be described in detail. Secant cam 220 obviously need operate over an angle corresponding to a comparatively small range of variation of $\delta$. Excessive angular movement of the plane such as might occur during a steep bank need not be compensated for since the scan angle itself is only 30°. Hence the value of the secant over the desired range of angular correction is a finite quantity.

Secant cam 220 is so cut that it is symmetrical with respect to a zero value for angle $\delta$. Positive and negative values of angle $\delta$ may correspond to values of secant in the first and fourth quadrants. Since the sign of this function does not change, the simple control disclosed may be relied upon.

Wiper 218 is connected through a reversing switch 219 to a junction point 219a. From point 219a, a potentiometer resistance 221 is provided and this resistance is connected to battery 223. It is understood that instead of battery 223 suitable connections may be made on a power supply. Cooperating with potentiometer resistance 221 is a wiper 225 whose position on resistance 221 is controlled by a Sylphon bellows 226 responsive to altitude $h$ in a plane. Like bellows 90 in Fig. 12, bellows 226 may be suitably calibrated so that the position of wiper 225 on resistance 221 is a direct function of altitude. Wiper 225 is connected to grid 225a of vacuum tube 225b. This tube has its anode 225c connected to the positive terminal of a suitable source of potential, here shown as battery 225d while the negative terminal is connected to junction 219a. Tube 225b has its cathode 225e connected through a load resistance 227 over which a wiper 228 plays. A by-pass condenser 229 is connected between wiper 228 and junction 219a. Wiper 228 has its position controlled by a cam roller 230 cooperating with a tangent cam 231, this cam also being controlled by transverse gyroscope 221.

Tangent cam 231 is cut so that wiper 228 will be moved the same amount for the same angle of $\delta$ on either side of a neutral point corresponding to a $\delta$ angle of zero degrees. In this instance, the sign of the tangent does not change with the function being zero when $\delta$ equals zero. In order to provide for this change of sign, reversing switch 219 is so coupled to cam 231 that the polarity of the output of potentiometers 221 and 227 is controlled to either add to or subtract from the voltage at wiper 218 depending upon $\delta$ being positive or negative. It is clear that the combination of potentiometers effectively multiplies $h$ by tangent $\delta$. The function of by-pass condenser 229 is the same as that of condensers 150 in Fig. 13.

From wiper 228, a lead 233 goes through reversing switch 219 to junction 234 from which point a connection to control grid 235 of vacuum tube 236 is provided. This vacuum tube corresponds to vacuum tube 126 in Fig. 13. Tube 236 has its cathode 237 connected through a suitable resistor 238 to ground. The upper or cathode end of resistor 238 is also connected to cathode 238a of a vacuum tube 238b having an anode 238c connected to a suitable source of B+ potential. Tube 238b has its control grid 238d connected to wiper 239 operating over a potentiometer resistance 240. Wiper 239 is mechanically connected so that it moves simultaneously with wiper 218 and thus effectively introduces a secant δ factor. Potentiometer resistance 240 is connected to cathode 240a of a vacuum tube 240b having an anode 240c connected to a suitable source of B+ potential. Tube 240b has its control grid connected to wiper 241 operating over a potentiometer resistance 242 connected to junction point 234. Wiper 241 is moved by cam 80 so that the factor sin α is introduced.

Tube 236 has its anode 245 connected to cathode 246 of a clamping tube 247. Tube 247 has its control grid 248 connected so that a negative gate may be impressed thereon in exactly the same manner as control grid 134 of Fig. 13. Tube 247 has its anode 250 connected through a load resistance 251 to anode 252 of an amplifier 253 corresponding to amplifier 139 of Fig. 13. Tube 253 has its cathode 254 connected through a suitable bias resistance 255, while the control grid 256 is connected to ground through a suitable grid resistor 257. Between cathode 246 and grid 256 is a blocking condenser 258, while across the cathode and anode of tube 247 is condenser 259 functioning in precisely the same manner as condenser 136 of Fig. 13.

Connected to anode 252 is a negative pole of a battery 260 across which is connected a potentiometer resistance 261 over which a wiper 262 operates. A by-pass condenser 263 is connected across from the negative terminal of battery 260 to wiper 262. Wiper 262 is actuated so that its position on potentiometer resistance 261 is a function of the product of the square of tangent δ and the square of the altitude. To this end, wiper 262 may be initially actuated by a cam 265 whose rotary position is controlled by a bellows 266 responsive to altitude, it being understood that cam 265 is so cut that the linear response of bellows 266 is converted to a squared response. This altitude control is itself actuated by another cam 267 driven from the transverse gyroscope, it being understood that cam 267 is so cut as to square the response of the tangent. There is no question of algebraic sign in this part of the system.

Added to the potential of wiper 262 is that present in wiper 263a cooperating with potentiometer resistance 261a connected across battery (or other source of voltage) 260a, the resistance and battery being in series with resistance 261 and battery 260. Wiper 263a is driven by cam 265a actuated by Sylphon 226. Cam 265a is similar to cam 265 and provides an h squared response of wiper 263a to simple altitude variations.

From wiper 262 a connection 270 goes down to a circuit 271 for extracting the square root. This circuit may in one simple form be the same as that portion of Fig. 13 comprising tubes 154, 160 and 176 and their connections. The output of square root extractor 271 is fed to a potentiometer 272 over which a wiper 273 moves, wiper 273 being operated mechanically by cam 274. Cam 274 is cut to provide a cosine factor, the angle of this cosine being ε and being controlled by directional gyroscope 275. Wiper 273 is connected to control grid 276 of amplifier 277 whose cathode 278 is connected back to wiper 280 operating over potentiometer resistance 281 having an intermediate point 282 grounded. Center point 282 is also connected to cathode 283 of phase-reversing tube 284. Tube 284 has its anode 285 connected to a suitable source of potential which in this instance may be marked B'+, while the negative terminal of this source of potential may be connected to the bottom end of potentiometer resistance 281.

Wiper 280 is mechanically actuated by a cam 287 cut to provide a sine movement corresponding to sine of ε and, as shown in the drawing, is driven by directional gyro 275. Since the sine changes its algebraic sign, for positive or negative values of ε, the center tapping of potentiometer resistance 281 is provided. The top end of potentiometer winding 281 is connected to junction point 288 and to this point control grid 289 of tube 284 is connected. From junction point 288, a potentiometer resistance 290 goes to ground and over this resistance a wiper 291 operated from cosine cam 274 is adapted to play. Wiper 291 is connected through a resistance 292 to a lead 293 providing the $x$ output to the cathode ray tube.

The output of square root extractor 271 is also fed to a junction point 295 from which point a connection goes to control grid 296 of phase-reversing tube 297. This tube has its anode 298 connected to a suitable source of B+ potential, here indicated as B"+, while cathode 300 is grounded through intermediate point 301 of potentiometer resistance 302. The high side of this resistance is connected to junction 295, while the low side is connected to B"−. Playing over this resistance is a wiper 303 mechanically actuated by sine cam 287 and the output of this wiper is passed through resistance 304 to lead 293.

Amplifier 277 has its anode 306 connected through a load resistor to a suitable source of B+ potential and also to a suitable potentiometer 308 shunted by battery 308a. Potentiometer 308 has wiper 309 operating thereover, which wiper is mechanically moved by cam 310 so that the output of potentiometer 308 is gradually varied over a period of time in accordance with the ground speed of the plane. Thereafter the wiper is returned quickly and the cycle is repeated. The operation of this portion of the system will be explained in connection with the operation of Fig. 17.

The operation of the upper portion of Fig. 17, namely down to lead 233, has been previously explained and in general is similar to the operation of that portion of the system of Fig. 13 which provides $r$ voltage to control grid 127. In Fig. 17, the simple $r$ term has been expanded as explained in Figs. 15 and 16. Thus, the potentiometer 215 multiplies $r$ by sine α, while potentiometer 217 multiplies again by secant δ. Potentiometers 227 and 221 introduce the term $h$ tan δ with due regard for the algebraic sign. Potentiometers 240 and 242 of Fig. 17 introduce the factors sin α secant δ. The operation of tube 236 and tube 247 is the same as tubes 126 and 131 of Fig. 13. Across condenser 259 the potential varies in accordance with the expression shown, namely $r^2 - x^2 \sin \alpha \sec^2 \delta$. Amplifier 253 operates in precisely the same manner as amplifier 139 of Fig. 13. However, at anode 252 of this amplifier, the term to subtract is not merely $h^2$ but must be $h^2 + h^2 \tan^2 \delta$. The latter portion of the term $h^2 \tan^2 \delta$ is supplied by the movement of wiper 262 over potentiometer resistance 261, while the former term $h^2$ is supplied by wiper 263a.

The square root of the output coming into lead 270 is then extracted in circuit 271. The output of square root extractor 271 may be considered as giving the $y$ component of the sweep corrected for rolling in accordance with Fig. 15 but not yet having the correction for yawing for Fig. 16. Similarly, at wiper 239 the voltage there may be considered as the $x$ component corrected for rolling in accordance with Fig. 15 but not having the correction for yawing of Fig. 16. The circuits of tubes 284 and 297 are to provide the correction for yawing.

It is clear that the $x$ output from wiper 239 has a cosine factor multiplied into it by operation of wiper 291 on potentiometer 290. At the same time, to this is added or subtracted, as the algebraic sign requires, the $y$ output from 271 multiplied by the sine of $\epsilon$. Both tubes 297 and 284 are potential inverters so that the negative or bottom terminal of each of the intermediate-tapped potentiometer resistances will be as far below ground as the grid ends of these resistances are above ground. Thus the negative terminal of the power supply will vary in potential with respect to the fixed ground. Other means for obtaining this effect may be provided by well-known systems such as are used, for example, in circuits for providing push-pull amplifiers for cathode ray deflections.

Thus wiper 291, as pointed out before, provides the term $x \cos \epsilon$, while wiper 303 provides the term plus or minus, as the case may be, $y \sin \epsilon$. Resistances 292 and 304 merely constitute a simple and well-known method of algebraic addition of potentials, this giving one half the average which half may be made up by suitable amplification. Similarly, wiper 280 provides $x \sin \epsilon$ with the proper algebraic sign, while wiper 273 brings in the $y \cos \epsilon$ term. These two terms are combined in tube 277 in an additive manner, it being obvious that potential variations of the grid and cathode of tube 277 add algebraically.

Figure 18:
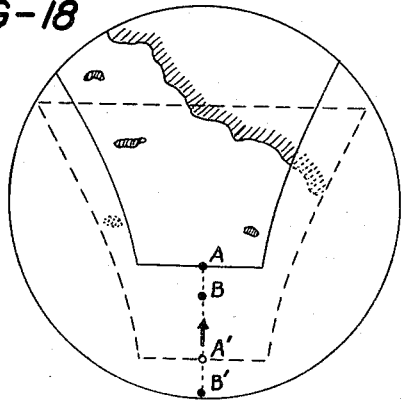
Fig. 18 is a schematic showing of a screen of a cathode ray tube for the purpose of illustrating the effect of compensation for the forward movement.

The output of tube 277 ordinarily would be the $y$ output with suitable compensation for the type of movements shown in Figs. 15 and 16. However, in addition to that, there must be considered the normal movement of the airplane over the ground. With such a movement, the entire picture on the screen would be changing constantly resulting in blurring so that it would be difficult to use for bombing or other purposes. Such a variation of picture is shown in Fig. 18 with the dotted sector representing the screen at one instant and the full line sector representing the screen at a later instant.

In order to maintain as much of the picture as possible stationary, means are provided for imposing a slow, steady bias on the vertical or $y$ deflection plates. This slow bias is so adjusted with reference to ground speed that as much of the picture as remains on the screen will be stationary. It is clear that as the airplane moves forward that the bottom of the picture corresponding to the ground either directly below the plane or a short distance in front of that portion of the ground will become obliterated. Thus, in time, the entire picture would be removed from the screen. The duration of this fixation of image will depend naturally upon the ground speed of the plane and upon how much of the original picture can be given up or obliterated before starting again. When this cycle is begun again, the initial voltage conditions normally present across the $y$ deflecting plates are again present and the entire picture is presented. The means shown in Fig. 17 consisting of potentiometer 308 and battery 308a is merely symbolic. As has been previously pointed out, the cathode ray tube is preferably provided with means for controlling the centering of the beam in both $x$ and $y$ directions. Hence a simple means for stabilizing the picture against movement due to the plane over a certain amount of ground may be provided by moving the $y$ centering control gradually to compensate for ground covered until a desired point has been reached and thereupon restoring quickly the control to its initial position and repeating this performance.

The $\delta$ and $\epsilon$ corrections may include not only the corrections for roll and yaw of the aircraft but they may also include a constant term corresponding to the fixed angle, if any, between the position of the antenna as mounted on the aircraft and the horizontal direction perpendicular to the longitudinal axis of the craft during level flight. Thus if the antenna is mounted in the leading edge of one of the ordinary wings of the craft, the angle $\delta$ will include a constant term equal to the dihedral angle of the wing and the angle $\epsilon$ will include a constant term, corresponding to the sweepback angle of the leading edge.

When it is desired to change the stabilization for yaw to a new reference direction, as when the craft changes course, it will be necessary to change the control of reference direction, which may be done either by means for changing the axis of the gyroscopic device or by means for introducing a modification of the control exercised by the gyroscopic device. The latter type of means are known as "resolvers" and various types of such devices are known to the art.

Bombing problem

Figure 20:
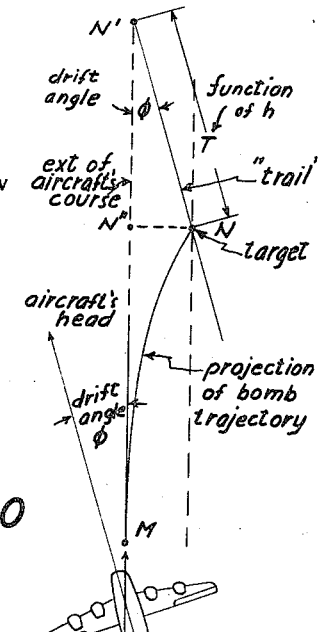
Fig. 20 is a diagram illustrating certain conditions of the problem of bombing a target from an aircraft.

Fig. 20 illustrates the geometry of the bombing problem and represents a plan view of the scene of operations. The line MN' represents the actual direction of movement of the aircraft which makes the angle $\phi$ with the direction of the longitudinal axis of the aircraft. The angle $\phi$ may therefore be called the drift angle. The target is located at N and the curved line MN indicates the horizontal projection of the bomb trajectory. M is the point at which the bomb is released and N' is the location of the aircraft when the bomb hits the target. The distance NN', denoted as T, is known as the "trail" of the bomb. This distance and the time of fall of the bomb are functions of the altitude and of the type of bomb, the values of which for different altitudes may be calculated beforehand and provided in the form of tables. It will be noted that the line NN' is parallel to the direction in which the aircraft is heading.

If the speed of the aircraft in the direction MN' is denoted as Y', the distance MN' will be equal to Y'$t_f$, where $t_f$ is the time of fall of the bomb previously mentioned. The proper release point M may be determined by means of the distance MN'', which may be denoted as $Y_c$ and is equal to Y'$t_f$ − T $\cos \phi$ and the distance NN'', which may be denoted $X_c$, is equal to T $\sin \phi$.

Figure 21:
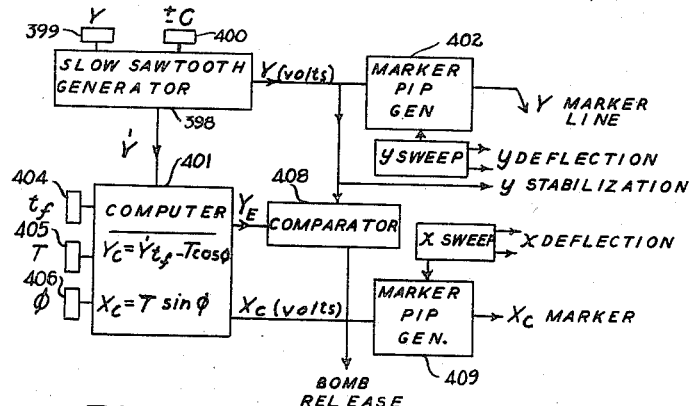
Fig. 21 is a block diagram of apparatus for obtaining the release time for bombing a target with the help of the present invention.

Fig. 21 illustrates the organization of a system for determining the release point M in connection with apparatus of the present invention. In connection with Fig. 20, X and Y are to be taken as denoting the coordinates of the target referred to the actual direction of motion of the aircraft with respect to the ground, Y' as the rate of change of Y, or the ground speed of the craft, (assuming the target has no proper motion), and $x$ and $y$ represent the sweep voltages as corrected to provide a stable indication with the $y$ axis corresponding with the direction Y and the $x$ axis corresponding with the X direction.

The block indicated at 398 and labelled "slow saw-tooth generator" is a device or circuit adapted to produce a slowly linearly changing voltage, the rate of change of which may be adjusted by knob 399 and the absolute or reference value of which may be adjusted by knob 400.

It may also be a motor driven potentiometer. The rate of change and reference value aforesaid are adjusted to provide a voltage which is adapted to stabilize the cathode ray tube indication in the direction as described in connection with Fig. 18.

As previously mentioned, this may be done by a method of trial and error, such a method requiring usually two or three adjustments or so, which may be readily performed. The making of these adjustments is explained in the said patent application of B. L. Havens. The position of knob 399 when the adjustments thereof have been made, is indicative of the quantity Y' and is transmitted either mechanically or electrically to computer 401.

The slowly changing voltage produced by saw-tooth generator 398, which is adjusted to remain proportional to $y$, is not only used for stabilization of the indicator in the $y$ direction but is also fed to marker pip generator 402. In marker pip generator 402 a voltage proportional to the $y$ deflection is combined with the Y voltage so as to produce a short pulse or pip, the timing of which from the period of the beginning of the sweep is proportional to Y.

It is desirable to provide such means for changing the reference axis for the $\epsilon$ correction, in order that the cathode ray tube indication may be stabilized against drift resulting from cross-motion of the aircraft with respect to ground through the action of wind. In other words, it may be desirable to cause the Y axis to represent not the direction in which the aircraft is heading, but the direction in which it is moving relative to ground. In fact the angle of drift may be measured by the very act of setting the $\epsilon$ correction (by adjusting the reference axis thereof) to such a value that the pattern indicated on the cathode ray tube remains transversely stationary, thus providing a convenient method for the measurement of the drift, one of the quantities which it is desirable to measure for purposes of bombing, and which it is also desirable to know for purposes of navigation.

As a result of the operation of marker pip generator 402, with each hyperbolic sweep on the indicator tube a signal will be provided (which may be applied to an intensity modulation element of the cathode ray tube) when the value of $y$ is equal to Y. Thus a horizontal line will be drawn across the tube having an ordinate value of Y. If circuit 398 is properly adjusted by means of knobs 399 and 400, this marker line will pass through the indication of the target. If not, a readjustment of knobs 399 and/or 400 may be made to bring the marker line to a position passing through the target.

Computer 401 is provided with knobs 404, 405 and 406 for the purpose of introducing the quantities $t_t$, T and $\phi$. Computer 401 then operates to multiply Y (a quantity which is furnished to computer 401 from the setting of knob 399 of apparatus 398) by the quantity $t_t$ and to subtract the product of T cos $\phi$, thus building $Y_c$ (which is the distance MN'' of Fig. 20). This computation can be made either electrically or mechanically and the result, $Y_c$, is preferably fed in the form of a voltage. The voltage $Y_c$ is fed to comparator circuit 408 which is also connected with the Y voltage output of apparatus 398. Comparator circuit 408 is adapted to give a response when these two voltages are equal, which may be used for releasing a bomb automatically, or, more accurately speaking, to prevent the release of a bomb except when these voltages are equal.

Knob 406, which introduces $\phi$, may also be suitably connected electrically or mechanically to the $\epsilon$ correction of the $x$ and $y$ sweep circuits, so that the stabilization for drift and the setting of knob 406 may be performed in one operation.

Computer 401 is also adapted to build the product of T and sin $\phi$ and thereby to give a voltage equal to $X_c$. This voltage may be communicated to a marker pip generator tube whenever the value of the $x$ sweep is equal to $X_c$, thus causing a vertical reference line to appear on the indicator cathode ray tube. Marker pip generator 409 may be substantially the same in construction and organization as marker pip generator 402.

The procedure for utilizing an apparatus arranged as in Fig. 21 may be as follows. Knobs 404 and 405 may be set at any convenient time during the procedure before the release of the bomb. These settings depend upon the type of bomb and the altitude of flight.

The direction of flight is adjusted to bring the vertical marker line to a position passing through the target. A cycle of operation of apparatus 398 is then initiated and knobs 399 and 400 are adjusted to bring the Y marker line on the target and to keep it as closely as possible on the target as the flight proceeds. The lateral motion of the distinct echoes across the screen of the indicator tube may next be corrected by adjustment of knob 406 and the course set so that the two marker lines intersect at the point corresponding to the target. It is wise at this time, after a short period of flight, to check the adjustment of knob 399 and of knob 406 to prevent the marker lines from moving with respect to the point corresponding to the target. At most a small correction will usually suffice for this purpose at this time. Since the cathode ray tube indication is a relatively faithful map of the ground in rectangular coordinates it is not necessary that the target should itself produce a characteristic echo signal and it may be located by reference to other objects which do produce characteristic echo signals. If desired, additional marker lines may be used passing through characteristic echoes for adjustment of knobs 399 and 406, leaving the $X_c$ and Y marker lines to indicate the position of the target, or the marker lines provided for $X_c$ and Y may be temporarily put on a characteristic echo in order to adjust knobs 399 and 406 and may then be shifted to the target.

As a further refinement for the bombing of targets which do not give distinct echo signals, or the echo signals of which fade as the target is approached, the marker lines may be set upon some identified echo not far from the target the position of which relative to the target is known (from maps or the like) and the tracking operations carried out as if such echo-producing landmark were being bombed. The computing apparatus may be provided with an adjustment so that the release time and steering condition are computed for the actual target rather than the landmark or "aiming point." This is feasible in connection with apparatus described below which permits evasive changes of course during a bombing approach (i. e. which separates "tracking" from the final bombing computations, as is desired in this case). Even with apparatus not suited to permit evasive changes of course during a bombing approach a modified and limited form of "aiming point" bombing: the pilot can approach the "aiming point" so that the course for bombing the "aiming point" coincides with the course for bombing the target. All that is then necessary to bomb the target while tracking the "aiming point" is a constant correction factor added to the release time comparator, corresponding to the distance between the target and the "aiming point."

It will be noted in this last connection that the marker lines may be shifted temporarily by knobs 400 and 405, so that they may be first placed approximately on the target, then shifted to a characteristic echo for precision setting of knobs 399 and 406 and then shifted back. The use of a multiplicity of marker lines is apt to be confusing and is in most cases to be avoided.

When the marker lines have been properly located on the target and knobs 399 and 406 finally adjusted, the bomb release may be so activated that it will operate upon receiving a signal from comparator 408. The pilot then maintains the course previously determined (at the time when the drift angle $\phi$ was measured) which should be the course required to keep the target location as represented on the screen of the cathode ray tube at a point on the $X_c$ marker line. Flight is then maintained at constant speed until the bomb is released.

If desired, an auxiliary cathode ray tube may be employed to provide an expanded map of a portion of the terrain. This auxiliary tube may be used to show the terrain in the neighborhood of the target on a larger scale in order to enable the marker lines to be set more accurately, or it may be used to provide an expanded indication of the terrain in the neighborhood of some characteristic reflection in order to enable one to set knobs 399 and 406 more accurately. Marker lines as above described could be provided on such expanded indication of the auxiliary cathode ray tube.

It is possible to include in the apparatus of this invention means for stabilizing the cathode ray tube indication and the bombing approach against certain types of routine or random evasive changes of course known as "jinking." This requires the super-position of a relatively slowly changing voltage in the horizontal direction in much the same manner as a slowly changing voltage is superposed in the case of Fig. 18 upon the vertical deflection. For stabilization against "jinking," however, three generators of relatively slow voltage change, are necessary, one for the upwards vertical direction, one for horizontal deflection towards the left and one for horizontal deflection towards the right. As the course of the aircraft varies from the originally set, the respective outputs of these generators are to be modulated in accordance with trigonometric functions of the angle between the course originally set and the course being flown, taking account of the effect of the drift angle. The desired modulation may be obtained with suitable potentiometers of known types, operated in cooperation with suitable gyroscopic apparatus. This is a simple trigonometric problem and need not be further explained here.

During these maneuvers, the cathode ray tube indication will be stabilized although the portion of the screen illuminated may be varied as the orientation of the antenna is varied (this is also true in the case of yawing of the aircraft, but the effect will be more marked in the case of "jinking"). In order that the crew of the aircraft may know when they are back on their original course and approaching the proper release point, release point M might be marked on the indicator tube by means of an additional horizontal reference line (the vertical mid-line or Y axis of the tube providing the corresponding vertical reference line). The position of the aircraft during "jinking" may be roughly indicated by a luminous spot on the tube, if desired, as more fully explained in connection with Fig. 19, while an accurate running tally of the net deviation from the original course (perhaps in terms of yards to the left or right) may be indicated by a pointer type of meter responsive to the stabilizing horizontal deflection voltage. The pilot could then re-establish himself on his original course just before reaching the point M and thereafter allow the automatic circuits shown in Fig. 21 to release the bomb or bombs as before. It is to be understood that if the target is a moving target such as a vessel in a harbor and it changes its course during the approach, the approach procedure may have to be repeated or at least the computing circuits reset, this being generally necessary even with optically-controlled bombing procedure.

Figure 19:
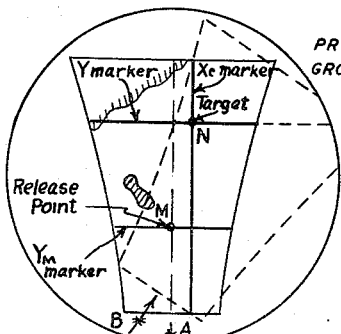
Fig. 19 is a view of the screen of a cathode ray tube illustrating one way of providing stabilization of indication against "jinking" maneuvers.

The above described stabilizing against "jinking" during the bombing approach is roughly illustrated in Fig. 19 which shows the face of a cathode ray tube. Fig. 19 shows in solid lines the indication which appears when the aircraft is at the point corresponding to point A on the cathode ray tube screen. Target N and release point M are indicated. Marker lines are provided to show Y, $X_c$ and $Y_M$, the latter being the Y coordinate of the release point. Some means should also be provided for showing the Y axis of the tube, either by a center line physically marked on the tube or by an additional luminous marker line which may be switched on and off as desired. Point A may be indicated by a bright spot on the tube. The signal providing for this bright spot should be sufficiently strong to overcome the blanking gate or pulse which normally prevents echoes from portions of the ground less than a predetermined distance in front of the aircraft from being indicated on the tube, or if desired, means may be provided to interrupt the blanking gate for a brief instance in order to allow the ground reflection to produce a bright spot at A.

Suppose now that the aircraft flies to point B. During this flight an upward deflection corresponding to the component of the aircraft motion will be superimposed upon the $y$ deflection and a leftward deflection corresponding to the negative components of the aircraft motion will be superimposed upon the $x$ deflection plate. At the same time an $\epsilon$ correction corresponding to the change of course, will be introduced, thus stabilizing the indications of reflections from objects on the ground. At the same time that the pattern is stabilized, while the gradual deflections superimposed upon the sweep deflections stabilize the characteristic echoes received from objects on the ground, these gradual deflections may at the same time serve to deflect the indication of the position of the aircraft, so that the position of the aircraft may be observed on the cathode ray tube in proper relation to the objects on the ground.

Let it be assumed that when the aircraft reaches point B that it sets its course as shown by the small arrow passing through point B on Fig. 19. This will introduce another ε correction, leaving the disposition of such echo signals as are visible on the cathode ray tube relatively unchanged, but the field of vision will be swung around and will correspond roughly to the area enclosed in the dotted lines of Fig. 19. The marker lines, like the echo signals, retain their original position so that point M and point N, if they are still within the field of vision, remain indicated on the tube. If these points should be lost from the field of vision for a short while during maneuvers, they can be made to reappear by heading the aircraft in a suitable direction. The shape of the field of vision, or rather the orientation of the edges of the field of vision, thus provide a rough indication of the direction in which the aircraft is heading with reference to the original course for which release point M was chosen. If these edges of the field of vision should not be readily visible because of a lack of sufficient echo signals from the ground, they may be momentarily made clearer by increasing the intensity of the beam of the cathode ray tube for a short while.

In general there will be a certain amount of ground return near the bottom of the indication under most circumstances, so that the edges of the field of vision in this area will serve as a sufficient indication of the heading of the aircraft at the time. This will indicate the heading of the aircraft, and not its actual flight course with respect to ground, the difference being the drift angle.

It may be advisable as the aircraft approaches point M to permit the $Y_M$ marker line to remain visible in spite of the fact that it may gradually go into the area blocked off by the blanking pulse or gate applied to the cathode ray tube. This may require the use of a relatively high-voltage pip for the production of this marker line, or else a modification of the blanking circuit. Such arrangements, however, are by no means necessary, because so long as the pilot is able to get back on his original course before reaching point M, he can rely upon automatic operation of comparator circuit 408 to release the bomb at the proper time and he need not obtain the exact time for releasing the bomb from observation of the cathode ray tube. Marker line $Y_M$, moreover, would normally have some persistence, which would enable it to be seen even after the visible portion of map pattern has moved upwards beyond it, and this persistence would probably remain until the indication of the aircraft position has passed this marker line.

It is to be noted, that in connection with the procedure above described, the placing of the marker line on the target may be done at any time after the indications on the cathode ray tube have been stabilized. In this procedure it is necessary to maintain level flight in a straight line for a short period in order to obtain stabilization against the air speed of the aircraft and a preliminary stabilization against drift. Once the pattern of indication is stabilized, the marker line can be adjusted irrespective of the course of the aircraft at the time, provided, of course, that the target on which it is desired to locate the marker line is within the field of view. Straight line flight for 30 seconds in any direction may be sufficient to stabilize the picture. In order to provide stabilization against drift for a variety of courses, it may be desirable to introduce the drift not as a single quantity, as was sufficient for a straight line approach, but as two factors, such as wind strength and wind direction with respect to the original reference course to the target.

Figure 22:
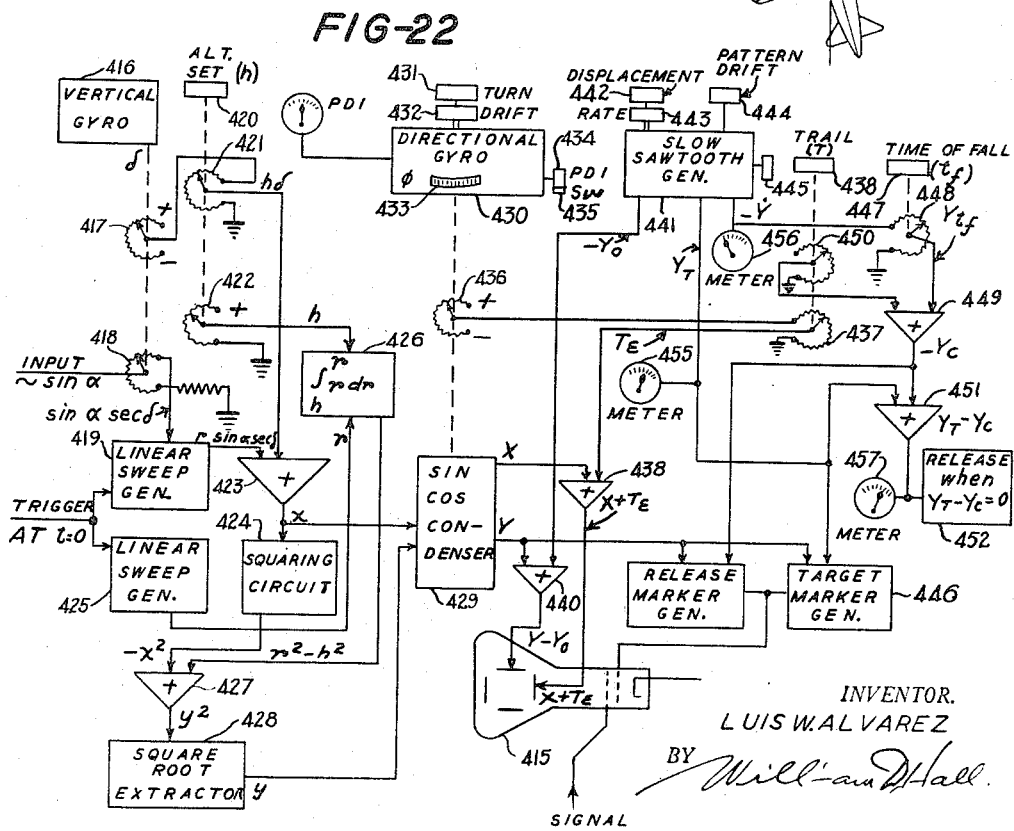
Fig. 22 is a block diagram of another form of apparatus for obtaining the course and release time for bombing the target with the help of the present invention.

Fig. 22 shows the organization of an indicating and computing apparatus suitable for "blind" bombing which, like the system of Fig. 21, employs common pieces of apparatus in many instances for both computation of the release point for bombing and formation of the sweep circuit for indication purposes. The arrangement shown in Fig. 22 does not include stabilization against "jinking" and is designed essentially for a straight-line bombing approach, although modification in accordance with the principles above discussed may be incorporated to make the apparatus more versatile. As indicated at the left of the figure, the input information includes a voltage proportional to the sine of the scanning angle α and a trigger pulse corresponding to the time when a pulse is transmitted from the radio-echo equipment. The radio-echo signal is also fed to cathode ray indicator tube 415 as indicated at the lower right of the figure.

A vertical gyroscopic control 416 provides the correction angle δ and controls potentiometers 417 and 418. Potentiometer 418 is adapted to multiply the sine α input by sec δ (in a manner more fully explained in connection with potentiometer 574 of Fig. 26) and the product voltage is fed to linear sweep generator 419 operation of which is initiated periodically by the aforesaid trigger pulse, so that the output of the linear sweep generator is proportional to the product $r \sin \alpha \sec \delta$. Linear sweep circuits the rate of rise of which may be controlled by a voltage are known in the art. If desired, instead of a linear sweep generator such as generator 419, a conventional linear sweep generator may be used and its output may be multiplied successively by sin α and sec δ by mechanically controlled potentiometers, in accordance with the type of organization shown in Fig. 17.

A knob 420 is adapted to be set in accordance with the altitude h and to control potentiometers 421 and 422. The output of potentiometer 417 is proportional to tan δ, since for small values of δ, δ and tangent δ are approximately equal, a simple potentiometer may be used without introducing appreciable error. The output of this potentiometer is fed to potentiometer 421, so that the output of potentiometer 421 is proportional to the product $h \delta$ which is, as before noted, approximately h tan δ for small values of δ. δ can be kept between +2° and −2° by equipping the aircraft with an "automatic pilot" control apparatus. The effect of potentiometer 417 need be very accurate only during a bombing approach and during such approach, the "automatic pilot" may then be used to control the aircraft. The $h \delta$ output voltage is fed to an addition circuit 423, to which is also fed the output of linear sweep generator 419. Addition circuit 423 simply adds these voltages to produce the voltage $x$, which is fed to squaring circuit 424, which in turn produces $x^2$ but is so arranged to produce this as a negative voltage, hence $-x^2$.

A second linear sweep generator 425, operated from the same trigger pulse as linear sweep generator 419 provides the voltage $r$ which is fed, together with a voltage proportional to h generated by potentiometer 422, to circuit 426 which is adapted to form $r^2 - h^2$. Because this quantity is adapted to be formed through building the definite integral of $r \cdot dr$ between the limits h and r, circuit 426 is labeled with corresponding mathematical symbols in Fig. 22. This circuit may be of the type shown in Fig. 13 for obtaining $r^2-x^2$, or it may be some other form of circuit adapted to obtain a similar result. The output of circuit 426 and the output of squaring circuit 424 are combined in an addition circuit 427 which performs an algebraic addition and produces a voltage proportional to $r^2-h^2-x^2$, or $y^2$, which is in turn fed to square root extractor circuit 428. The output of the square root extractor circuit is a voltage corresponding to $y$. The voltages corresponding to $x$ and $y$, respectively derived from circuit 423 and circuit 428 are fed to a rotating condenser apparatus 429 mechanically operated by directional gyroscopic apparatus 430 and adapted to build the voltages X and Y, thus performing the functions of potentiometers 273; 302; 290 and 281 of Fig. 17. Such a condenser apparatus is more fully shown at 587 in Fig. 26.

Directional gyroscopic apparatus 430 determines the reference direction for the sweep circuits, which may be the direction corresponding to the vertical deflection on the cathode ray indicator tube. It is controlled by two knobs, 431 and 432, knob 431 providing for change of the reference axis, as might be desired in accordance with a change of course, and knob 432 providing for a drift correction to the reference axis, this knob being preferably adapted to control a reading on scale 433 in order to show the value of the drift correction which is put into the apparatus. A pilot's direction indicator 434 is associated with the directional gyroscope to provide the pilot with an indication of deviation from the desired course in accordance with well known practice, and switch 435 is provided for controlling the activation of indicator 434. The directional gyroscope apparatus controls a potentiometer 436. This potentiometer may have an output proportional to the sine of the drift angle, or its output may be proportional to the drift angle itself, for since the drift angle is normally quite small as a result of the relatively great air speed of the aircraft, the difference between these two functions is usually negligible. The output of potentiometer 436 is fed to potentiometer 437 controlled by knob 438 which is set in accordance with the "trail." The output of potentiometer 437 is then added to the X output of apparatus 429 in addition circuit 438, the output of which is fed to the horizontal deflecting plates of cathode ray tube 415 as a horizontal deflection voltage. By virtue of the contribution of potentiometer 437 the horizontal sweeps will be so displaced that the point of the indicator pattern corresponding with the target location will lie on the vertical center line of the tube when the proper bombing course is being steered.

In addition circuit 440 a linearly changing voltage $-Y_0$ is superimposed upon the Y sweep voltage and the algebraic sum voltage is applied to the vertical deflection plates of cathode ray tube 415. The $-Y_0$ voltage is produced by a "slow saw-tooth" generator 441 controlled by knobs 442, 443 and 444. Knob 443 controls the rate of change of voltage $-Y_0$ and knob 442 is adapted to correct the instantaneous absolute value of $-Y_0$. Knob 444 is adapted to produce relatively large changes in the value of $Y_0$ and to initiate a "slow saw-tooth" cycle at a desired moment. Voltage $-Y_0$ is thus adapted to stabilize the indicator pattern for the ground speed of the aircraft, when apparatus 441 has been properly set.

Generator 441 is also provided with a knob 445 which is adapted to add a voltage to $-Y_0$ in order to form a voltage adapted to control the position of a horizontal marker line corresponding to the position of the target, this line being set on the target by means of knob 445. The target marker line is generated in the circuit indicated at 446.

Knob 447, adjusted in accordance with the time of fall of the bomb, controls potentiometer 448 which is fed a voltage proportional to the ground speed of the plane, as generated in generator 441. The output of potentiometer 448, which is proportional to the product of the ground speed and the time of fall, is added algebraically in circuit 449 with the output of potentiometer 450, which is proportional to the "trail," but opposite in sign to the output of potentiometer 448. The output of circuit 449 is therefore equal to the difference of the inputs, or $Y_c$, and the polarity is arranged so as to be negative, in order that this voltage may be subtracted from the voltage furnished by sawtooth generator 441 to target marker generator 446, this subtraction taking place in circuit 451, the output of which controls release mechanism 452 in such a manner as to effect release when the output of circuit 451 is equal to zero voltage. This may be a simple relay responsive to current in either direction and retaining control of the bomb release mechanism so long as current flows.

For purposes of convenience, a number of meters are provided to assist the crew of the aircraft in the bombing operation. Thus meter 455 indicates the horizontal component of the target distance, meter 456 indicates the ground speed and meter 457 indicates the distance to the release point.

Bombing system with plane direction and speed compensation

In the arrangements of apparatus heretofore described, the apparatus was organized so that the Y or vertical sweep direction should correspond with the direction of motion of the aircraft with respect to the ground on the course for which the release point is calculated. Such arrangements have the advantage that the vertical center line of the tube furnishes a reference axis in one direction and a horizontal marker line passing through the target may be used for controlling the time of release. It is also possible to organize a system in accordance with this invention in which the indication of the disposition of reflecting objects on the ground is stabilized with respect to a fixed geographical direction, such as true north, and the source for the bombing approach may have any desired relation to the axes of the indicator map and may thus be changed without resetting the stabilization controls which stabilize the indication. It may be advantageous in such an arrangement to permit the aircraft to fly at different speeds during the course of the approach, it being understood of course that the speed at the time of release of the bomb must be known in advance for the purpose of the calculation. It may be advantageous for the aircraft to be able to vary its speed, as by climbing or diving, in the portions of the approach preceding the release point.

Figure 23:
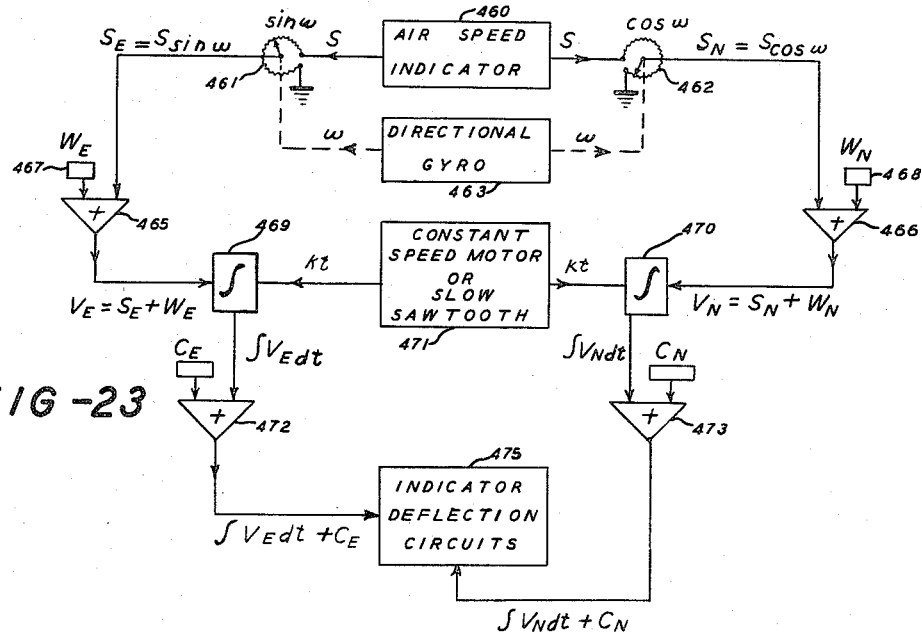
Fig. 23 is a block diagram of one arrangement of computer apparatus for stabilizing indications on a map-making cathode ray tube when an aircraft is engaged in maneuvers involving changes of course.

An apparatus providing indication stabilized with respect to a fixed geographical direction and providing stabilization for the motion of the aircraft which holds automatically for changes in airspeed of the aircraft is shown in Fig. 23. In this figure the details of the indicator deflection circuit are not shown, but only the organization of the apparatus for providing the stabilizing voltages thereto are indicated.

Information concerning the airspeed of the aircraft is furnished by airspeed indicator 460. This device includes a translating device adapted to provide an electrical output in the form of a voltage proportional to the airspeed indicated. It is to be understood that although Fig. 23 represents an electrical computing system for stabilizing the indication on the cathode ray tube, an analogous mechanical computing system could be used, employing rotating shafts instead of voltages, variable ratio gearing or friction drives instead of potentiometers, differential gear apparatus instead of electrical addition circuits, and ball and disk devices of known form instead of integrating circuits.

Airspeed indicator 460 is provided with two separate outputs, one of which is fed to potentiometer 461 and the other to potentiometer 462. These potentiometers are driven by a direction gyroscope apparatus 463 in such a manner that potentiometer 461 introduces the factor $\sin \omega$ and potentiometer 462 introduces the factor $\cos \omega$ where $\omega$ is the angle between the direction in which the aircraft is heading and a fixed reference direction such as true north. The outputs of potentiometers 461 and 462 will then be respectively representative of the east-west and north-south components of the air velocity of the aircraft when true north is chosen for the reference direction, eastward and northward directions being respectively taken as positive.

The eastward component of the air velocity of the craft is then added in addition circuit 465 to the eastward component of the wind. At the same time the northward component of the air velocity of the craft is added in additional circuit 466 to the northward component of the wind. As shown in Fig. 23, the values of the components of the wind are inserted by means of knobs 467 and 468. If it should be considered more convenient, the knobs may be controlled by a suitable resolving apparatus having manual adjustments for wind direction and velocity. Such resolving apparatus could be either mechanical or electrical. If electrical, it could be provided with sinusoidal potentiometers such as potentiometers 461 and 462 controlled by a direction setting, the input to the potentiometers being controlled by a velocity setting, with the outputs of the potentiometers being fed to the respective addition circuits. It may be more convenient to insert the wind information in the form of a velocity and a direction rather than in the form of the magnitude of two components in fixed directions, since a first approximation from meteorological data can quickly be set into the apparatus in this form without any computation.

The outputs of addition devices 465 and 466 are fed respectively to integrating circuits 469 and 470 both of which are provided with an additional input proportional to time, generated by apparatus 471, which may be a constant-speed motor and potentiometer or a "slow saw-tooth" generator as previously defined. The outputs of addition devices 465 and 466 will be seen to correspond respectively to the easterly and northerly components of the ground velocity of the aircraft. The output of integrator devices 469 and 470 will therefore be the displacement of the aircraft in the easterly and northerly directions respectively. These displacement voltages are added to suitable correcting voltages by means of addition devices 472 and 473 respectively. The correction voltages are provided by suitable knobs and serve the purpose of providing a suitable initial setting. The corrected easterly displacement is then provided to the horizontal deflection circuits of indicator deflection circuit 475. The corrected northerly displacement is provided to the vertical deflection circuit of indicator deflection circuits 475.

With the type of apparatus indicated generally in Fig. 23, the cathode ray tube indications may be stabilized after brief observation. Level flight for about 30 seconds at constant speed will give opportunity to check the adjustment for wind direction and strength and making such readjustment as is necessary to keep the indications from shifting. A further check on a different course may improve this adjustment, although this added precaution is not necessary for reasonably accurate results. If there is inaccuracy in the airspeed indicator, this may make it impossible to get complete stabilization for all courses by adjustment of wind direction and velocity knobs, but it has been found that errors introduced by a stabilizing compensation of the errors of the airspeed indicator through setting of the wind direction and velocity knobs for a given bombing course results only in errors of the second and higher orders in the calculation of the bombing course and release points, for all reasonable percentages of error in airspeed indication.

Since it is desired to obtain indication of horizontal airspeed, further accuracy in airspeed indication may be obtained by correction of the airspeed indication whenever there is a vertical component of airspeed. Normal angles of climb are usually sufficiently small to be negligible in this connection, but if it is desired to make steep dives during part of the bombing approach, as for the purpose of confusing anti-aircraft batteries, it would be desirable to introduce a correction to the airspeed indication during such dives, if one desires to have a reliable indication of the ground below when the dive is completed, without having to reset the stabilizing voltages to counteract for the shift of the indications resulting from error in horizontal displacement.

Figure 24:
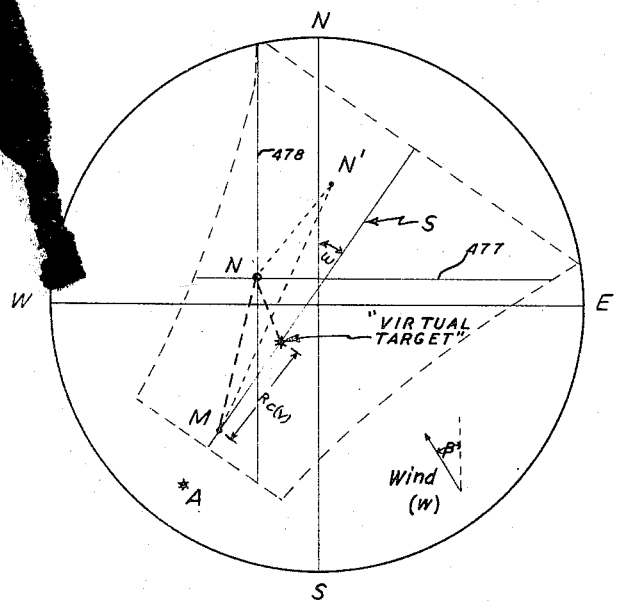
Fig. 24 is a view of the indicator of a cathode ray tube illustrating the presentation of an "aiming point" or "virtual target" marker.

Fig. 24 illustrates the screen of a cathode ray tube in which indications are stabilized in accordance with the scheme illustrated in Fig. 23. Certain additional aids for calculating the bombing course and the release point are also indicated on Fig. 24. The portion of the screen which is adapted to be illuminated by the sweeps is enclosed in dotted lines. The point on the screen corresponding to the location of the aircraft may be point A which may be indicated by a luminous spot as previously described. Line S represents the center line of the field of vision and this may be made to appear as a bright line by means of a standing wave detector or otherwise, as previously discussed. This line corresponds to the direction in which the aircraft is heading. The direction of the course of the aircraft with respect to the ground will differ from the direction indicated by line S on account of drift caused by wind and may in this case correspond to the direction indicated by lightly dotted line MN'. Point N' and line MN' are not important in this type of indication and are not indicated on the cathode ray tube. They are shown in Fig. 24 only for purposes of comparison with Fig. 20. The location of the target is shown at N, and M indicates the release point, it being assumed that line S is the proper bombing course.

The problem of bombing can be considerably simplified by indicating a point such that if a bomb were released at a time and on a course calculated to cause the bomb to strike such point in the absence of any wind, a bomb released at such point on such course, when subjected to the wind, will strike the desired target. Such point might be referred to as the "virtual target." Consideration of the geometry of the problem will reveal that the location of the virtual target on the ground is at a distance from the actual target equal to the wind velocity times the time of fall of the bomb and in a direction opposite to the wind direction (i. e. to windward). Since the time of fall and the wind velocity and direction are set on suitable controls of the computing apparatus as heretofore described, no great additional difficulty is involved in providing an indication of such a virtual target.

As previously described, the location of the target may be indicated by crossed marker lines, which are shown in Fig. 24 at 477 and 478. Such marker lines may serve to indicate the position of the target even when the target does not produce any distinctive radio echo. The values of the voltages determining the position of markers 477 and 478 may then be added to voltages corresponding to the components of the wind velocity in the corresponding direction. A bright spot may then be caused to appear when the vertical and horizontal deflecting voltages simultaneously have the values determined by the addition operation just mentioned. If desired, this indication of the virtual target may be supplemented by a similar addition to the voltages generating marker lines 477 and 478, which addition may be performed or eliminated at the control of a switch. If this last is done, for one position of the said switch marker lines 478 and 477 will indicate the actual target and for the other position of the switch, the marker lines will be shifted to indicate the virtual target.

On Fig. 24 the position of the virtual target is shown lying on line S. This coincidence indicates that the proper bombing course is being steered. If the indication of the virtual target should drift away from line S this would be an indication to the crew of the aircraft that the course of the aircraft should be corrected. If desired, the deviation, if any, between the virtual target and line S may be indicated on a meter, in order to assist the pilot to maintain the proper course. The desired organization of such metering arrangement will be apparent to those skilled in the art.

*Slant range control of bomb release*

It is desirable to provide a high degree of accuracy in the calculation of the time of release of the bomb. For this reason, the previously described method of determining this time of release, which depends to a considerable extent upon the accuracy of the hyperbolic sweep of the cathode ray tube indicated, may not be sufficiently accurate where high precision is desired. Somewhat higher accuracy may be achieved by obtaining from the radio-echo equipment an indication of slant range, which may be measured by the radio-echo equipment with relatively high accuracy, controlling with this measurement of slant range a relatively continuous indication of slant range and combining this with an altitude determination in a triangle-solver apparatus to produce a continuous indication of ground range, which may then be compared with a determination of critical range obtained by computation from the rate of approach, time of fall and "Trail." The triangle-solver apparatus, since it deals with changes in range of the order of 300 miles per hour, may be more accurate than the triangle-solver circuits associated with the sweep circuits of the cathode ray tube, which must operate with sweep voltages corresponding to values of slant range which vary in proportion to the speed of light.

A difficulty arises out of the fact that the range of the target (or of the virtual target) is measured only once during each complete scan of the radio-echo equipment (unless the target should be within that portion of the field of vision in which two portions of each scan cycle overlap, as previously suggested, in which case the range is measured twice for each complete scan). If the scanning speed is as low as one or two cycles per minute, as might be required in some cases by considerations of high resolution and adequate illumination of the field of vision, it will generally be insufficient to control the release of the bombs directly by some individual measuring operation of the radio-echo equipment (i. e. by the time of arrival of some particular echo signal), and it will be desirable to cause some relatively steady voltage to be generated and controlled by the timing of the echo signals corresponding to the target. Such a relatively continuous or steady indication of range may be obtained by charging a condenser to an extent proportional to the time delay of the echoes in question and providing a comparison circuit for checking the value of the condenser charge with each measurement. Such an arrangement may be referred to in a general way as "aided tracking." Such arrangements are known in the art and need not be further discussed here.

When an echo signal from the target is itself being used to provide the measurement of range, it will be desirable to provide suitable gate circuits for passing the echo signal corresponding to the target and eliminating echo signals from objects more than a certain small distance from the target. Such gate circuits may readily be controlled from the position of marker lines 477 and 478. If the target itself does not produce a distinct echo, or if the range of the virtual target is used for computation, which last is desirable because it allows the correction for wind to be made entirely in connection with the cathode ray tube and leaves only the solution of the bombing triangle for the release-time computer, circuits associated with the marker lines may be used to provide the desired range. The marker line circuits cannot in this case be used in as simple a fashion as described in connection with Figs. 21 and 22, because it is desired to avoid the errors that may exist in the hyperbolic sweeps of the cathode ray tube. It will be noted, however, that if a pulse is caused to be formed in a suitable circuit at the moment when the sweep trace of the cathode ray tube passes through the intersection of the marker lines, such pulse will be accurately spaced in time from the original trigger corresponding to the pulse transmitted by the radio-echo equipment at the beginning of the particular sweep trace in question, in accordance with the slant range to the point on the ground corresponding to the intersection of the marker lines (the target). Such a pulse may be formed by circuits the nature of which will be readily apparent upon brief consideration to those skilled in the art, to indicate accurately the slant range to the target even though the target does not produce a distinct echo. In the same manner, the pulse which produces the bright spot on the tube indicating the position of the virtual target will likewise be accurately spaced in time, in accordance with slant range, from the immediately preceding pulse transmitted from the radio-echo system. The pulse which forms the virtual target may therefore be used to control an accurate indication of slant range which may in turn be provided to a triangle-solver, and so on.

Figure 25:
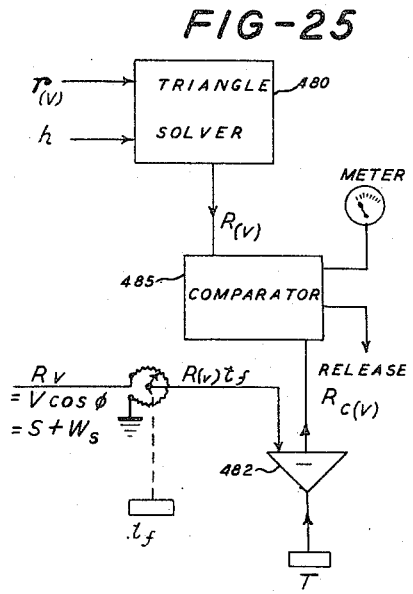
Fig. 25 is a block diagram of a computer and release apparatus adapted to cooperate with apparatus providing indications of the type shown in Fig. 24.

Fig. 25 illustrates in a general manner the organization of equipment for computing the time of release of a bomb in cooperation with means for accurately measuring slant range as previously described. The slant range $r_{(v)}$, the subscript $(v)$ indicating that this range refers to the virtual target, is fed to a triangle-solver 480 which is also furnished with information concerning altitude $h$. The triangle-solver 480 may be of any of a number of known mechanical or electrical types. One form of electrical triangle solver has already been described. Triangle-solver 480 need not be capable of as rapid response as the triangle-solvers used in connection with the sweep circuit, but in general it is desired that it should operate with an accuracy considerably higher than that which is the minimum satisfactory accuracy for the function of forming sweep circuits for cathode ray tube indications for navigational purposes. Triangle-solver 480 provides an output which indicates the length of one leg of a right triangle of which $r_{(v)}$ is the hypotenuse and $h$ is the other leg. This output may be referred to as $R_{(v)}$.

At the same time a voltage is provided which indicates the rate of horizontal approach to the virtual target. It will be seen that this is equal to the horizontal component of the airspeed, previously referred to as S, plus the component of the wind velocity in the direction of the air velocity of the aircraft, which may be referred to as $W_s$. The latter quantity may be obtained by suitable resolving equipment from the setting of wind direction and strength and the output of directional gyroscope 463 (Fig. 23). It may also be noted that this rate of horizontal approach to the virtual target is equal to V cos $\phi$, where V is the velocity of the aircraft with respect to the ground, and $\phi$ is the drift angle. It will be noted that in the arrangement of Fig. 23 the drift angle is not measured as such, the wind direction and velocity being put in directly. The rate of horizontal approach to the virtual target may be denoted as $\dot{R}_{(v)}$.

The voltage proportional to $\dot{R}_{(v)}$ may then be multiplied by $t_f$, the time of fall, by means of potentiometer 481, the output of which is then fed to circuit 482 adapted to perform algebraic addition of voltages. Circuit 482 is provided with an adjustment which may be set in accordance with the "trail" and is adapted to subtract a corresponding voltage from the voltage furnished to circuit 482 by potentiometer 481. The output voltage of circuit 482 will then correspond to the critical distance $R_{c(v)}$. This voltage and also the output voltage of triangle-solver 480 are fed to a comparator circuit 485 which provides an indication of the horizontal distance to the release point on meter 486 and which is also adapted to activate the bomb release apparatus when the voltage produced by the triangle-solver apparatus is equal to the voltage produced by circuit 482.

Figure 26:
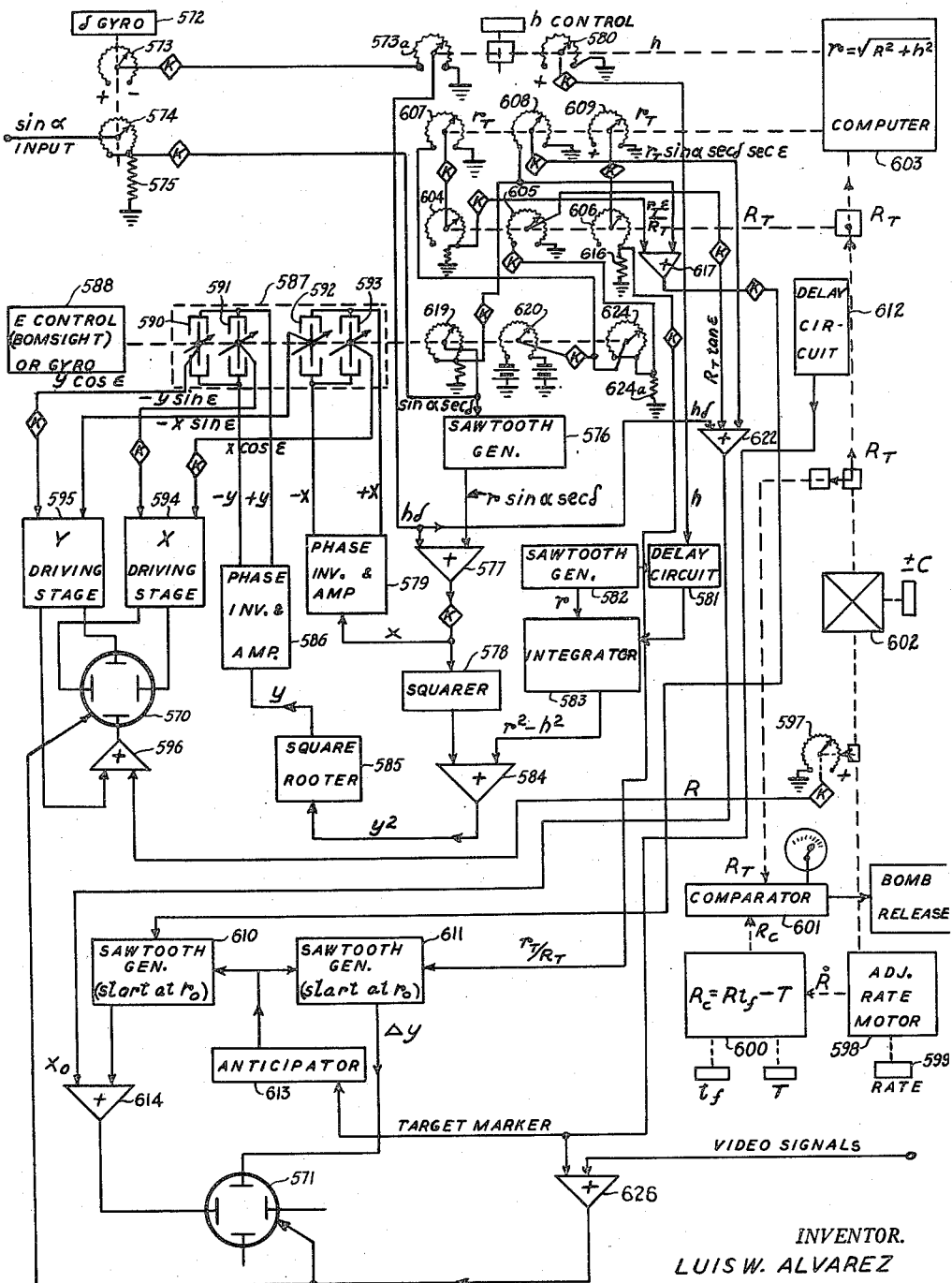
Fig. 26 is a block diagram of one form of apparatus which includes an auxiliary cathode ray tube providing an expanded view of a portion of the terrain scanned.

Fig. 26 shows an arrangement which, unlike those of Figs. 24 and 25, does not permit evasive changes of course during the bombing approach. This arrangement is more refined than that of other devices heretofore described subject to the same limitation, because the apparatus of Fig. 26 includes an auxiliary cathode ray tube the sweep circuits of which are so organized that an expanded portion of the indication may be shown thereon. In this arrangement there is employed a navigational cathode ray tube 570 which is adapted to give a rather complete map of the ground located generally forwardly of the aircraft and an auxiliary cathode ray tube 571 which is adapted to provide an expanded map of only a portion of the terrain illustrated on cathode ray tube 570. A target marker is provided on both tubes.

A gyroscopic control device 572 controls potentiometers 573 and 574, furnishing information concerning angle $\delta$. This angle provides the correction for rolling of the aircraft. The input to potentiometer 574 is a voltage proportional to the sine of the scanning angle $\alpha$, which may be produced in any of a number of known ways. Potentiometer 574 is connected in circuit with resistance 575 as shown on the drawing, the resistance of potentiometer 574 being four times that of resistor 575. The two fixed terminals of potentiometer 574 are connected together and the input is connected to the movable contact of the potentiometer. It may be shown that the output will be proportional to $$\frac{1}{1-\delta^2}$$

which may be expanded as $1+\delta^2+$higher order terms. The higher order terms will have a negligible effect over the desired range of angle $\delta$. The coefficient of the second term may be chosen as ½ so that the expression $1+\tfrac{1}{2}\delta^2$ results and this is very close to the expansion of sec $\delta$. In consequence, the potentiometer 574 will have the effect of multiplying the input by the quantity sec $\delta$. This manner of obtaining multiplication by sec $\delta$ by the use of a uniformly wound potentiometer rotated in accordance with the angle $\delta$ is disclosed and claimed in the co-pending application of William A. Higinbotham filed August 11, 1944, S. N. 549,045.

At various places in Fig. 26 there are small diamonds interpolated at various places in the circuit diagram and marked with the letter K. These represent cathode-follower stages adapted to provide isolation of the circuits from each other or to provide desired impedance transformation. No further mention will be made of these cathode-follower stages.

The output from the junction of resistor 575 and potentiometer 574 is fed to a saw-tooth generator 576, which may be of the type shown in Fig. 28. The output of saw-tooth generator 576 will then be a sweep proportional to $r \sin \alpha \sec \delta$. This is combined in addition circuit 577 with a voltage proportional to $h\delta$, just as in the addition circuit 423 of Fig. 22, in order to produce a voltage proportional to $x$ where $x$ is defined as heretofore. The output of addition circuit 577 is fed to a squaring circuit 578 and also to an inverter and amplifier 579 adapted to provide a balanced output instead of the "unbalanced" voltage $x$. The two sides of the balanced output of the inverter and amplifier 579 will then produce voltages proportional to $+x$ and $-x$.

A voltage proportional to $h$ is produced by potentiometer 580 and is caused to control a delay circuit 581 adapted to produce a gate pulse at a time after the initiation of a sweep of a saw-tooth generator 582 determined by the magnitude of $h$. Saw-tooth generator 582 is adapted to produce a voltage proportional to $r$. The voltage $r$ is fed to an integrator circuit 583, which may be of the type shown in Fig. 29. The beginning of the integration (the lower limit of integration) is determined by the output signal of the delay circuit 281, so that the output of the integrator circuit will be equal to $r^2-h^2$ during the portion of the $r$ sweep of saw-tooth generator 282 follows the instant when $r^2$ is equal to $h^2$. It will be seen that negative values of $r^2-h^2$ are not obtainable in this manner, but this is of no consequence since all points on the ground have a slant range at least equal to and generally greater than $h$.

The output of squaring circuit 578 is added to the output of integrator circuit 583 in addition circuit 584, thus producing an output representative of $y^2$. This output is then fed to a square root extracting apparatus 585, the output of which drives an inverting and amplifying circuit 586 operating in the same manner as the inverting and amplifying circuit 57₃ and producing a balanced output one side of which is proportional to $+y$ and the other side of which is proportional to $-y$ in voltages. The various outputs of the inverter and amplifier circuit 579 and 586 are then fed to a multiple condenser apparatus 587 which is adapted to form from them the desired components of the X and Y sweeps, the position of the condensers being determined by the control 588, which may be gyroscopic, in accordance with the angle $\epsilon$, which involves the yaw correction and the adjustment of the sweeps to bring a desired reference direction in line with the vertical direction of the cathode ray tube screen.

Condenser unit 587 includes four double condensers 590, 591, 592 and 593. Each of the double condensers has a rotor adapted to engage alternately with either of two stators. The shape of the condenser plates is such as to provide a sinusoidal variation of capacitance with respect to uniform rotation of the rotor shaft, some of these condensers being adapted to form a cosine variation of capacitance while others form a sine variation. The organization of these condensers will be apparent from the drawings in connection with the indications marked on the drawings of the voltage components of the sweeps produced in the condenser apparatus. These components are combined to form the desired X and Y sweeps as shown in the figure. It is to be noted that the portion of Fig. 26 which includes the multiple condenser apparatus 587, the X and Y driving stages 594 and 595, and the inverter and amplifier circuits 579 and 586, constitutes a more detailed showing of the apparatus indicated generally at 429 at Fig. 22 and there labeled simply "sin-cos condenser."

In addition device 596 there is superimposed upon the Y sweep a stabilizing voltage produced by a potentiometer 597 driven by an adjustable rate motor 598, the rate of which is controlled by a knob 599 which is adapted to be set to correspond to the ground speed of the aircraft. Adjustable rate motor 598 also provides an indication of the rate to a computer 600 into which the settings of the time of fall and the trail may be introduced. Computer 600 is adapted to calculate the critical ground range $R_c$ and to furnish this to a comparator device 601 which is also provided with an input proportional to the ground range to the target, which is generated by adding to the output of the adjustable rate motor 598 a correction or displacement such as to produce certain indications discussed further below upon the expanded sweep cathode ray tube 571. This correction or displacement is introduced through differential device 602. The output of the differential device 602, in addition to being furnished to the comparator 601 is also furnished to a slant range computer 603 and to potentiometers 604, 605 and 606. These potentiometers and potentiometers 607, 608 and 609 controlled by the output of the slant range computer 603 together serve to control the indications upon the expanded sweep cathode ray tube 571, so that the setting of the differential device 602 will have an effect upon the indications on tube 571. It will be seen that this setting of differential device 602 is thereby adapted to cause the output of differential device 602 to correspond very closely to the ground range to the target.

In order that the expanded indication provided on cathode ray tube 571 may be centered on the target, saw-tooth generators 610 and 611 which generate the sweeps, and which may be of the type shown in Fig. 28, are caused to begin generating saw-tooth waves at a definite interval after the beginning of the operation of saw-tooth generators 576 and 582, such interval being determined by the timing of the target marker produced by delay circuit 612 which is controlled by slant range computer 603 so as to produce a delay proportional to the slant range of the target. Delay circuit 612 is a circuit adapted to produce a marker pulse at a predetermined time in each cycle of operation of the radio-echo equipment, the time between the transmission of a pulse and the marker thus being representative of the slant range of targets located by the marker. Like the saw-tooth generators 582 and 586, circuit 612 should be synchronized with the transmitter of the radio-echo equipment by a suitable connection (not shown).

For this purpose, a highly precise delayed pulse circuit is desirable. Circuits of the type employing a crystal oscillator and a phase shifting condenser in association with pulse-forming and tracking circuits are preferred. The delay circuit 581 need not be so elaborate and a bias-controlled triggered gate circuit or the like may be used there. If accuracy of the highest order is not necessary in a particular case, bias-timed triggered gate circuits may be used both for the circuit 612 and circuit 581. The target marker controls the initiation of the saw-tooth waves in generators 610 and 611 through an anticipating circuit 613 which is adapted to cause these sweeps generated in generators 610 and 611 to begin at a predetermined time before the target marker, this being possible by causing the target marker of one sweep cycle to control the timing of the sweeps of generators 610 and 611 for the next sweep cycle. Various types of anticipating circuits might be used.

It will be seen from a consideration of the geometry of the problem that the vertical sweeps produced by saw-tooth generator 610 should be modulated by a voltage proportional to $$\frac{r_T}{R_T}$$

and that the sweep produced by generator 611 is to be modulated by the expression $$\left(\sin \alpha \sec \delta \sec \epsilon + \frac{r_T}{R_T}\right)$$

Moreover, in order to bring the target to the center of the tube, an additional deflection is to be imposed upon the horizontal sweeps (which is done through the addition device 614) which additional voltage is $$r_T \sin \alpha \sec \delta \sec \epsilon + h\delta + R_T \tan \epsilon$$

The modulating voltage for generator 611 is formed by first feeding a voltage proportional to the slant range $r_T$ by means of potentiometer 609 and then multiplying it by the reciprocal of $R_T$ by means of potentiometer 606 and its associated resistor 616. The relative values of resistance for potentiometer 606 and resistor 616 should be determined in accordance with the limits of the value of $R_T$ with which it is desired to operate. Thus, if it is desired to work with values of $R_T$ extending from a certain minimum value (at which the movable contact is at the output end of the potentiometer) to a value $n$ times as great, the resistance of the potentiometer should be $(n-1)$ times as great as that of resistor 616. The end of potentiometer 606 connected to the ungrounded end of resistor 616 is connected to saw-tooth generator 611.

The modulating voltage for generator 610 is formed by the addition of two voltages in addition device 617. One of these voltages proportional to the product $\sin \alpha \sec \delta \sec \epsilon$ and is obtained from the modulating voltage of saw-tooth generator 576, which is $\sin \alpha \sec \delta$, through a potentiometer 619 which is adapted to introduce the factor $\sec \epsilon$ in the manner in which potentiometer 574 introduced the factor $\sec \delta$. The other voltage fed to addition circuit 617 is proportional to $$\frac{r_{T_\epsilon}}{R_T}$$

This voltage is obtained by generating a voltage proportional to $\epsilon$ by means of potentiometer 620 and then multiplying this voltage by $r_T$ in potentiometer 607 and finally dividing this voltage by $R_T$ in potentiometer 604 in the same manner in which the output voltage of potentiometer 609 was divided in potentiometer 606.

The relatively steady superimposed deflection voltage applied upon the horizontal plate of cathode ray tube 571 (added to the horizontal sweeps in the addition device 614) is formed by the addition of the necessary three component voltages in addition device 622. One of these component voltages is $h\delta$, obtained by the output of potentiometer 573 as multiplied by potentiometer 573a. Another of the component voltages is equal to the product $R_T \tan \epsilon$. This voltage is obtained by taking the voltage produced at the output of potentiometer 620, which is proportional to $\epsilon$, and multiplying it in another potentiometer 624 which is also varied in accordance with $\epsilon$ but which is of such size in such a way that potentiometer 624 introduces the factor $$\left(1 + \frac{\epsilon^2}{3}\right)$$

This potentiometer is connected in the same manner as potentiometers 619 and 574, but resistance 624a, instead of being equal to ¼ of the resistance of the potentiometer, as resistors 619a and 575 are, is calculated to give a ⅓ coefficient to the $\epsilon^2$ term (which becomes an $\epsilon^3$ term) on account of the multiplication by $\epsilon$. This coefficient might also be adjusted by gearing the potentiometer shaft, instead of by adjusting the value of resistor 624a. The output potentiometer of 624 will then approximate quite well the function $\tan \epsilon$ over a considerable range of values. This approximation of the tangent function is good over a wider range than that obtained with potentiometer 573. It is important to have a good approximation over a wide range because a wide range of values of $\epsilon$ might enter into the release point calculations, whereas $\delta$ may be kept to a small value by the use of an "automatic pilot." The $\tan \epsilon$ output voltage is then multiplied by the factor $R_t$ in potentiometer 605, the output of which is then fed to addition device 622.

The third and last voltage fed to addition device 622 is a voltage proportional to $r_t \sin \alpha \sec \delta \sec \epsilon$. It has already been described how the voltage $\sin \alpha \sec \delta \sec \epsilon$ was derived for the purpose of providing this voltage to addition device 617. This same voltage is also fed to potentiometer 608 in order to multiply this voltage by $r_t$ and produce the desired voltage for the third component voltage to be fed to addition device 622.

The target marker produced by delay circuit 612 not only controls the operation of saw-tooth generators 610 and 611 but is also added in addition device 626 to the video signals obtained from the receiver of the radio-echo equipment. Thus, both the target marker and echo signals appear on both tubes 570 and 571. Since the target marker is determined by the slant range $r_T$ (for high accuracy and independence from the hyperbolic-sweep circuits), the marker pip will generate a circular arc on the cathode ray tube screen instead of a straight marker line. This circular arc will indicate all points on the ground which are at the same slant range as the target from the aircraft. The circularity of this marker arc may furnish a check on the accuracy of the sweep which may be particularly useful in connection with navigational cathode ray tube 570.

Computer 603 may be any suitable form of triangle-solver. A mechanical computer of the spiral gear type is preferred, but electrical computers such as those of the servo-bridge type (bridge circuit kept in balance by servo system) are also able to operate with sufficient accuracy for this purpose.

*Some specific component circuits*

Various ways of organizing apparatus in accordance with the present invention to utilize the information obtained from an electrically scanned linear antenna mounted in an aircraft, in order to obtain a high fidelity map of the ground and to obtain also accurate information for the purpose of bombing targets even when such targets do not produce characteristic radio echoes, have been described in all their essential principles. Many different types of circuits may be used to perform the various functions of the different parts of the apparatus. The particular types of circuits employed for the apparatus heretofore described do not form a part of this invention, but such specific circuits are described herein to some extent in order that the principles of the invention and the operation of the apparatus in accordance thereto may be fully understood. In the above portions of the specifications, such mention as has been made of circuits has been chiefly for the purpose of illustration rather than for the purpose of indicating the most efficient and convenient type of circuit for each particular function. Many of the circuits in question, such as cathode followers, pip generators, etc., are well enough understood in the art and need no further explanation. A few of the circuits involved, however, such as the squaring and square root extracting devices and the variable-slope saw-tooth generators, may be less well known in the art, and it may therefore be desirable that this description should include some explanation of a few circuits of this character which are believed to be particularly effective.

In consequence, there are shown in Figs. 27–36 a number of circuits which may be of particular utility in this type of apparatus. It is to be understood that still other forms of circuits are possible for these various functions.

Fig. 27 shows a circuit of a saw-tooth wave generator which is adapted to be modulated by a positive voltage impressed at point 630. Vacuum tube 631 is adapted to short-circuit condenser C except when a negative gate pulse is provided on the grid of vacuum tube 631. When such a short circuit is being maintained, there will be a voltage across resistor R resulting from the current there through which will be equal to A, where A is the voltage impressed upon terminal 630. Resistance R is preferably made sufficiently high so that the voltage drop in vacuum tube 631 and diode vacuum tube 632 are negligible. When a negative gate or blocking pulse is impressed upon the grid of tube 631, condenser C will charge through resistor R and the voltage across the condenser will be proportional to time for a short period (the only portion of the sweep which is actually used) and the proportionality to time, or the slope of the saw-tooth wave, will be equal to $$\frac{A}{RC}$$

It will therefore be seen that the slope, or rate of increase with respect to time of the saw-tooth wave will be proportional to voltage A impressed upon terminal 630.

Normally tube 633 conducts slightly so that cathode load resistor 635 may have a voltage about equal to ground. As the high side of C rises above ground, tube 633 will conduct more heavily. Thus the cathode potential will rise and this rise will be transmitted through condenser 634 to the cathode of diode 632. The diode, in consequence, will soon cut off and condenser 634 will supply current through R to condenser C. Thus any tendency for drooping of potential at C is compensated for by tube 633 and the feedback to R.

The voltage A affects the sweep generation only by setting the initial voltage drop across R, which in turn determines the slope of the sweep. The sweep will be substantially linear in form. The voltage A changes at a rate which is slow compared to the short period of the sweep, so that the absence of continuous modulation by the voltage A is not significant.

The circuit of Fig. 27, just described, provides means for varying the slope of saw-tooth waves produced by a saw-tooth wave generator in accordance with a modulating voltage, but in that circuit the modulating voltage must remain positive. Fig. 28 is a similar circuit modified in order to permit control of the slope of the saw-tooth wave in accordance with a modulating voltage which may be either positive or negative or may change from positive to negative or vice versa. This improvement is disclosed and claimed in the patent to W. A. Higinbotham, No. 2,436,890 issued March 2, 1948. In this circuit, instead of diode 632, a clamping circuit comprising triodes 635 and 636 is provided, and instead of vacuum tube 631, a clamping circuit comprising triodes 637 and 638 is provided. The grids of both pairs of tubes are adapted to be connected to the output of a negative gate pulse producing circuit. When no negative gate pulse is applied, a voltage will be caused to appear across resistor R the polarity and magnitude of which will be determined by the polarity and magnitude of the voltage impressed upon terminal 640. During the absence of negative gate pulses upon tubes 635, 636, and 637 and 638, condenser C is short-circuited and a voltage is established across resistor R which is substantially proportional to the voltage impressed upon terminal 640. At the moment when it is desired to begin a sweep operation, negative gate pulses are provided on the grids of tubes 635, 636, 637 and 638. Condenser 642 has a relatively large capacitance so that the voltage drop across it is practically negligible. Condenser C is then charged, positively or negatively according to the voltage of the upper end of resistor R as set by the voltage at terminal 640 prior to the application of the negative gate, and the charging of condenser C causes a voltage sweep to be formed at the cathode of tube 643. The current for the charging of the condenser C is provided in the manner described in connection with Fig. 27, from the circuit of vacuum tube 643 to condenser 642. With this type of circuit, a saw-tooth wave may be produced up to an amplitude of plus or minus 50 volts. Either negative or positive saw-tooth waves may be produced, according to the polarity of the voltage applied upon terminal 640 and the slope of the saw-tooth waves in question will likewise be determined by the magnitude of the voltage impressed upon terminal 340.

The time of initiation of the sweeps generated by generators of the type shown in Figs. 27 and 28 is determined by the timing of the negative gate pulses fed to the generator. In general, such negative gate pulses will be timed and produced by the timing circuits of the radio echo equipment. It is to be understood that such timing and negative gate circuits are generally to be used when saw-tooth generators of this type are employed in apparatus of this invention, although the presence of such timing and negative gate circuits is not specifically shown in the various block diagrams heretofore described. It will be seen again that the so-called modulating voltage fed to the saw-tooth wave generator shown in Fig. 28 simply determines the slope of the saw-tooth wave and does not affect its linearity. The modulating voltage in effect only determines the initial condition. This is quite satisfactory, as previously mentioned, because the modulating voltage changes relatively slowly as compared with the short period of the saw-tooth waves.

Fig. 29 shows another circuit which is particularly useful in connection with apparatus of this invention. This circuit is adapted to form the definite integral of $rdr$ between the limits of $h$ and $r$, which is proportional to $r^2 - h^2$. It is to be understood that $r$ in this case is proportional to time.

A saw-tooth wave generator 650 generates saw-tooth waves such that the instantaneous voltage is proportional to $r$. These are fed to the grid of a vacuum tube 651 which is preferably of the multi-element type. A suitable clamping circuit, which will generally contain vacuum tubes in accordance with well known principles is adapted to short circuit condenser 653 except when a negative gate is impressed upon clamp circuit 652. When a negative gate is applied to clamp circuit 652, the clamp circuit is open circuited and condenser 653 begins to charge. The current charging the condenser, since condenser 653 is a relatively large condenser, will be determined by the voltage of the grid of tube 651 and the voltage across the condenser will be equal to the time integral of the current over the period during which the condenser is charged.

Fig. 30 illustrates the operation of the circuit, the vertical axis indicating current and the horizontal axis indicating time. The origin of the graph may represent the time at which saw-tooth generator 650 causes tube 651 to begin to conduct, which should be the time corresponding to $r=0$. For a period of time (which may be equal to $h$) before the negative gate is applied to clamp circuit 652 no current flows into condenser 653, but as soon as the negative gate is applied, the condenser begins to charge, the current flowing initially at the rate corresponding to the grid voltage of tube 651 at that moment. The charging current gradually increases as saw-tooth generator 650 causes the grid of tube 651 to rise in voltage. At any given moment (for which $t$ equals $r$) the voltage across condenser 653 will be measured by the magnitude of the area shaded in Fig. 30. The voltage across the condenser is plotted against time in Fig. 31. It will be seen from Fig. 30 that the shaded area is equal to $\frac{1}{2}(r^2-x^2)$. The $\frac{1}{2}$ proportionality factor can be eliminated by suitable amplification.

In order that the negative gate applied to clamp circuit 652 may be suitably timed so that the output of the circuit may be proportional to $(r^2-h^2)$, gate generator 654 which controls clamp circuit 652 is in turn controlled by a precision delay circuit 655. Precision delay circuit 655 is associated with the timing and synchronizing circuits of the apparatus with which the circuit shown in Fig. 29 is to be used, such synchronizing connections not being shown on the figure in order to simplify the illustration. A control voltage is provided from a potentiometer 656 which is set in accordance with the magnitude $h$ and this control voltage is adapted to determine the delay between a synchronizing pulse furnished to the precision delay circuit, which may be furnished at the time at which $r=0$, and an output pulse of the precision delay circuit. Such output pulse is then furnished to gate generator 654 in such a manner as to cause the immediate production of a negative gate pulse which is then impressed upon clamp circuit 652.

Fig. 32 shows the principles of operation of a squaring circuit disclosed and claimed in the patent to F. B. Berger and W. A. Higinbotham, No. 2,441,387 issued May 11, 1948. Fig. 33 is a diagram illustrating the operation of such circuit and Fig. 34 is a diagram of a particularly practical circuit embodying the principles of the circuit of Fig. 32. It is important in squaring circuits for use in accordance with this invention that the circuit in question should be able to operate rapidly. This is also important in connection with square-root extracting circuits.

The input voltage to the squaring circuit of Fig. 32 is applied at point 658, and is connected, through bias battery 659, to the grid of vacuum tube 660. At the same time the input voltage is passed through an inverter 661 which produces an equivalent voltage of opposite sign which is applied through bias battery 662, to the grid of vacuum tube 663. The cathodes of vacuum tubes 660 and 663 are connected together and may both be connected to ground. The anodes of vacuum tubes 660 and 663 are likewise connected together and their common connection is connected to a source of positive voltage through a resistor $R_L$. The voltage across $R_L$ will be equal to the product of the resistance of $R_L$ and the sum of the anode currents of vacuum tubes 660 and 663.

The current of vacuum tube 660 may be expressed by a power series such as $$a+bx+cx^2+dx^3-\ldots$$

In this expansion the values $a$, $b$, $c$, $d$, etc. will be determined by the characteristics of the vacuum tubes, which may be determined beforehand. The bias of the tubes may be so adjusted that operation takes place entirely within the negative grid voltage region. Since in this region the plate current of a vacuum tube tends to vary approximately as the $3/2$ power of the grid voltage, it will be seen that the fourth and higher even powers of the above expression for the plate current of tube 660 will be negligible.

The plate current of tube 663 may be expressed as $a-bx+cx^2-dx^3+\ldots$, where $a$, $b$, $c$, $d$, etc. have the same values as in the case of the plate current of tube 660, because tubes 660 and 663 should be of the same type. The change in sign of the odd power terms results from the fact that the grid voltage is changed by $-x$ instead of by $x$. The sum of the anode currents of tubes 660 and 663 will then be equal to $2a+2cx^2+\ldots$ $2a$ is a constant which can be eliminated by a suitable level-setting operation and $2c$ is a proportionality factor which can be removed, if desired, by suitable amplification or attenuation. Since the voltage in question is that across $R_L$, the value of $R_L$ will introduce another proportionality factor. In practice, when the gain of the tube, the value of $R_L$, and so on, are all considered, the resultant of the various proportionality factors comes fairly close to unity, within a factor of 2 in fact, so that this resultant proportionality factor is well within the controllable range.

Fig. 34 illustrates a particularly effective form of the circuit generally illustrated in Fig. 32. Multigrid tubes 670 and 671 correspond to vacuum tubes 660 and 663 of Fig. 32. Tubes 670 and 671 are preferably of the type 6B8, which are found to have a particularly desirable shape of characteristic curve. The desirable shape of the characteristic curve apparently results from the relatively high second-harmonic distortion produced by tubes of this type. Other tubes having relatively high second-harmonic distortion might also be desirable for this purpose.

The characteristics of the circuit of Fig. 34 are partially illustrated in Fig. 33 in which the characteristic curve of tubes 670 and 671 are illustrated. The grid voltage axis is common to the two plots but one plot is reversed in direction with respect to the other. The symbols with the subscript 1 relate to tube 670 and the figures with subscript 2 relate to tube 671. The origin of the graph relating to tube 670 is at the lower right hand corner and this graph is in the normal orientation with grid voltage increasing toward the right. The origin of the graph relating to tube 671 is at the lower left hand corner and this graph is inverted, so that grid voltage increases to the left. The respective origins may correspond to zero grid voltage. The intersection of the two characteristic curves of plate current plotted against grid voltage will, generally, on account of the symmetry of the figure, intersect the grid voltage axis half-way between the origins of the two graphs.

In practice it is found that this cross-over point, at which the currents of the two tubes are equal should correspond, for the type 6B8 tube, to a grid voltage of −12 volts. The curve representing the sum of the currents of the two tubes, which is the current to the resistor $R_L$, will then very closely resemble a parabola, which is to say that the current in excess of a certain minimum current will vary substantially with the square of the grid voltage (the grid voltage on one tube decreasing while the grid voltage on the other tube increases as shown in Fig. 29). The curve showing the sum of the currents of the two tubes, which is the dotted curve in Fig. 33 is found to be substantially parabolic for a grid voltage range of about 16 volts. It will be seen that any change in the input voltage away from that value of the input voltage corresponding to the cross-over value of the grid voltage will produce a change in the voltage across $R_L$ proportional to the square of the change in the input voltage. Thus, the input voltage $x$ may be either a negative sweep or a positive sweep, but care must be taken to see that it begins at a voltage corresponding to the cross-over voltage heretofore described.

In the circuit of Fig. 34 the input voltage is fed to an amplifier and inverter including tubes 672 and 673. The cathodes of these tubes are connected to ground through a common cathode resistor 674 and through a negative bias voltage supply 675 which may have a voltage of about −150 volts. Resistor 674 is preferably adjustable in order that it may be adjusted to correct the voltage drop across $R_L$ for the desired initial condition. Resistor 674 may be a pentode type of vacuum tube, which has the advantage of being a constant-current type of resistance. The grid of tube 673, instead of being connected directly to ground, is connected to a potentiometer 676 by means of which slight adjustments may be made on the grid voltage of tube 673 relatively to the grid voltage of tube 672. By means of this adjustment the value of the cross-over voltage may be changed slightly by effectively shifting the characteristic curve of one tube with respect to the characteristic curve of the other tube (refer to Fig. 33), thus effectively "centering" the parabolic curve of Fig. 29 about the desired initial voltage. The adjustment of potentiometer 676 may also serve to balance out to some extent slight differences between tubes 672 and 673, which should be of the same type. Tubes 672 and 673 may be medium $\mu$ triodes such as the 6SN7 or they may be relatively high $\mu$ triodes such as the 6SL7. Tubes of these types are manufactured with two triode elements in a single envelope, so that one tube will suffice for triodes 672 and 673.

The anodes of tubes 672 and 673 are respectively connected directly to the control grids of tubes 670 and 671. The anode voltages are fed through resistors 678 and 679 respectively, which may have a value of about 20,000 ohms each. Because of the direct coupling, the entire stage comprising tubes 670 and 671 must operate at a voltage above that of the stage comprising tubes 672 and 673. Thus, the cathodes of tubes 670 and 671, which are connected together, are connected to a source of positive voltage of about 100 volts as shown in Fig. 34, this permitting the establishment of a suitable grid bias for tubes 670 and 671 by the adjustment of variable resistor 674. Variable resistor 674 may be adjusted so that when no signal is present at the input, the grids of tubes 670 and 671 will be at a potential about 12 volts less than the potential of the cathodes of tubes 670 and 671. The proper setting of this voltage may be measured by the current through resistance $R_L$, or by other means.

The circuit of Fig. 34 will operate substantially as discussed in connection with Fig. 32. The output of the circuit, which is taken off from the common anode connection of tubes 670 and 671, will be a voltage which will change negatively proportionally to $-x^2$ as the input changes either positively or negatively proportionally to $x$, but the change in voltage proportional to $-x^2$ in the output will be a change relative to the high voltage terminal 680. It may be desired to obtain a voltage which differs from ground potential by a factor proportional to $x^2$. This involves a relatively simple level-setting operation which is indicated generally by dashed lines in the right-hand portion of Fig. 34. For this purpose, the output of the portion of the circuit indicated in dashed lines is coupled to a condenser 681 to point 682 between which and ground are connected a diode 683 and a high resistance 684 which may have a value of about 2 megohms. At the end of each sweep, when the output voltage of the portion of the circuit shown in solid lines goes positive to return to its initial value, diode 683 will conduct, thus keeping point 682 substantially at ground potential. When the next sweep starts and the output voltage begins to drop, diode 683 will present an open circuit and point 682 will be subjected to an increasingly negative voltage which varies as $-x^2$.

Fig. 35 illustrates the principles of a type of square-root extracting circuit which has been found to be particularly accurate in connection with sweep generation. This type of square-root extracting circuit is disclosed and claimed in the application of F. B. Berger, Serial Number 561,995 filed November 4, 1944. The chief element of the square-root extracting circuit is squaring circuit 700 into which is fed the output finally obtained, which may be a voltage represented by $n$. The output of squaring circuit 700 will then be equal to $an^2$, where $a$ is a proportionality factor. In practice, as has been mentioned before, $a$ is fairly close to unity. The output of squaring circuit 700 is subtracted from the input of which it is desired to extract the square root, the subtraction taking place in circuit 701. The input voltage may be a voltage equal to $m$, so that the output of circuit 701 will be equal to $an^2 - m$. This output of circuit 701 is then put through an amplifier 702. The output of the amplifier will be equal to the gain G of the amplifier multiplied by the input to the amplifier, and it has already been assumed that the output of the amplifier was equal to $n$. Thus, it will be seen that $$n^2 - \frac{n}{aG} = \frac{m}{a}$$

In order that the term $$\frac{-n}{aG}$$

may be negligible, either the gain of the amplifier or the proportionality factor $a$, or both, should be large. In practice it is found that when the proportionality factor $a$ is the neighborhood of unity, a gain as low as 10 is sufficient to avoid undesirable distortion.

The effect of using a relatively low gain, such as a gain of about 10 in amplifier 702 as observed in the course of experiments, is illustrated in Fig. 36. In Fig. 36, the various voltages are plotted against time. The parabolic curve labelled $V=t^2$ represents a voltage function increasing with the square of time. The dotted line $V=t$ indicates a linear function through the origin. If a voltage sweep varying in accordance with the parabolic curve is put into a square-root extracting circuit of the type shown in Fig. 35, instead of a straight line such as the dotted line shown, a curve such as curve 705 will be produced. Curve 705 approximates a straight line parallel to the dotted straight line except for the portion near the origin of the graph where this sweep is subjected to a slight delay. It has been found that when amplifier 702 has a gain of about 10, the delay is quite tolerable for the purpose of forming sweeps in apparatus of the present invention and it has further been found that there is substantially no distortion after the first five microseconds of such sweeps. The delay has been exaggerated on Fig. 36 for purposes of illustration, for the sweeps may have a duration of as much as 200 microseconds, or even more.

In practical construction of a square-root extractor for operation according to the principles of Fig. 36, considerable simplification may be achieved by the utilization of a squaring circuit of the type shown in Fig. 34. With this type of squaring circuit, a square root extractor may be built by simply connecting the grid of tube 673 to point 682. One may then feed the input at the usual input terminal, but in the form of a negative signal. The square function will then be subtracted in the inverter-amplifier and the desired square root output can be obtained from point 690, which is connected to the grid of tube 670. If the input were provided in the form of a positive signal, addition instead of subtraction would take place in the inverter-amplifier stage and the circuit would not be operative as a square root extracting device.

In apparatus of the present invention a considerable number of addition circuits are used, particularly in the more developed forms of apparatus. One simple form of addition circuit was shown in Fig. 14 and another in Fig. 17, where the output of potentiometers 292 and 304 were added. Another type of addition circuit is shown in Fig. 36A. In this circuit the input voltages are $E_1$, $E_2$, $E_3$, and so on (any number of input voltages may be added in this fashion providing that the variation of their sums does not exceed the working range of the vacuum tube). The output voltage is $E_s$.

When no voltage appears at the input, there will be a certain current through the vacuum tube, which may be zero, as determined by bias battery 706. When an input voltage is applied, the rise in grid voltage increases the anode current resulting in a drop of the anode voltage which is sent back to the grid through resistor $R_0$, reducing the grid voltage until equilibrium is again restored. The output which is taken from the grid side of battery 705 and the plate side of $R_0$, will be given approximately by the following expression:

$$E_s = -R_0\left(\frac{E_1}{R_1}+\frac{E_2}{R_2}+\frac{E_3}{R_3} \cdots \frac{1}{1-\frac{n}{G}}\right)$$

$n$ is the number of inputs, which is 3 in this case and $G$ is the gain of the tube. In order that the summation should be reasonably accurate, gain $G$ should be large, it will be seen that the more separate inputs are provided, the greater the gain must be for a given degree of accuracy. In order to increase the gain several stages of amplification instead of one stage may be used, provided that proper attention is paid to the plurality of the output and of the feedback used.

*Computed slant range aiming method*

As has been pointed out, there are considerable advantages in providing accurate comparison of computed and observed slant range on a cathode ray tube, independently of the form of the sweeps (and the errors therein) applied to the cathode ray tube. In such an arrangement, as illustrated in Fig. 26, the cathode ray tube is essentially used as a null indicator for cooperation with the precision computing arrangements. The same general approach may be used for using the cathode ray tube as a null indicator in two coordinates, one being slant range, as before, and the other being target bearing or some related quantity. Actually, instead of target bearing it is convenient, in connection with a tube provided with hyperbolic sweeps to use precision computers to indicate the instants when the antenna is expected to illuminate the target, such indication being provided by a brightening of the cathode ray tube screen, producing a bright line which will be hyperbolic in curvature. Fig. 38 shows the geometry of this problem, representing the face of a cathode ray tube upon which the terrain in front of the aircraft, including the target, is adapted to be represented in accordance with this invention.

The portion of the cathode ray tube not illuminated, which corresponds to the portion of the terrain not effectively illuminated by the antenna system, is shaded in Fig. 38. The arc labeled "range marker line" is produced by a marker pip generated in each sweep in the general manner explained and described in connection with Fig. 26. The center line of the "hyperbolic" illuminated area represents the direction in which the aircraft is heading. The solid slightly curved line passing through the target represents the hyperbolic sweep which is used as a "cross hair" or marker in cooperation with the range marker for purposes of adjusting the various computing circuits. This line is indicated as the "angle marker line" on the drawing. The time comparison arrangement for producing the angle marker line will be presently described. Also shown on Fig. 38 is a dashed line indicating the "track" of the aircraft, which is to say its actual course relative to the ground. The angle $\phi$ is the drift angle (see also Fig. 20) and forms the relatively constant portion of the angle $\epsilon$ provided in the apparatus shown in Fig. 26. The $\epsilon$ control apparatus tends to operate to keep the track of the aircraft in a fixed orientation on the tube, for example in a position corresponding to the vertical center line of the tube. The angle $\psi$, between the heading of the aircraft and the bearing of the target is actually a little greater than $\phi$, because of the additional increment subtended by the cross-trail (horizontal offset of the target from the track of the aircraft, equal to $T \sin \phi$, as pointed out in connection with Fig. 20). In some forms of apparatus, such as those which permit evasive changes of course during a bombing approach it may be convenient to compute by suitable circuits functions of the angle $\psi$. In simpler types of apparatus, in which it may be difficult to compute $\psi$ or its functions, the corresponding functions of the angle $\phi$ will do quite well for the desired time comparison for producing the angle marker line, and, if desired, a further correction for the cross-trail may be provided in approximate form.

The distance from the point on the ground directly beneath the aircraft to the target, corresponding to the length of the dotted line labeled "bearing of target" in Fig. 2, may be indicated as $R_T$. The X coordinate of the target, will be $R_T \sin \phi$. It will also be equal to $$r_T \sin \alpha \sec \delta + h \tan \delta$$

as discussed in connection with previous figures (see particularly Fig. 15). Computing devices can then be readily set up, using the same techniques as described in connection with other figures, to produce the voltage:

$$R_T \sin \phi - h \tan \delta - r_T \sin \alpha \sec \delta$$

The computing apparatus may be so arranged as to produce a signal when this quantity equals zero, thus indicating the instant when the radius vector to the target intersects at the target the hyperbolic stripe of electromagnetic illumination. As above pointed out, instead of $R_t \sin \psi$, the value $R_t \sin \phi$, with or without a small estimated correction, may be generated to provide a reasonably good approximation of the exact steering condition.

In the above-described manner the cathode ray tube may be used as a time-comparison null indicator in two coordinates, thus making it possible to operate precision computing apparatus for both steering condition and release time, free of errors which might otherwise be introduced by the inaccuracy of sweep circuits employed on the cathode ray tube, resulting from the failure of the square-root-extracting circuit to operate with sufficient rapidity, or other similar sources of error. At the same time a map-like representation using only a portion of the hyperbolic sweep shown in Fig. 38 is provided, indicating, for instance, only the portion of the terrain in the immediate vicinity of the target.

*A computing system*

Fig. 37 shows in more developed form the organization of computing devices and devices for generating stabilizing voltages for providing a stabilized representation of objects on the ground which remains stationary on the cathode ray tube screen in spite of changes of course of the aircraft resulting from evasive maneuvers and the like. The general type of indication and computation is similar to that discussed in connection with Figs. 24 and 25, but no provision is shown for indicating the "virtual target" on the cathode ray tube, the steering condition being satisfied in this case by observation of a meter indicating the desired course. In Fig. 37 mechanical connections are shown by means of double lines and electrical connections by means of single lines. The mechanical devices are shown in a spread-out fashion in order to simplify the illustration, but it is understood that the various mechanical elements may be compactly organized. No attempt has been made to indicate the presence of gears at shaft junctions or other such details.

Correction of the orientation of the sweeps with respect to the changes that may occur in the aircraft course are controlled by shaft 800 which may be operated by a directional gyroscopic apparatus or the like. As indicated on Fig. 37, this shaft puts in the angle $\omega$. Shaft 800 operates a resolver apparatus 801 which has an additional input furnished by shaft 802 which is set in accordance with the airspeed of the craft as determined from flight instruments or other observations. Resolver is adapted to operate two output shafts 803 and 804, shaft 803 being adapted to indicate the magnitude of the northward component of the airspeed of the craft and shaft 804 being adapted to indicate the eastward component of the airspeed of the craft. Resolver apparatus of the type here in question is known in the art. It consists essentially of a device adapted to multiply a given magnitude, represented by the position of a shaft, respectively by the sine and by the cosine of an angle determined by the position of another shaft, the sine product thus giving one of the components desired and the cosine product the other.

Through differential devices 805 and 806 the northward and eastward components of the wind are respectively added to the northward and eastward components of the air speed of the craft, the wind components being set in by knobs 807 and 808. Shafts 809 and 810 will then have positions respectively equal to the northward and eastward components of the ground velocity of the aircraft. These shafts respectively operate mechanical integrator devices 811 and 812 which may be of the ball-and-disk type. These integrators are devices adapted to produce a progressive displacement, the rate of displacement of which is determined by the position of shaft 809 in one case and by that of shaft 810 in the other.

Through differential devices 813 and 814 respectively additions or corrections to the displacement may be manually made by knobs 815 and 816 to the respective northward and eastward displacements. Shafts 817 and 818 which respectively indicate the northward and eastward displacement before modification by the position of knobs 815 and 816, are branched in order to connect to further differential devices 819 and 820 through which other corrections or additions may be made respectively through knobs 821 and 822, the corrected displacements in this case controlling respectively potentiometers 823 and 824 which respectively generate the vertical and horizontal stabilizing voltages which are superposed upon the sweep deflections of the cathode ray tube by addition devices 825 and 826 respectively. Shafts 827 and 828, which are respectively driven by differential devices 813 and 814 are adapted to indicate the northward and eastward components of the horizontal projection of the range from the aircraft to the target, and this range information is converted into an electrical voltage by potentiometers 829 and 830 respectively, the outputs of which are fed to pip generators of the coincidence type shown at 831 and 832 respectively. Generator 831 is also fed with the vertical sweep voltage and operates to provide a pip which forms the horizontal marker line. Similarly, generator 832 is fed with the horizontal sweep voltage and is adapted to provide pips such as to form the desired vertical marker line. The position of the marker lines may thus be adjusted by knobs 815 and 816 and these knobs are so arranged physically with relation to knobs 807 and 808 that knob 807 and 815 may be operated together and knobs 808 and 816 may be operated together.

As may be desired when the marker lines are moved to correct for an error, the marker lines may then be shifted by an amount representative of an error in the previous setting of the wind components. In accordance with well known techniques now used in connection with optical bomb sights, such adjustments may be done at a predetermined time after initial stabilization.

Shafts 803 and 804 operate potentiometers 833 and 834 respectively, which transform the position of the shaft into representative voltages. These voltages, which are proportional respectively to the northward and eastward components of the air speed of the craft, are furnished respectively to potentiometers 835 and 836 which are adapted to perform multiplication by the factor $$\frac{T}{S}$$

which factor is set into the apparatus by knob 837. This factor is the quotient of the "trail" and the air speed. The respective outputs of potentiometers 835 and 836 are fed to addition circuits 839 and 840 respectively, where they are combined with the output of potentiometers 829 and 830 respectively. The output of addition circuit 839 is fed to an inverter and amplifier circuit 841 which is adapted to furnish a balanced output voltage with respect to ground potential, so that one side of the output circuit will be at a voltage positive to ground of a magnitude proportional to the input voltage and the other side of the output circuit will be at an equivalent voltage negative to ground. Such inverting and amplifying circuits are well known, especially in connection with the final stage of sweep circuits for cathode ray tubes.

The balanced outputs of inverter and amplifier 841 are furnished respectively to the fixed terminals of potentiometer 843 the movable contact of which is controlled by the position of shaft 810. Potentiometer 843 provides a multiplication of the output of amplifier 841 by the factor $V_E$, the ground speed of the aircraft, and in this case the polarity of the output is so arranged that the negative product is produced.

In a similar manner the output of addition circuit 840 is fed to inverting the amplifying circuit 842 which in turn feeds potentiometer 844, which is adapted to produce the product $$V_N\left(R_E + \frac{T}{S} \times S_E\right)$$

The output of potentiometers 844 and 843 are then added in addition circuit to 845, the output of which should be zero if the proper course is being maintained. If the output is not zero, the polarity of the output indicates the direction in which the pilot should turn to get back on his proper course and the magnitude will give an indication of how much of a turn is desired. The output of addition circuit 845 is accordingly employed to operate a meter 846.

The time of fall of the bomb which is to be dropped is obtained from a suitable tabulation and is set into the device through knob 847 which operates one input of each of mechanical multipliers 849 and 850. Mechanical multipliers are known to persons skilled in the art and need not be further described here. Multiplier 849 is adapted to multiply the time of fall by the northward component of the wind and its output operates shaft 851, the position of which controls differential apparatus 853 which combines the motions of shafts 827 and 851 so as to subtract the product of the time of fall and the northward component of the wind from the northward component of the ground range of the target, the output of the differential device operating shaft 855, which in turn operates potentiometer 857 and 859. Potentiometers 857 and 859 are so arranged that the voltages generated thereby will build the square of the quantity represented by the position of shaft 855 and the output of these two potentiometers is then fed to addition circuit 862.

In a similar manner the output of mechanical multiplier 850 operates differential device 854 which in turn operates shaft 856 and potentiometers 858 and 860 which together are adapted to form the square of the difference between the eastward component of the ground range and the product of the eastward component of the wind and the time of fall. The output of these potentiometers is also fed to addition circuit 862. It will be seen that the sum of the two squared quantities furnished respectively by potentiometers 859 and 860 to circuit 862 will be the square of the vector sum of the ground range to the target and the deviation of the bomb caused by the wind, which vector sum is equal to the ground range to the virtual target. Potentiometer 863 is then set in accordance with the square of the calculated critical range to the virtual target and the polarity of the output of potentiometer 863 is such that its output is subtracted from other quantities furnished to addition circuit 862. In consequence, the output of addition circuit 862 will be a voltage indicative of the distance to the release point (directly indicative of its square), which is therefore used to operate meter 864, and it will be further noted that when this voltage is equal to zero, the release point will have been reached. This voltage is therefore also employed to operate bomb release apparatus 865.

*A complete compensated system*

Figure 39:
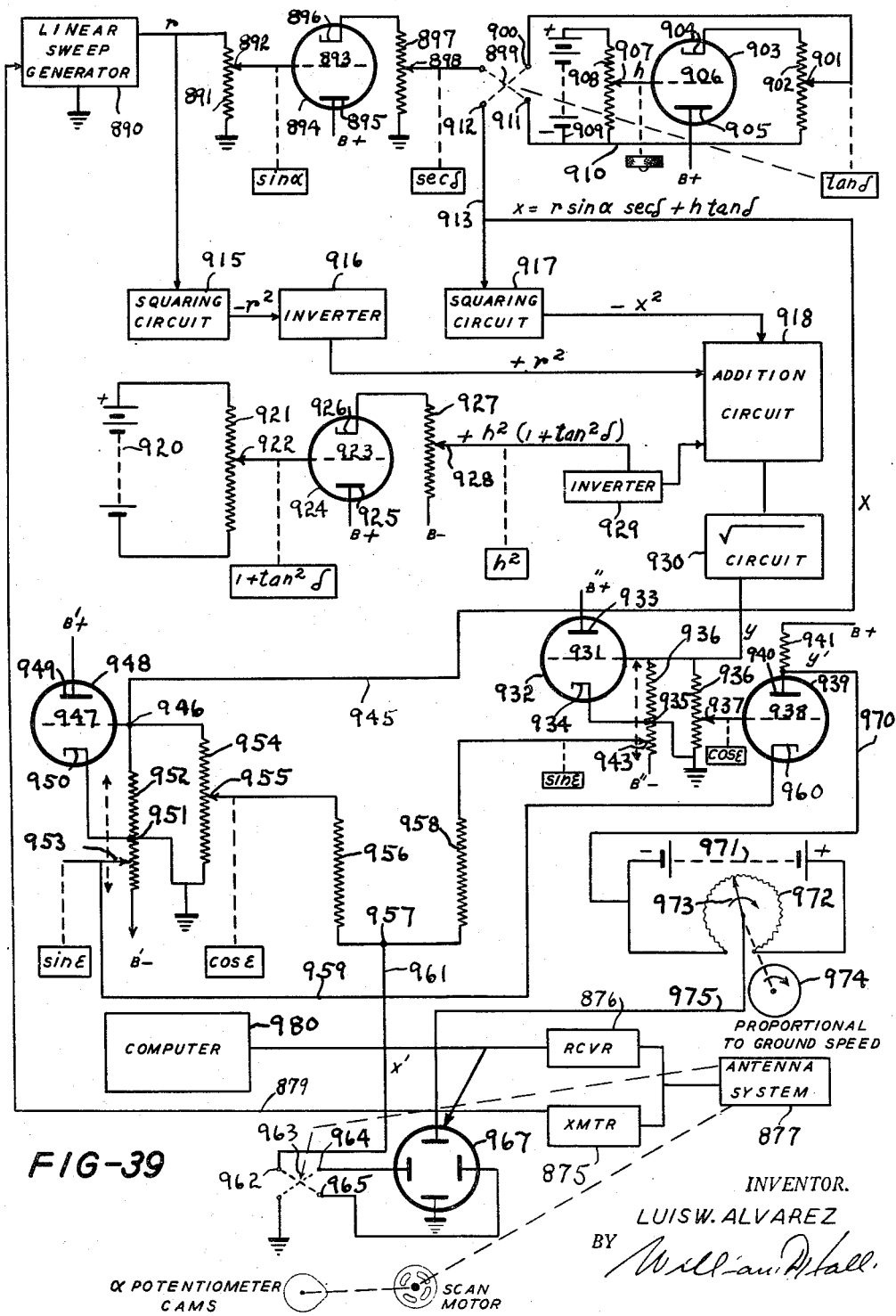
Fig. 39 is a block diagram of a complete, compensated system with computer.

Referring to Fig. 39, a transmitter 875 and receiver 876 are shown as operatively associated with an antenna system 877. Transmitter 875 may be of the usual type, an example of which is shown in block diagram in Fig. 20 of Radar System Fundamentals published by War Department, April 28, 1944 (TM 11—467). Receiver 876 may be the usual superheterodyne type of receiver, while antenna system 877 is preferably of the type previously described herein and more fully described and claimed in the previously identified application of Luis W. Alvarez. Transmitter 875 may be internally pulsed by a suitable timer and may have a line 879 going to a linear weep generator 890. Generator 890 may be of any of the well-known types and may advantageously be of the type shown in Figs. 27 or 28 herein.

Generator 890 feeds its output to a potentiometer 891 over which a wiper 892 may be operated so that the motion thereof is proportional to the sine of scan angle $\alpha$. The modulated output of potentiometer 891 is fed to control grid 893 of cathode follower tube 894 whose anode 895 may be connected to a suitable source of B+ potential. Cathode 896 is connected through a suitable load resistor 897 to ground. Load resistor 897 forms a potentiometer resistance with which a wiper 898 cooperates. Wiper 898 is moved so that the output therefrom modulates the potential in potentiometer 847 in accordance with secant $\delta$.

Wiper 898 feeds its output through reversing switch 899. Reversing switch 899 may have one terminal 900 connected to wiper 901 cooperating with potentiometer resistance 902 forming the cathode load resistance of cathode follower 903, the lead resistance being connected to cathode 904 of the tube. Tube 903 has its anode 905 connected to a suitable source of B+ potential, while its control grid 906 is connected to wiper 907 cooperating with potentiometer resistance 908, bridged across battery 909. The polarity of the battery is as shown, and wiper 907 is adapted to be moved over resistance 908 in accordance with variations of altitude $h$ of the plane. Such control may be manual since altitude variations may be relatively slow. However, an automatic altitude control may be used if desired. The negative terminal of battery 909 is connected back by wire 910 to the low side of potentiometer resistance 902, this wire also being connected to terminal 911 of reversing switch 899.

Wiper 901 is mechanically moved so that the modulation of the potentiometer resistance is in accordance with tangent $\delta$, this same control being also exercised over reversing switch 899 so that switch 899 may be operated in accordance with sign of this angle. When $\delta$ is a positive angle, reversing switch 899 is so poled that the potentials from wiper 898 and 901 are added, while if $\delta$ is negative, the potential from wiper 901 is subtracted.

The remaining terminal 912 of reversing switch 899 is fed to line 913. The potential of 913 has the value indicated.

The output of linear generator 890 may also be fed to a squaring circuit 915 which may advantageously be of the type disclosed in Fig. 32 herein. Since the output of this type of squaring circuit reverses the polarity, circuit 915 may feed its output to inverter 916 of any suitable type. Thus a simple form of inverter is shown in Fig. 58 of Radar System Fundamentals previously identified.

Line 913 may also feed its output into squaring circuit 917 and the outputs from inverter 916 and squaring circuit 917 may be added in addition circuit 918. This circuit may take any one of the forms disclosed in Figs. 14, 17 and 37.

In order to add the component $h^2(1+\tan^2\delta)$ into addition circuit 918, the following may be provided. A suitable battery 920 may have a potentiometer resistance 921. Connected across and cooperating with this resistance is a wiper 922 having a motion as indicated in the drawing. Wiper 922 feeds its output to control grid 923 of cathode follower 924 whose anode 925 may be connected to a suitable means of B+. Tube 924 has its cathode 926 connected through load resistance 927 with the lower end of load resistance 927 being connected to a suitable source of B— potential. Resistance 927 has wiper 928 playing over that and moved in accordance with $h^2$. This movement may either be manual or automatic. Wiper 928 feeds its output to an inverter 929, and thence the final output goes into addition circuit 918.

The output of addition circuit 918 is fed to square root extracting circuit 930 which may be of the type shown in Fig. 35. Circuit 930 feeds its output to control grid 931 of cathode follower 932, whose anode 933 may be connected to a suitable source of potential B"+. Cathode 934 of this tube may be connected to a junction point 935 intermediate resistor 936 whose upper end is connected to control grid 931 and whose lower end is connected to B"—. Junction point 935 is grounded. Between control grid 931 and ground is connected resistance 936 over which plays wiper 937 connected to control grid 938 of amplifier 939. Amplifier 939 has its anode 940 connected through load resistance 941 to a suitable source of B+ potential. Wiper 937 is moved over resistance 936 to modulate the same in accordance with variations of sine $e$. It is understood that the various angles here have the same meanings, as previously given them.

Line 913 also feeds its output through line 945 to junction point 946 from which a connection goes to control grid 947 of vacuum tube 948. Anode 949 of this tube is connected to a suitable source of potential B'+, while cathode 950 is connected to grounded junction 951 on resistance 952. The high side of resistance 952 is connected to junction 946, while the low side may be connected to B'—. A wiper 953 plays over resistance 952 and the motion thereof is in accordance with sine $e$.

Connected from junction 946 to ground is resistance 954 over which wiper 955 is moved in accordance with variations of cosine $e$. Wiper 955 feeds its output through a high resistance 956 to junction point 957, while wiper 943 feeds its output through high resistance 958 to junction point 957. The operation of the circuits and resistances associated with vacuum tubes 932, 939 and 948 are all similar to vacuum tubes 284, 297 and 277, respectively, in Fig. 17.

Wiper 953 is connected by line 959 back to cathode 960 of vacuum tube 938. The outputs of these various circuits are taken from junction 957 as one point and from anode 940 of tube 939 as the other point. Junction 957 is connected by line 961 to one terminal 962 of reversing switch 963 operated by the scanning motor in connection with antenna system 877. Two terminals 964 and 965 of reversing switch 963 go to the horizontal deflecting plates of an indicating oscilloscope 967. The remaining terminal of the reversing switch is grounded. The reversal of polarity of the horizontal deflecting plates is similar to that accomplished by reversing switch 81$a$ in Fig. 12.

The output from anode 940 is fed by line 970 to a potentiometer system consisting of battery 971 and potentiometer 972 connected across said battery. Potentiometer 972 has wiper 973 which is mechanically driven by a suitable means 974 at a speed proportional to ground speed of the plane carrying the equipment. The modulating voltage from wiper 973 is then fed by line 975 to one vertical deflecting plate of tube 967, with the other plate being grounded. It is understood, of course, that these connections are diagrammatic and that in practice connections may go to both plates and means may be provided for centering the beam.

Receiver 876 feeds its output to tube 967 in a manner to indicate target echoes, while a computer 980 may also be connected to tube 967 to feed in desired computer data. The computer may be of the types shown in Figs. 22, 23, 25, 26 or 37, preferably the latter.

What is claimed is:

1. Apparatus for association with an aircraft for indicating the disposition of reflecting objects on a portion of the surface of the earth which includes means for transmitting short pulses of radiant oscillatory energy in a narrow fan-like beam approximately in shape part of the surface of a cone having its vertex at the aircraft, means for receiving echoes of said pulses and measuring the time of their reception relative to the time of transmission of said pulses, means for varying the angle between the surface of said cone and its axis, and means for correlating the said angle with the time of reception of said echoes and with observed altitude of the aircraft adapted to present a map-like visual indication of the disposition of reflecting objects on a portion of the surface of the earth.

2. Apparatus according to claim 1 in which the means last-mentioned in said claim includes a cathode ray tube and sweep circuits associated therewith adapted to cause the electron beam thereof to form a succession of substantially hyperbolic traces of different curvature.

3. Apparatus for association with an aircraft for indicating the disposition of reflecting objects on a portion of the surface of the earth, which apparatus includes means for transmitting short pulses of radiant oscillating energy in a narrow fan-like beam disposed substantially on one side of a vertical line passing through said aircraft, said beam approximating in shape part of the surface of a cone having its vertex at the aircraft and its axis in a direction which is approximately horizontal when said aircraft is in level flight, means for receiving echoes of said pulses and measuring the time of their reception relative to the time of transmission of said pulses, said means including a cathode ray tube adapted to indicate the presence of said echoes, means for varying the angle between the surface of said cone and its axis, and means responsive to said last-mentioned means and responsive also to the time relative to the time of transmission of said pulses and further responsive to an adjustment indicative of the altitude of said aircraft above the earth's surface adapted to cause the indications of said echoes on said cathode ray tube to form a map-like representation of the disposition of reflecting objects on a portion of the surface of the earth.

4. Apparatus according to claim 3 having also apparatus responsive to roll and yaw of the said aircraft and adapted to stabilize said map-like representation against displacement when said aircraft rolls or yaws.

5. Apparatus for association with an aircraft for indicating the disposition of reflecting objects on a portion of the surface of the earth located chiefly in a forward direction with respect to said aircraft, which apparatus includes means for transmitting short pulses of electromagnetic radiation in a narrow fan-like beam extending substantially entirely in forward and downward directions with respect to said aircraft, said beam approximating in shape part of the surface of a cone having its vertex at the aircraft and its axis extending in a generally lateral direction with respect to said aircraft, means for receiving echoes of said pulses and measuring the time of their reception relative to the time of transmission of said pulses, said means including a cathode ray tube adapted to indicate the presence of said echoes, means for varying the angle between the surface of said cone and its axis, and means responsive to said last-mentioned means and responsive also to the elapsed time of transmission between said pulses and reception of its corresponding echo and further responsive to an adjustment indicative of the altitude of the said aircraft above the earth's surface adapted to cause the indications of said echoes on said cathode ray tube to form a map-like representation of the disposition of reflecting objects on a portion of the surface of the earth located chiefly forwardly of said aircraft.

6. Apparatus for association with an aircraft for indicating the disposition of reflecting objects on a portion of the surface of the earth which includes means for transmitting short pulses of electromagnetic radiation, said means including a substantially linear array of spaced radiating elements adapted to form a narrow fan-like beam of electro-magnetic energy extending in direction substantially to one side of a vertical line passing through said aircraft when said aircraft is in normal flight, said beam approximating in shape part of the surface of a cone having its vertex at the aircraft and its axis in a direction which is approximately horizontal when said aircraft is in level flight, means for receiving echoes of said pulses and measuring the elapsed time of their reception relative to the time of transmission of said pulses, said means including a cathode ray tube adapted to indicate the presence of said echoes, means for varying the angle between the surface of said cone and its axis, and means responsive to said last-mentioned means and responsive also to the elapsed time between transmission of said pulses and reception of its corresponding echo and further responsive to an adjustment indicative of the altitude of the said aircraft above the earth's surface, which means is adapted to cause the indications of said echoes on said cathode ray tube to form a map-like representation of the disposition of reflecting objects on a portion of the surface of the earth.

7. Apparatus for association with an aircraft for indicating the disposition of reflecting objects on a portion of the surface of the earth located chiefly forwardly of said aircraft, which apparatus includes means for transmitting short pulses of electromagnetic energy, means including a substantially linear array of spaced radiating elements adapted to radiate said pulses in a narrow fan-like beam extending substantially entirely in forward and non-backward downward direction with respect to said aircraft which reference to its altitude in normal flight, said beam approximating in shape part of the surface of a cone having its vertex at the aircraft and its axis in a direction which is generally lateral with respect to said aircraft, means for receiving echoes of said pulses and measuring the time of their reception relative to the time of transmission of said pulses, said means including a cathode ray tube adapted to indicate the presence of said echoes, means for varying the angle between the surface of said cone and its axis, means responsive to said last-mentioned means and responsive also to the time relative to the transmission of said pulses and further responsive to an adjustment indicative of the altitude of the said aircraft above the earth's surface, which means is adapted to provide to said cathode ray tube deflection voltages adapted to produce a series of hyperbolic resultant deflections which are adapted to cause the indications of said echoes on said cathode ray tube to form a map-like representation of the disposition of reflecting objects on a portion of the surface of the earth located chiefly forwardly of said aircraft, means responsive to the orientation of said aircraft about vertical and longitudinal axis adapted to stabilize said map-like representation in spite of yawing and rolling of said aircraft, and means cooperating with said last-mentioned means and including a generator of substantially linear long period changes in voltage, which means is adapted to stabilize said map-like representation for substantial periods of time against displacement which would otherwise result from the horizontal motion of said aircraft with respect to the earth.

8. Apparatus for association with an aircraft for indicating the disposition of reflecting objects on a portion of the surface of the earth, which apparatus includes means for transmitting short pulses of electromagnetic energy, means including a substantially linear array of space radiating elements adapted to radiate said pulses in a narrow fan-like beam said beam extending in direction substantially all on one side of a vertical line passing through said aircraft when said aircraft is in level flight, said beam approximating in shape part of the surface of a cone having its vertex at the aircraft and its axis in a direction which is approximately horizontal when said aircraft is in level flight, means for receiving echoes of said pulses and measuring the time of their reception relative to the time of transmission of said pulses, said means including a cathode ray tube adapted to indicate the presence of said echoes, means for varying the angle between the surface of said cone and its axis by changing the relative phasing of said elements of said linear array, means adapted to produce signals proportional to the angles between the heading of said aircraft and reference horizontal and vertical axes and trigonometric functions of said angles, means responsive to the magnitude of the sine of the angle between said surface and axis of said cone and responsive also to the time relative to the time of transmission of said pulses and further responsive to an adjustment indicative of the altitude of the said aircraft above the earth's surface and finally also responsive to the aforesaid signals, which means is adapted to cause the indication of said echoes on said cathode ray tubes to form a map-like representation of the disposition of reflecting objects on a portion of the surface of the earth, which map-like representation is stabilized against variations in the orientation of said aircraft, and means including a generator of substantially linear long period changes in voltage adapted to stabilize said map-like representation for substantial periods of time against displacement which would otherwise result from the horizontal motion of said aircraft with respect to the earth.

9. The method of forming on a cathode ray tube indicator disposed in a flying aircraft a map-like representation of the disposition of reflecting objects within an area of the surface of the earth which comprises radiating short pulses of electromagnetic energy in a narrow fan-like beam extending in forward and downward directions relative to said aircraft, said beam approximating in shape part of the surface of a cone having its vertex at said aircraft and its axis in a generally lateral direction relative to said aircraft, varying the angle between said surface and said axis of said cone, receiving echoes of said pulses and indicating the presence of said echoes by luminous indications on said cathode ray tube, forming sweep voltages for said cathode ray tube synchronized with the transmission of said pulses, varying the magnitude as a function of the sine of the aforesaid angle and the altitude of said aircraft above the earth, in a manner adapted to cause repeated series of hyperbolic deflections of the beam of said cathode ray tube and thereby distributing said indications to form a map-like representation of the disposition of reflecting objects within an area of the surface of the earth located chiefly forward of said aircraft.

10. The method of forming on a cathode ray tube disposed in a flying aircraft a map-like representation of the disposition of reflecting objects within an area of the surface of the earth which comprises radiating short pulses of electromagnetic energy in a narrow fan-like beam extending in forward and downward directions relative to said aircraft, said beam approximating in shape part of the surface of a cone having its vertex at said aircraft and its axis in a generally lateral direction relative to said aircraft, varying the angle between said surface and said axis of said cone, receiving echoes of said pulses and indicating the presence of said echoes by luminous indications on said cathode ray tube, forming sweep voltages synchronized with the time of transmission of said pulses, varying the magnitude of said voltages as a function of the sine of the aforesaid angle and the altitude of said aircraft above the earth thereby forming rectangular components of a repeated series of hyperbolic resultant sweeps, obtaining measurements of the orientation of said aircraft about a horizontal and a vertical axis, modifying said sweep voltages with reference to said measurements in a manner adapted to provide sweep deflections for said cathode ray tubes adapted to distribute the said indications to form a map-like representation of the disposition of reflecting objects on a portion of the surface of the earth located chiefly forwardly of said aircraft, which map-like representation is stabilized with respect to changes in orientation of said aircraft, superimposing upon said sweep voltages additional deflecting voltage changing at a relatively slow and substantially linear rate, such superimposition being accomplished in a manner adapted to stabilize said map-like representation with respect to displacement due to the motion of said aircraft with respect to the surface of the earth.

11. Apparatus for association with an aircraft for indicating the disposition of reflecting objects within an area of the surface of the earth which includes means for transmitting short pulses of electromagnetic energy in a narrow fan-like beam extending in directions substantially entirely on one side of the vertical direction, means for receiving the echoes of said pulses and indicating the time of their reception relative to the time of transmission of said pulses, means for angularly displacing the orientation of said fan-like beam to cause said beam to sweep over the earth in a direction parallel to the narrow dimension of said beam, and transverse to the direction of flight of said aircraft and means for correlating the instantaneous adjustment of said last mentioned means with the time of reception of said echoes and with observed altitude of the aircraft adapted to present a map-like visual indication of the disposition of reflecting objects within an area of the surface of the earth and means for stabilizing said indication against movement of said aircraft.

12. Apparatus for calculating course and release time for aerial bombing from aircraft which includes means for transmitting short pulses of electromagnetic radiation, said means including a substantially linear array of spaced radiating elements adapted to form a narrow fan-like beam of electromagnetic energy extending forwardly and downwardly from said aircraft and approximating in shape part of the surface of a cone having its vertex at the aircraft and its axis in a lateral direction with respect to said aircraft, means for receiving echoes of said pulses, said means including a cathode ray tube adapted to indicate the presence of said echoes, means for varying the angle between the surface of said cone and its axis, means responsive to said last-mentioned means and responsive also to the elapsed time relative to the time of transmission of said pulses and further responsive to an adjustment indicative of the altitude of said aircraft above the earth's surface, which means is adapted to cause the indications of said echoes on said cathode ray tube to form a map-like representation of the disposition of reflecting objects on a portion of the earth's surface located generally forward of said aircraft, means for stabilizing said map-like representation with respect to the orientation of said aircraft which means is adapted to indicate the proper course for bombing a selected target within said area of the earth's surface, and release-point calculating means adapted to measure accurately the horizontal projection of the distance to the target by comparison with indications on said cathode ray tube by means of a slant-range marker which means are nevertheless independent of errors in sweep wave forms applied to said cathode ray tube.

13. The method of determining point of bomb release independently of optical visibility which includes radiating short pulses of electromagnetic energy in a narrow fan-like beam extending forwardly and downwardly from an aircraft, said beam approximating in shape part of the surface of a cone having its vertex at said aircraft and its axis in a generally lateral direction relative to said aircraft, varying the angle between said surface and said said axis of said cone, receiving echoes of said pulses and indicating the presence of said echoes by luminous indications on a cathode ray tube, forming sweep voltages synchronized with the time of transmission of said pulses, varying the magnitude of said voltages as a function of the sine of the aforesaid angle and the altitude of said aircraft above the earth, in a manner adapted to form rectangular components of a repeated series of hyperbolic sweeps, obtaining measurements of the orientation of said aircraft about horizontal and vertical axes with reference to a predetermined position, modifying said sweep voltages in accordance with said measurements in a manner adapted to provide sweep deflections for said cathode ray tubes whereby said indications are distributed to form a stabilized and oriented map-like representation of the disposition of reflecting objects within an area of the surface of the earth located forwardly of said aircraft, determining a bombing course by observance of the extent of said modification of sweep voltages necessary as an average value for a given course to stabilize said map-like representation against displacement resulting from cross wind, providing a slant-range tracking marker and a ground-speed stabilizing voltage for said cathode ray tube, adjusting the said ground-speed simulating device to cause said marker to remain stationary relative to said map-like representation and adjusting the output thereof to cause said marker to pass through a portion of said representation corresponding to a desired target, calculating the release time by means of the information determined by said adjusting procedures.

14. The method of determining point of bomb release independently of optical visibility which includes radiation short pulses of electromagnetic energy in a narrow fan-like beam extending forwardly and downwardly from an aircraft, said beam approximating in shape part of the surface of a cone having its vertex at said aircraft and its axis in a generally lateral direction relative to said aircraft, varying the angle between said surface and said axis of said cone, receiving echoes of said pulses and indicating the presence of said echoes by luminous indications on a cathode ray tube, forming sweep voltages synchronized with the time of transmission of said pulses, varying the magnitude of said voltages as a function of the sine of the aforesaid angle and the altitude of said aircraft above the earth, in a manner adapted to form rectangular components of a repeated series of hyperbolic resultant sweeps, obtaining measurements of the orientation of said aircraft about horizontal and vertical axes, modifying said sweep voltages with reference to said measurements in a manner adapted to provide sweep deflections for said cathode ray tube adapted to distribute the said indications to form map-like representation of the disposition of reflecting objects on a portion of the surface of the earth located chiefly forwardly of said aircraft, determining a bombing course by the observance of the extent of said modification of sweep voltages necessary, as an average value for a given course, to stabilize said map-like representation against displacement resulting from cross-wind, providing a hyperbolic target marker line by means of time-comparison apparatus and operating said apparatus so that the marker is set in position on the screen of said cathode ray tube to aid in the said determination of a bombing course, said time comparison apparatus being independent of at least a substantial portion of said sweep-forming means, providing a slant range tracking marker and a ground speed stabilizing voltage for said cathode ray tube, adjusting the said ground speed simulating device to cause said slant range marker to remain stationary relative to said map-like representation and adjusting the output thereof to cause said slant range marker to pass through a portion of said representation corresponding to a desired target, calculating the release time by means of rate and distance information determined by said adjusting procedures.

15. Apparatus for calculating course and release time for aerial bombing from aircraft which includes means for transmitting short pulses of electromagnetic energy, said means including a substantially linear array of spaced radiating elements adapted to form a narrow fan-like beam extending forwardly and downwardly from said aircraft and approximating in shape part of the surface of a cone having its vertex at the aircraft and its axis in a lateral direction with respect to said aircraft, means for receiving echoes of said pulses, said means including a cathode ray tube adapted to indicate the presence of said echoes, means for varying the angle between the surface of said cone and its axis, means responsive to said last mentioned means and responsive also to the elapsed time relative to the time of transmission of said pulses and further responsive to an adjustment indicative of the altitude of said aircraft above the earth's surface, which means is adapted to cause the indicator to display said echoes on said cathode ray tube to form a map-like representation of the disposition of reflecting objects within an area of the earth's surface located generally forward of said aircraft, means for stabilizing said map-like representation with respect to the orientation of said aircraft, which means is adapted to indicate the proper course for bombing a selected target within said area of the earth's surface represented on said representation, a first time-comparison calculating means adapted to form a bright line on said map-like representation corresponding to the location of a portion of the said portion of the earth's surface which is illuminated with the same pulses of electromagnetic energy as said target, and calculating means associated therewith for indicating a suitable course for bombing said target, and a second time comparison calculating means adapted to measure accurately the horizontal projection of the distance to the target by comparison with indications on said cathode ray tube by means of a slant range marker, both of said time comparison calculating means thereby providing bombing calculator apparatus the precision of which is not substantially adversely effected by distortion in said map-like representation.

16. Apparatus for calculating course and release time for aerial bombing from aircraft which includes means including a cathode ray tube for providing an approximately map-like representation on said cathode ray tube of an area of the earth's surface including a selected target and located generally forward of said aircraft, said means including apparatus for transmitting and receiving short pulses of electromagnetic radiation, such apparatus including a high resolution antenna system, means associated with said last mentioned means and adapted for the determination of the drift angle and the ground speed of said aircraft in accordance with operation of said previously mentioned means, a first time-comparison and calculating means adapted to produce a bright line on said cathode ray tube which line when said second above mentioned means is properly operated, is adapted to indicate upon said map-like representation the portions of said portion of the earth's surface which are illuminated by the same pulses of electromagnetic energy which illuminate said target, and a second time-comparison and calculating means adapted to produce a bright line upon said cathode ray tube indicator passing through points on said map-like representation corresponding to points on the earth's surface at an adjustable given distance from said aircraft, said distance being equal to the distance of the target from said aircraft when said second above-mentioned means is properly operating.

17. Apparatus for calculating course and release time for aerial bombing from aircraft which includes means for transmitting short pulses of electromagnetic radiation, said means including a substantially linear array of spaced radiating elements adapted to form a narrow fan-like beam of electromagnetic energy extending forwardly and downwardly from said aircraft and approximating in shape part of the surface of a cone having its vertex at the aircraft and its axis in a lateral direction with respect to said aircraft, means for receiving echoes of said pulses, said means including a cathode ray tube adapted to indicate the presence of said echoes, means for varying the angle between the surface of said cone and its axis, means responsive to said last mentioned means and responsive also to the time relative to the time of transmission of said pulses and further responsive to an adjustment indicative to the altitude of said aircraft above the earth's surface, which means is adapted to cause the indication of said echoes on said cathode ray tube to form a map-like representation of the disposition of reflecting objects within an area of the earth's surface located generally forward of said aircraft, means for providing marker lines on said cathode ray tube adapted to be set so as to intersect at the indication produced by a recognized echo and adapted to measure by such setting coordinates of the location of the object producing said echo with respect to said aircraft, means associated with said last mentioned means for stabilizing said map-like representation at least when said aircraft flies on a substantially steady course, said means being adapted to maintain said marker lines on said recognized echo indication for a substantial period of time after said marker lines have been set as aforesaid, and computing means adapted to cooperate with said means for providing said marker lines and with said means for stabilizing said map-like representations and further with means adapted to be set in accordance with the location of said target relative to the said object producing said recognized echo, to calculate the desired course and the appropriate release time for bombing said target.

18. Apparatus for calculating course and release time for aerial bombing from aircraft which includes means for transmitting short pulses of electro-magnetic radiations said means including a substantially linear array of spaced radiating elements adapted to form a narrow fan-like beam of electromagnetic energy extending forwardly and downwardly from said aircraft and approximating in shape part of the surface of a cone having its vertex at the aircraft and its axis in lateral direction with respect to said aircraft, means for receiving echoes of said pulses, said means including a cathode ray tube adapted to indicate the presence of said echoes, means for varying the angle between the surface of said cone and its axis, means responsive to said last mentioned means and responsive also to the elapsed time relative to the time of transmission of said pulses and further responsive to an adjustment indicative of the altitude of said aircraft above the earth's surface, which means is adapted to cause the indications of said echoes on said cathode ray tube to form a map-like representation of the disposition of reflecting objects within an area of the earth's surface located generally forward of said aircraft, means for stabilizing said map-like representation with respect to the orientation of said aircraft, which means is adapted to indicate the proper course for bombing a selected target within said area of the earth's surface represented on said representation, release-time calculating means adapted to measure accurately the horizontal projection of the distance of said target by comparison with indications on said cathode ray tube by means of a slant range marker, and means associated with said calculating means adapted to provide a correction thereto such that said calculating means may be operated with said slant range marker adjusted to "track" on an indication corresponding to an echo signal from an object other than said target but lying in a direction, relative to said aircraft, approximately the same as said target.

19. In a radar system for use in an airplane or other observation post having a substantial altitude with reference to surrounding terrain, the combination of an antenna array having a sheet radiation pattern in the form of a generally conical sector with reference to an axis, said axis being disposed in relation to a region to be scanned so that the antenna radiation meets the earth's surface in the form of an arc of a hyperbola constituting an element along which range scanning is effected, and the projection on the earth of said axis of said radiation being generally coincident with the major hyperbolic axis and normally constituting a boundary of region being scanned for range, means for varying said radiation pattern to vary the cone angle thus effectively generating hyperbolic arcs for antenna scanning, all said arcs being parts of a family of hyperbolae having substantially common major axes, said radar system including a transmitter for periodically energizing said antenna array and a receiver including a cathode ray tube for receiving target echoes between successive transmitter pulses and means for directing the electron beam along a hyperbolic arc on the screen generally similar to a range scanning arc on the earth.

20. In a radar system for use in an airplane or other observation post having a substantial altitude with reference to surrounding terrain, the combination of an antenna array having a linear series of dipoles alined along an axis, adjacent dipoles being reversed with the arms of said dipoles being alined along an axis and adjacent dipoles being spaced substantially a half wave length apart so that they may be fed in phase, a transmitter and receiver including a cathode ray tube, said antenna system having a radiation pattern in the form of a sector of a cone with the axis thereof coincident with the antenna system axis, said radiation pattern generating a generally hyperbolic arc on the earth's surface, means for varying the effective spacing between dipoles thus resulting in a variation of the cone angle of radiation pattern, means for generating a cathode ray tube beam sweep for range scanning along a hyperbolic arc and generating a linear path on the screen, and means for varying said sweep to vary said path as said antenna system is varied whereby scanning over a region is effected.

21. Apparatus according to claim 1 in which the means last-mentioned in said claim includes a cathode ray tube and sweep circuits associated therewith adapted to cause the electron beam thereof to be deflected in a manner such that the intersection of such beam with a plane perpendicular to the undeflected direction of said beam will define a succession of hyperbolic arcs the position of the foci of which lie substantially on a straight line and tend to vary in position along such line as the angle defined in claim 1 is varied.

22. Apparatus according to claim 3 having also means responsive to roll and horizontal orientation of the said aircraft and adapted to stabilize said map-like representation against displacement when said aircraft rolls, yaws or transversely drifts, said apparatus further having means adapted to stabilize said map-like representation for substantial periods of time against displacement which would otherwise result from the horizontal motion of said aircraft with respect to the earth, said last-mentioned means including a generator of substantially linear long-period changes in voltage.

23. The system of claim 20 wherein said antenna array has means for feeding energy thereto and receiving energy therefrom at the center of said array, means at one end of said array for transmitting high frequency energy to the opposite end of said array and means for alternately connecting the input to said antenna system first to one side and then to the other.

24. In an apparatus for aerial bombing independent of optical visibility, means for tracking a predetermined target which includes means for transmitting short pulses of electromagnetic energy in a narrow fan-like beam extending forwardly and downwardly from said aircraft and approximating in shape part of the surface of a cone having its vertex at the aircraft and its axis in a lateral direction, means for receiving echoes of said pulses, said means including a cathode ray tube for indicating the presence of said echoes, means for varying the angle between the surface of said cone and its axis, means responsive to said last-mentioned means and responsive also to the elapsed time relative to the time of transmission of said pulses and further responsive to an adjustment indicative of the altitude of said aircraft above the earth's surface whereby the indications of said echoes on said cathode ray tube form a map-like representation of the disposition of reflecting objects within an area of the earth's surface located generally forward of said aircraft, means for stabilizing said map-like representation with respect to the orientation of said aircraft whereby the proper course for bombing a selected target within an area of the earth's surface is indicated, and means for stabilizing said representation against forward movement of said aircraft comprising means for generating range markers intersecting at right angles at a predetermined point whereby the X and Y coordinates of the range to said point are determined, and means for continuously adjusting said markers to remain on said point whereby the rate of change of said X and Y coordinates are determined.

25. In an apparatus for aerial bombing, means for tracking a predetermined target which includes means for transmitting short pulses of electromagnetic energy, said means including a substantially linear array of spaced radiating elements adapted to form a narrow fan-like beam of electromagnetic energy extending forwardly and downwardly from said aircraft and approximating in shape part of the surface of a cone having its vertex at the aircraft and its axis in a lateral direction with respect to said aircraft, means for receiving echoes of said pulses, said means including a cathode ray tube adapted to indicate the presence of said echoes, means for varying the angle between the surface of said cone and its axis, means for generating sweep voltages to cause said echoes to form a map-like representation on said cathode ray tube indicator, comprising means for generating a sawtooth voltage proportional to range, means for varying said sweep voltage proportional to the sine of said scan angle and means for determining the altitude of said aircraft and varying said sweep voltages as a function of said altitude, means for stabilizing said map-like representation with respect to the orientation of said aircraft to indicate the proper course for bombing a selected target within the field of the said portion of the earth's surface, and means for stabilizing said aircraft against forward movement of said aircraft comprising means for generating range markers intersecting at right angles at a predetermined point whereby the X and Y coordinates of said point are determined, and means for continuously adjusting said markers to remain on said point whereby the rate of change of said X and Y coordinates are determined.

26. In an apparatus for determining course and release time for aerial bombing from aircraft, means for tracking a target independently of optical visibility including means for transmitting short pulses of electromagnetic energy, said transmitting means including a substantially linear array of spaced radiating elements adapted to form a narrow fan-like beam of electromagnetic energy extending forwardly and downwardly from said aircraft and approximating in shape part of the surface of a cone having its vertex at the aircraft and its axis in a lateral direction with respect to said aircraft; means for receiving echoes of said pulses; means including a cathode ray tube for indicating the presence of said echoes, means for varying the angle between the surface of said cone and its axis, means responsive to said last-mentioned means and responsive also to the elapsed time relative to the time of transmission of said pulses and further responsive to an adjustment indicative of the altitude of said aircraft above the earth's surface, for causing the indications of said echoes on said cathode ray tube to form a map-like representation of the disposition of reflecting objects within an area of the earth's surface located generally forward of said aircraft, means for stabilizing said map-like representation with respect to the movement of said aircraft which means is adapted to indicate the proper course for bombing a selected target within the field of the said portion of the earth's surface represented on said representation, means whereby said representation is stabilized against forward movement of said aircraft, and the range to said target and the ground speed of said aircraft relative to said target are simultaneously determined comprising means for generating a range mark and means for continuously adjusting said mark to coincide with a selected target.

27. The method of forming on a cathode ray tube installed in a flying aircraft a map-like representation of the disposition of reflecting objects within an area on the ground which comprises radiating pulses of electromagnetic energy in thin fan-like beam extending in a forward and downward direction, said beam approximately in shape part of the surface of a cone having its vertex at said aircraft and its axis extending laterally and substantially horizontally, varying the angle between said surface and said axis, receiving echoes of said pulses, forming sweep voltages synchronized with the transmission of said pulses, varying the magnitude of said voltages as a function of said angle and the altitude of said aircraft, applying said sweep voltages to said tube to cause a series of hyperbolic traces corresponding to the scanning of the ground by said beam of electromagnetic energy whereby indications representing echoes for reflecting objects will be disposed to form a map-like representation of said area, stabilizing said representation against movement of said aircraft about a vertical and horizontal axis and against forward movement.

LUIS W. ALVAREZ.

REFERENCES CITED

The following references are of record in the file of this patent:

UNITED STATES PATENTS

| Number | Name | Date |
| --- | --- | --- |
| 1,506,192 | Meyer | Aug. 26, 1924 |
| 2,161,081 | Ovtschinnikoff | June 6, 1939 |
| 2,194,141 | Estoppey | Mar. 19, 1940 |
| 2,216,707 | George | Oct. 1, 1940 |

FOREIGN PATENTS

| Number | Country | Date |
| --- | --- | --- |
| 520,778 | Great Britain | May 3, 1940 |